United States Patent
Karighattam et al.

(10) Patent No.: US 7,676,814 B2
(45) Date of Patent: Mar. 9, 2010

(54) FOUR LAYER ARCHITECTURE FOR NETWORK DEVICE DRIVERS

(75) Inventors: Kishore Karighattam, Austin, TX (US); Prasad P. Padiyar, Austin, TX (US); Harish Vasudeva, Austin, TX (US)

(73) Assignee: GlobalFoundries Inc., Grand Cayman (KY)

( * ) Notice: Subject to any disclaimer, the term of this patent is extended or adjusted under 35 U.S.C. 154(b) by 1687 days.

(21) Appl. No.: 10/809,229

(22) Filed: Mar. 25, 2004

(65) Prior Publication Data
US 2005/0213603 A1 Sep. 29, 2005

(51) Int. Cl.
G06F 3/00 (2006.01)
G06F 9/26 (2006.01)
(52) U.S. Cl. ...................... 719/319; 711/208
(58) Field of Classification Search ................. 719/321, 719/319; 711/208
See application file for complete search history.

(56) References Cited

U.S. PATENT DOCUMENTS

| | | | |
|---|---|---|---|
| 5,684,962 A * | 11/1997 | Black et al. ................. 709/238 |
| 5,867,688 A * | 2/1999 | Simmon et al. ............. 709/208 |
| 5,983,274 A | 11/1999 | Hyder et al. |
| 6,169,729 B1 | 1/2001 | Feuerstraeter |
| 6,172,981 B1 | 1/2001 | Cox et al. |
| 6,233,619 B1 * | 5/2001 | Narisi et al. ................. 709/230 |
| 6,260,140 B1 * | 7/2001 | McKeeth .................... 713/100 |
| 6,370,607 B1 | 4/2002 | Williams et al. |
| 6,401,142 B1 | 6/2002 | Williams et al. |
| 6,775,832 B1 * | 8/2004 | Lin et al. ..................... 719/310 |
| 6,882,654 B1 * | 4/2005 | Nelson ........................ 370/401 |
| 6,892,261 B2 * | 5/2005 | Ohno et al. .................. 710/260 |
| 7,032,227 B2 * | 4/2006 | Wilkinson et al. .......... 719/319 |
| 2005/0141424 A1 * | 6/2005 | Lim et al. .................... 370/235 |
| 2005/0177701 A1 * | 8/2005 | O'Connor .................... 711/206 |

FOREIGN PATENT DOCUMENTS

WO    WO 01/46819 A2    6/2001

OTHER PUBLICATIONS

Partial Search Report, Int'l Application No. PCT/US2005/007616 Int'l Filing Date Jul. 3, 2005, 2 pgs.

* cited by examiner

*Primary Examiner*—Lechi Truong
(74) *Attorney, Agent, or Firm*—Eschweiler & Associates, LLC

(57) ABSTRACT

The present invention is a four layer architecture that includes reusable components that can be used in varied operating environments and with varied network devices. The architecture includes an operating system dependent layer, an operating system independent layer, a media independent layer, and a media dependent layer. The operating system dependent layer can vary for differing operating system. In contrast, the operating system independent layer is identical or substantially similar for differing operating systems. Similarly, the media independent layer is identical or substantially similar for different network devices (e.g., a family or group of network devices). The media dependent layer can vary according to differing and varied network devices.

16 Claims, 39 Drawing Sheets

ADAPTER QUEUE DATA STRUCTURE — 902

| BASE ADDRESS POINTERS | SIZE |
|---|---|
| MANDATORY AND OPTIONAL PARAMETERS | USER SPACE (POINTER TO VOID) |

DUPLICATE QUEUE DATA STRUCTURE — 904

| POINTER TO VA | SIZE |
|---|---|
| VOID POINTER | |

FREE QUEUE DATA STRUCUTRE — 906

| POINTER TO VA | SIZE |
|---|---|

LEAKY QUEUE DATA STRUCTURE — 908

| POINTER TO VA | SIZE |
|---|---|
| VOID POINTER | |

FIG. 15

ODL - OIL INTERFACE

| DATA #1 BUFFER VIRTUAL READ POINTER | DATA #1 BUFFER VIRTUAL WRITE POINTER | ... | DATA #n BUFFER VIRTUAL READ POINTER | DATA #n BUFFER VIRTUAL WRITE POINTER | \0 | PTR TO MSG | INDEX TO NEXT MANDATORY PARAMETER |

2101

2102, 2103, 2104, 2105

OIL - MIL INTERFACE

| PHY READ POINTER FRAG #1 | FRAG #1 SIZE | ... | DATA #n BUFFER PHY READ POINTER | DATA #n BUFFER SIZE | \0 | PTR TO MSG | INDEX TO NEXT MANDATORY PARAMETER |

| FIELD NAME | Created by Host | Modified by ESP | Encrypted | Covered by ESP Authentication | Added by Controller |
|---|---|---|---|---|---|
| Preamble | | | | | x |
| Start of Frame Delimiter | | | | | x |
| MAC Header | x | | | | |
| IP Header | x | | | | |
| ESP Header | x | | | x | |
| Payload Data | x | x | x | x | |
| Padding | x | x | x | x | |
| Pad Length | x | x | x | x | |
| Next Header | x | x | x | x | |
| Authentication Data | x | x | | | |
| Frame Check Sequence | | | | | x |

| FIELD NAME | Created by Host | Modified by AH Module | Covered by AH Authentication | Added by Controller |
|---|---|---|---|---|
| Preamble | | | | x |
| Start of Frame Delimiter | | | | x |
| MAC Header | x | | | |
| IP Header | x | | x | |
| AH Header | x | x | x | |
| Other Headers | x | | x | |
| Payload Data | x | | x | |
| Frame Check Sequence | | | | X |

| PHCKSM FOR IPv4 |  |
|---|---|
| 32-BIT IP SOURCE ADDRESS | |
| 32-BIT IP DESTINATION ADDRESS | |
| ZERO | PROTOCOL |
| TCP TOTAL LENGTH | |

| PHCKSM FOR IPv6 | |
|---|---|
| 128-BIT IP SOURCE ADDRESS | |
| 128-BIT IP DESTINATION ADDRESS | |
| 16-BIT TCP TOTAL LENGTH | |
| ZERO | PROTOCOL |

Fig. 31D

FOUR LAYER ARCHITECTURE FOR NETWORK DEVICE DRIVERS

FIELD OF THE INVENTION

The present invention relates generally to network devices, and more particularly, to a four layer architecture for network device drivers.

BACKGROUND OF THE INVENTION

Host-computing systems, such as personal computers, are often operated as nodes on a communications network, where each node is capable of receiving data from the network and transmitting data to the network. Data is transferred over a network in groups or segments, wherein the organization and segmentation of data are dictated by a network operating system protocol, and many different protocols exist. In fact, data segments that correspond to different protocols can co-exist on the same communications network. In order for a node to receive and transmit information packets, the node is equipped with a peripheral network interface device, which is responsible for transferring information between the communications network and the host system. For transmission, a processor unit in the host system constructs data or information packets in accordance with a network operating system protocol and passes them to the network peripheral. In reception, the processor unit retrieves and decodes packets received by the network peripheral. The processor unit performs many of its transmission and reception functions in response to instructions from an interrupt service routine associated with the network peripheral. When a received packet requires processing, an interrupt may be issued to the host system by the network peripheral. The interrupt has traditionally been issued after either all of the bytes in a packet or some fixed number of bytes in the packet have been received by the network peripheral.

Networks are typically operated as a series or stack of layers or levels, where each layer offers services to the layer immediately above. Many different layered network architectures are possible, where the number of layers, the function and content of each layer may be different for different networks. The international standards organization (ISO) has developed an open systems interconnection (OSI) model defining a seven layer protocol stack including an application layer (e.g., layer 7), a presentation layer, a session layer, a transport layer, a network layer, a data link layer, and a physical layer (e.g., layer 1), wherein control is passed from one layer to the next, starting at the application layer in one station, proceeding to the bottom layer, over the channel to the next station and back up the hierarchy. The user of a host system generally interacts with a software program running at the uppermost (e.g., application) layer and the signals are sent across the network at the lowest (e.g., physical) layer.

One popular network architecture is sometimes referred to as a TCP/IP stack, in which the application layer is one of FTP (file transfer protocol), HTTP (hyper text transfer protocol), or SSH (secure shell). In these networks, the transport layer protocol is typically implemented as transmission control protocol (TCP) or user datagram protocol (UDP), and the network layer employs protocols such as the internet protocol (IP), address resolution protocol (ARP), reverse address resolution protocol (RARP), or internet control message protocol (ICMP). The data link layer is generally divided into two sublayers, including a media access control (MAC) sublayer that controls how a computer on the network gains access to the data and permission to transmit it, as well as a logical link control (LLC) sublayer that controls frame synchronization, flow control and error checking. The physical layer conveys the data as a bit stream of electrical impulses, light signals, and/or radio signals through the network at the physical (e.g., electrical and mechanical) level. The physical layer implements Ethernet, RS232, asynchronous transfer mode (ATM), or other protocols with physical layer components, where Ethernet is a popular local area network (LAN) defined by IEEE 802.3.

One or more layers in a network protocol stack often provide tools for error detection, including checksumming, wherein the transmitted messages include a numerical checksum value typically computed according to the number of set bits in the message. The receiving network node verifies the checksum value by computing a checksum using the same algorithm as the sender, and comparing the result with the checksum data in the received message. If the values are different, the receiver can assume that an error has occurred during transmission across the network. In one example, the TCP and IP layers (e.g., layers 4 and 3, respectively) typically employ checksums for error detection in a network application.

Data may also be divided or segmented at one or more of the layers in a network protocol stack. For example, the TCP protocol provides for division of data received from the application layer into segments, where a header is attached to each segment. Segment headers contain sender and recipient ports, segment ordering information, and a checksum. Segmentation is employed, for example, where a lower layer restricts data messages to a size smaller than a message from an upper layer. In one example, a TCP frame may be as large as 64 kbytes, whereas an Ethernet network may only allow frames of a much smaller size at the physical layer. In this case, the TCP layer may segment a large TCP frame into smaller segmented frames to accommodate the size restrictions of the Ethernet.

One or more of the network protocol layers may employ security mechanisms such as encryption and authentication to prevent unauthorized systems or users from reading the data, and/or to ensure that the data is from an expected source. For instance, IP security (IPsec) standards have been adopted for the IP layer (e.g., layer 3 of the OSI model) to facilitate secure exchange of data, which has been widely used to implement virtual private networks (VPNs). IPsec supports two operating modes, including transport mode and tunnel mode. In transport mode, the sender encrypts the data payload portion of the IP message and the IP header is not encrypted, whereas in tunnel mode, both the header and the payload are encrypted. In the receiver system, the message is decrypted at the IP layer, wherein the sender and receiver systems share a public key through a security association (SA). Key sharing is typically accomplished via an internet security association and key management protocol (ISAKMP) that allows the receiver to obtain a public key and authenticate the sender using digital certificates.

Network device drivers are a part of one of the network layers or data link layers. Network device drivers are software components that facilitate data transfer over networks by communicating with a network device and other software components in a host system (e.g., other network layers, operating system, application software, and the like).

Operating systems are software components that control the allocation and usage of hardware resources such as memory, central processing unit time, disk space, peripheral devices and the like. Yet, individual operating systems, although performing similar basic tasks, can operate substantially differently from one another. As a result, device drivers need to be written specifically for each operating system and tailored to respective specific implementations. Thus, a typical device requires a multitude of device drivers designed or written specific to various operating systems. Consequently, a large amount of resources are expended in order to provide device drivers for the various operating systems.

Additionally, device drivers often need to be updated when an operating system is updated (e.g., operating system patch or update). Such updates can render a device driver inoperable because of fairly minor changes in the operating system. Unfortunately, a large amount of resources are often expended in order to generate a new device driver that is operable with the updated operating system.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention facilitates network device driver development, device driver maintenance, operation, and networking by utilizing a four layer architecture. This architecture includes reusable components that can be employed in varied operating environments and with varied network devices. The architecture includes an operating system dependent layer, an operating system independent layer, a media independent layer, and a media dependent layer. The operating system dependent layer can vary for differing operating systems. In contrast, the operating system independent layer is identical or substantially similar for differing operating systems. Similarly, the media independent layer is identical or substantially similar for different network devices (e.g., a family or group of network devices), while the media dependent layer can vary for differing network devices.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 15 is a diagram illustrating exemplary queue formats in accordance with an aspect of the present invention.

FIG. 21 is a block diagram illustrating an exemplary data structure employed during transmit operations in accordance with an aspect of the present invention.

FIGS. 31A and 31B are tables illustrating frame fields modified by outgoing ESP and AH processing, respectively, in the network interface system of FIG. 25.

FIGS. 31C and 31D are schematic diagrams illustrating pseudo header checksum calculations for IPv4 and IPv6, respectively in the network interface system of FIG. 26.

DETAILED DESCRIPTION OF THE INVENTION

The present invention will now be described with respect to the accompanying drawings in which like numbered elements represent like parts. The figures provided herewith and the accompanying description of the figures are merely provided for illustrative purposes. One of ordinary skill in the art should realize, based on the instant description, other implementations and methods for fabricating the devices and structures illustrated in the figures and in the following description.

It is appreciated that operating systems are similar to each other in some respects, but can vary substantially in other respects. For example, the interfaces and interaction of computer system devices and the various operating systems can vary substantially depending on the operating systems. Conventionally, as a result, a separate conventional device driver is typically written from the ground up for each operating system because device driver design tends to vary for each operating system. If the device is modified, each of the separate conventional device drivers are often required to be updated or modified so as to be compatible with the modified device.

The present invention is directed to a four layered architecture for network device drivers that comprise an operating system dependent module, an operating system independent module, a media independent module and a media dependent module. In contrast to conventional device drivers, the four layered device driver of the present invention shares code and development for various operating systems because only one of the layers depends on a particular operating system being employed. Thus, the four layered device driver can avoid substantially completely writing separate device drivers for various operating systems. Additionally, the four layered device driver is also organized such that improvements or modifications in a device do not generally require completely redeveloping each respective device driver for that device.

Figure 1:
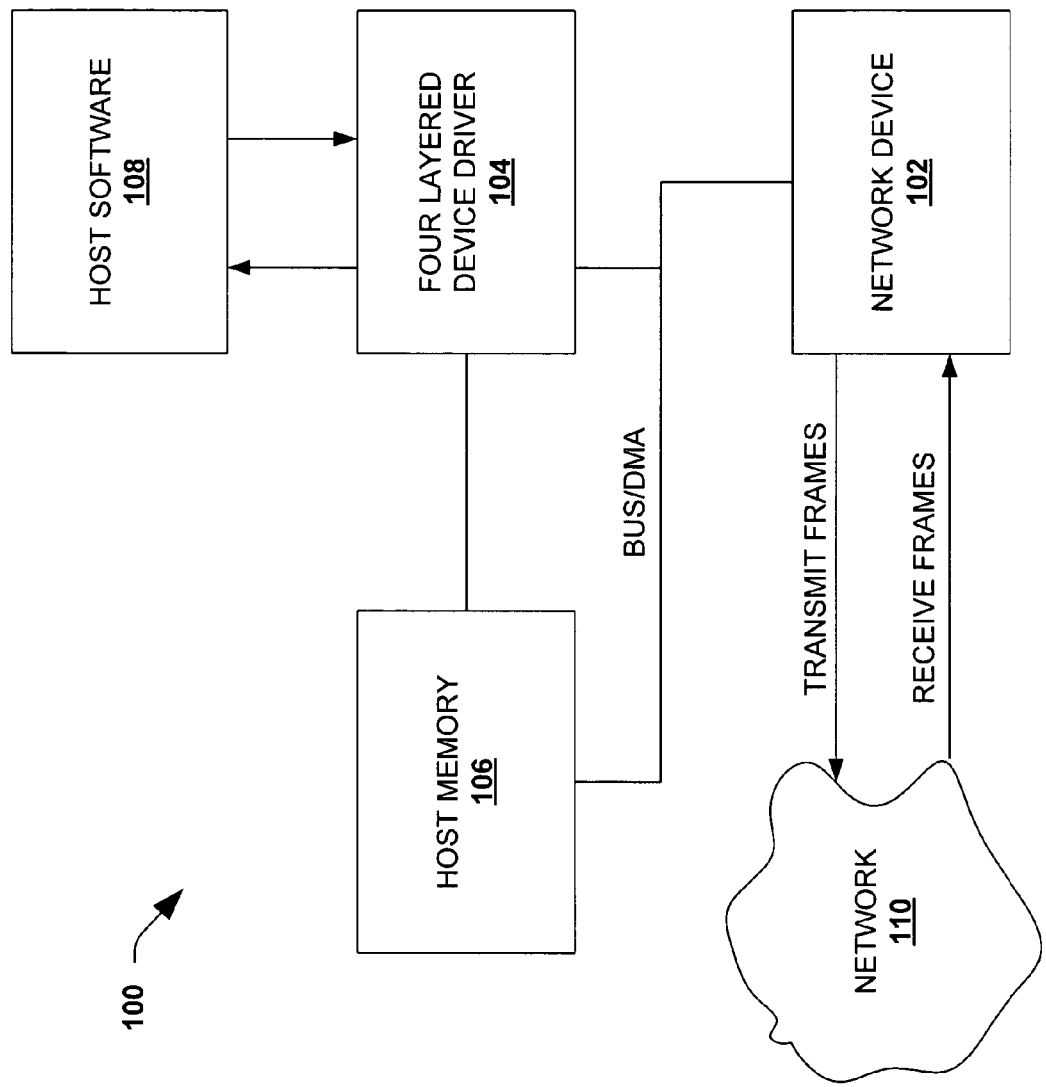
FIG. 1 is block diagram illustrating data transfer for a network system in accordance with an aspect of the present invention.

FIG. 1 is a block diagram illustrating transfer of data for a network system 100 in accordance with an aspect of the present invention. The system 100 is described at a high level to provide an overview of the present invention. The system 100 includes a network device 102, a four layered device driver 104, a host memory 106, and host software 108. The system 100 is operable to transfer data to and from a network 110 (e.g., wireless, wired, cellular, combination, and the like). Further details of operation of the system 100 and similar systems are described supra and infra.

Figure 25:
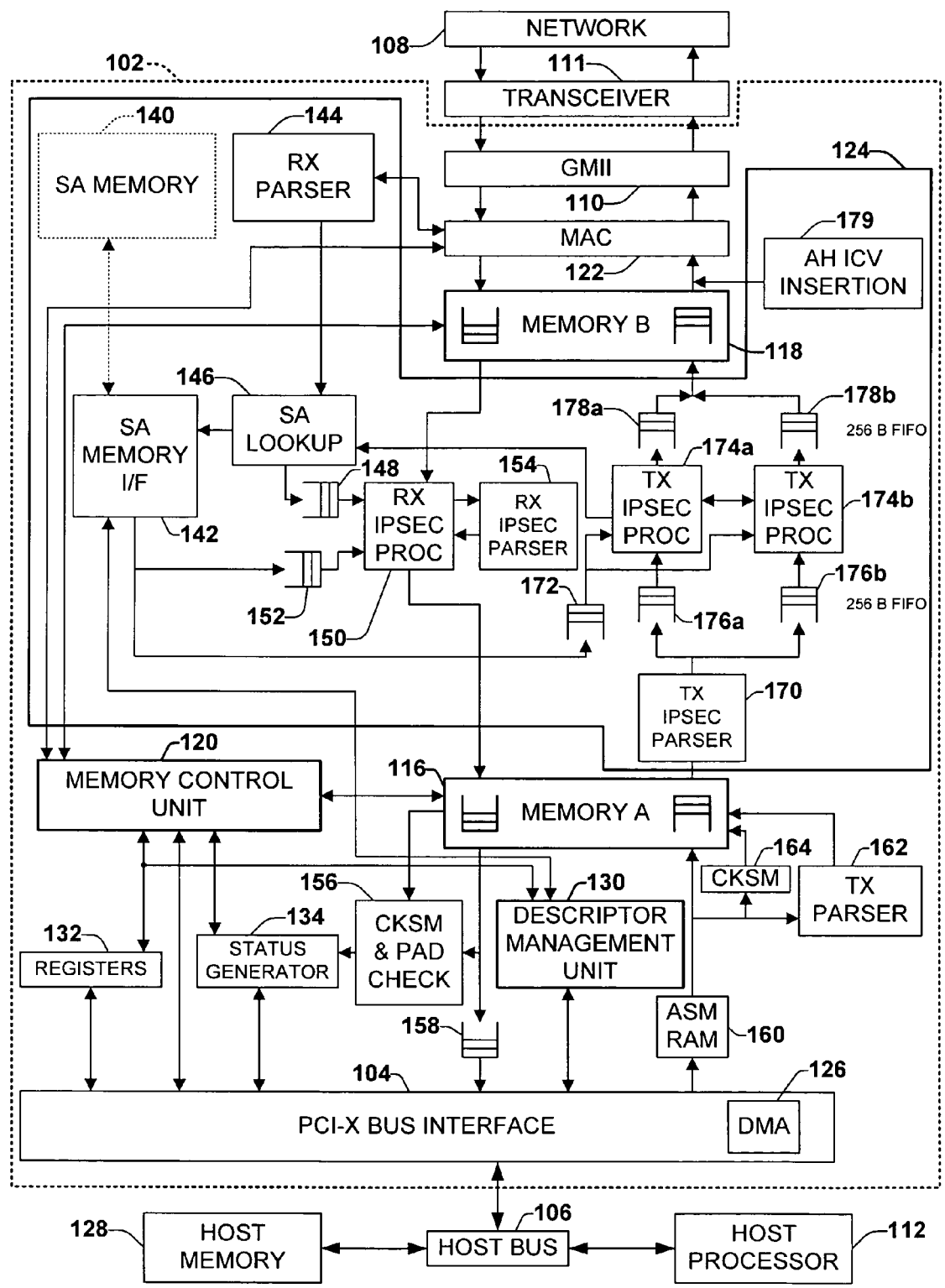
FIG. 25 is a schematic diagram illustrating an exemplary network interface system in which various aspects of the invention may be carried out.
Figure 26:
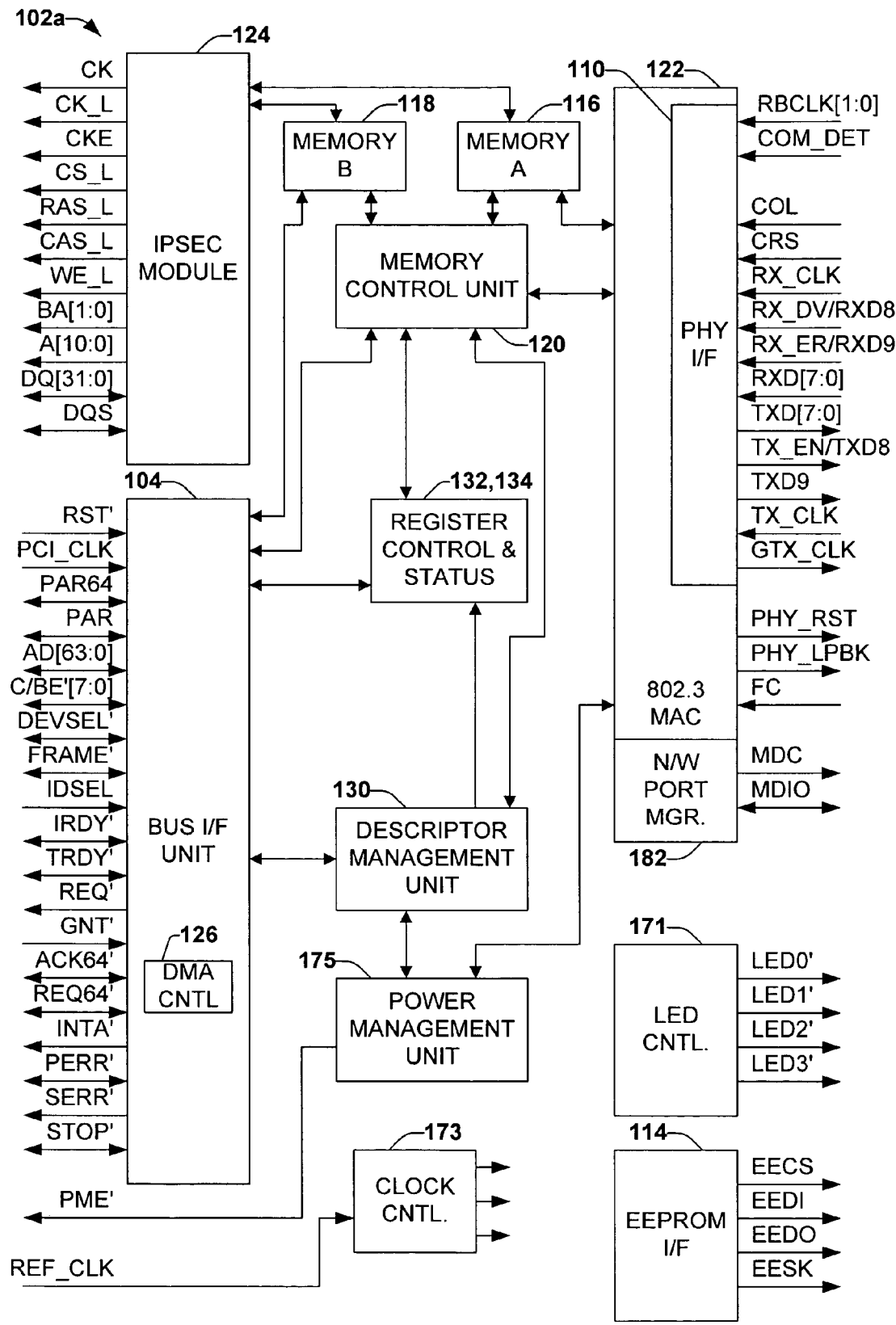
FIG. 26 is a schematic diagram illustrating an exemplary single-chip network controller implementation of the network interface system of FIG. 25.
Figure 27:
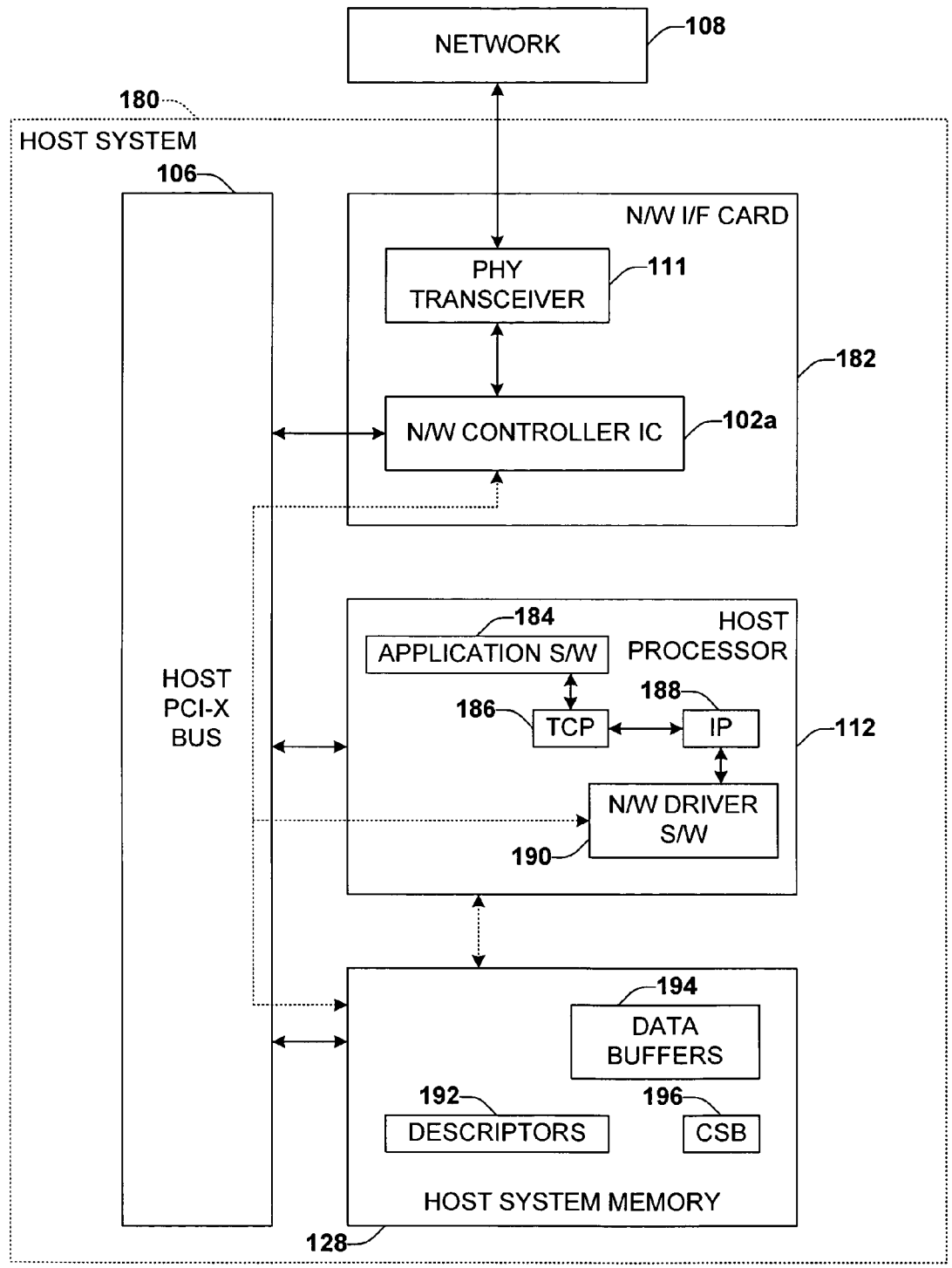
FIG. 27 is a schematic diagram illustrating a host system interfacing with a network using the exemplary network controller of FIG. 26.

The network device 102 physically transfers data from the host memory 106 to the network 110 and from the network 110 to the host memory 106. Frames generally comprise a data packet along with at least some header information (e.g., source address, destination address, and the like). The network device 102 handles aspects of data transfer such as, but not limited to, collision detection, retransmission, checksumming, and the like. FIGS. 25-27, described infra, further describe and illustrate exemplary operation of the network device 102.

The four layered device driver 104 is operable to process received frames and pass them to the host software 108 and also to assemble frames for transmission based upon data and information received from the host software. Additionally, the four layered device driver 104 is operable to initialize and configure the network device 102. The host memory 106 is one or more contiguous locations within system memory, and is accessible by both the network device 102 and the four layered device driver 104. The host software 108 includes software executing on a computer system such as, an operating system, application software, and the like. The host software 108 determines when and what data to send and where to send it as well as other optional information. Additionally, the host software 108 can request data from other computer systems on the network and processes received data passed thereto by the four layered device driver 104.

On receipt of one or more received frames, the network device 102 processes and then places those frames at one or more specific locations in the host memory 106 via a bus or DMA mechanism. The four layered device driver 104 accesses the received frame(s) and processes the frames (e.g., authenticating, error checking, and the like). Then, the four layered device driver 104 passes the received data to the host software 108 in a host software compatible format. The device driver 104 attempts to avoid physically copying the received data from one location to another and may supply pointers to memory locations located in the host memory 106 that contain the received data. The host software 108 can then access and process the received data as needed.

On transmit of one or more frames, the host software 108 notifies the four layered device driver 104 of the data to be sent as well as header information for the data. The four layered device driver 104 manipulates the data and the header information so as to assemble one or more transmit frames in a format compatible with the network device 102. Then, the network device 102 performs additional processing on the frame(s) and transmits the frames to the network 110.

Figure 2:
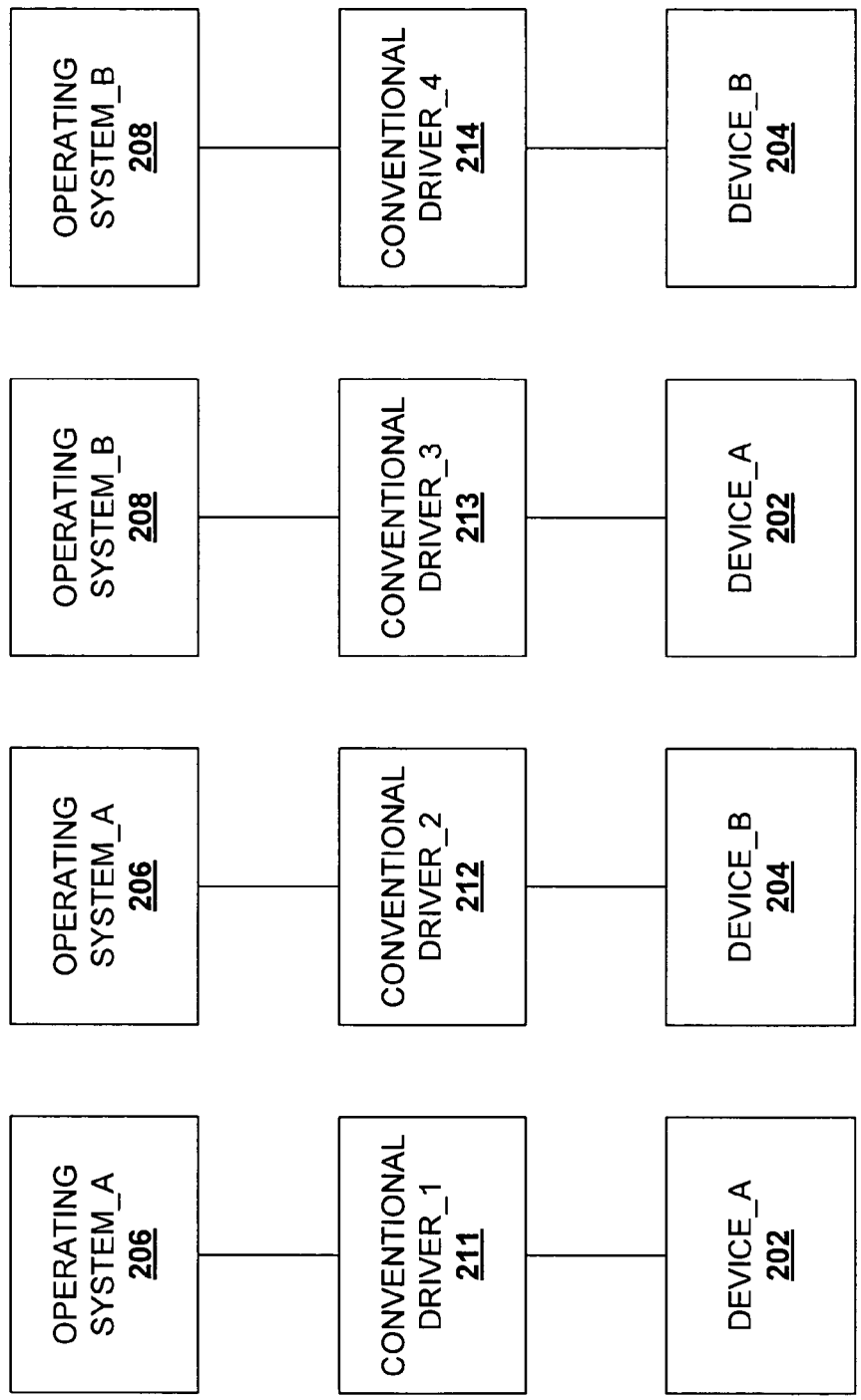
FIG. 2 is a block diagram illustrating use of conventional network drivers.

FIG. 2 is a block diagram illustrating use of conventional network device drivers as appreciated by the inventors of the present invention. This example is presented for illustrative purposes and includes two network devices, device A 202 and device B 204, and two operating systems, operating system A 206 and operating system B 208.

Operating systems generally provide an interface between application programs and computer hardware. In turn, operating systems employ device drivers to interact with specific devices, which have unique mechanisms of communicating with host systems and specific interfaces. Thus, device drivers have to be specific to an operating system and a particular network device.

Conventional network device drivers are developed for a particular device and a particular operating system. As a result, a different device or a different operating system requires development of a different network device driver. For example, FIG. 2 shows that for the device A 202, separate drivers are needed for the operating system A 206 and the operating system B 208. Similarly, FIG. 2 shows that for a particular operating system, separate drivers 211, 213 are needed for the device A 202 and the device B 204. Accordingly, two different devices and two different operating systems require that four conventional device drivers 211, 212, 213, and 214 be developed.

Figure 3:
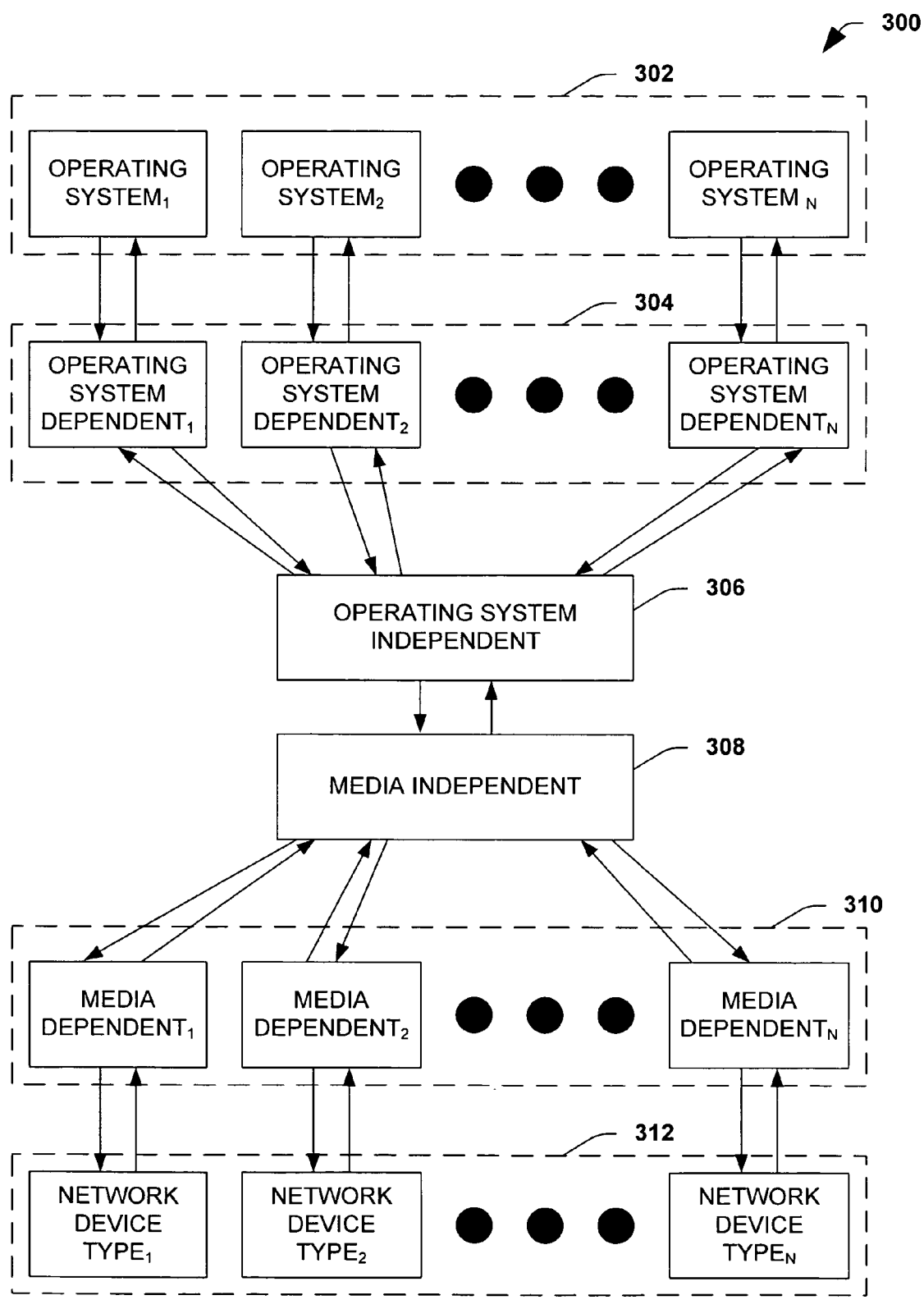
FIG. 3 is a block diagram illustrating a layered network device driver system in accordance with an aspect of the present invention.

Turning now to FIG. 3, a block diagram of a system 300 for controlling and operating a network device, referred to as a device driver, in accordance with an aspect of the present invention is illustrated. The description of FIG. 3 is provided as a brief overview of the modules that comprise the system 300, which is a four layer architecture. Accordingly, the system 300 is described in an overview fashion so as to highlight characteristics and functionality of the modules. Further details of the four layer architecture and modules therein are described infra. The system 300 is organized in a hierarchical manner to facilitate organization, reuse of code, interoperability, flexibility, and the like. The system 300 can interact with an operating system 302 and a network device 312 so as to cause the network device 312 to perform requested operations, such as sending and receiving data. The system 300 has a number of modes of operation including, but not limited to, sending data, receiving data, tunneling, initializing, shut down, and the like. The system 300 can be implemented as program code executing or executable on a host computer system.

The system 300 includes an operating system dependent module 304, an operating system independent module 306, a media independent module 308, and a media dependent module 310. The modules 304, 306, 308, and 310 generally communicate with the module above and below, however, in some instances, a module can communicate with a module not directly above or below itself as will be discussed infra. The modules are developed such that one of the modules can be modified and/or updated without requiring the other modules to be updated. This characteristic can avoid replacing device drivers in entirety by allowing for single module updates.

The operating system dependent module 304 communicates with the operating system 302 and the operating system independent module 306 in order to perform or initiate network operations including sending of data, receiving of data, initialization, and the like. The operating system 302 is illustrated to show that it may be one of a number of types of operating systems. The operating system dependent module 304 is similarly illustrated to show that it is specific to one type of operating system. The operating system dependent module 304 communicates with the operating system 302 in a format that is at least partially specific to the operating system 302 for which it is designed. Generally, the operating system dependent module 304 interfaces with the operating system 302 in order to obtain packets from the operating system 302 for transmission and to provide received packets to the operating system 302. The operating system dependent module 304 can include other functions, such as initialization, tunneling, and the like, that are specific to the operating system 302. In addition to interacting with the operating system 302, the operating system dependent module 304 interacts and/or communicates with the operating system independent module 306.

The operating system dependent module 304 is operable to handle requests from the operating system 302 such as send data, encryption, destination, tunneling, and the like. Additionally, the operating system dependent module 304 is able to notify the operating system 302 of various events such as, incoming data has been received, a connection has been established, and the like. Such notifications are typically received from the operating system independent module 306 and converted into a suitable format particular to the operating system 302 and then provided to the operating system 302.

For sending data, the operating system 302 generally provides the operating system dependent module with pointers to specific buffers, data buffers, and/or storage locations that include data to be transmitted as well as header information. For receiving, the operating system dependent module 304 provides pointer to specific buffers, data buffers, and/or storage locations that include received data.

The operating system independent module 306 performs device driver functionality that is independent of the particular operating system 302 on which the system 300 operates. The operating system dependent module 304 initially processes requests from the operating system 302 and the operating system independent module 306 continues processing those requests in a manner not specific to the operating system 302. The operating system independent module 306 interacts or communicates with the media independent module 308 and the operating system dependent module 304. The operating system independent module 306 processes requests and notifications without regard to a specific operating system.

The media independent module 308 includes functionality that is independent of the media/device that the system 300 supports. The media independent module 308 interacts with the operating system independent module 306 on one side and with the media dependent module 310 on the other side. The media independent module 308 can interact with the media dependent module 310 and obtain media specific information. This obtained information can then be manipulated to form media independent information that can be sent to other modules in the system 300.

The media dependent module 310 includes functionality that is specific to the media that the driver system 300 supports. The media dependent module 310 interacts with the media independent module 308 and with the network device 312. The network device 312 is illustrated as being one of a number of possible network device types and the media dependent module 310 is one of a number of media dependent modules designed for the number of possible network device types. The media dependent module 310 reads card configuration details and services them to the media independent module 308 and the operating system dependent module 304. Additionally, the operating system dependent module 304 interacts with this module to receive media specific information during initialization.

The media dependent module 310 initiates hardware action in response to various requests received from the operating system 302. Additionally, the media dependent module 310 generates notifications in response to hardware based notifications received from the media or device.

The media dependent module 310 provides information to the network device 312 related to transfer of data including, but not limited to, storage locations of transmit frames/packets, storage locations for receive frames/packet, allocation of interrupts, and the like. One or more descriptor rings located in a host memory can be employed as the storage locations. Additionally, the media dependent module 310 also provides information to the media independent module 308 that facilitates sending and receiving of data (e.g., register locations, device location, network device performance characteristics, and the like). As a result of the provided information, the network device can obtain transmit frames/packets from the storage locations and mitigate or eliminate interruptions and/or interactions of the one or more processors on the host system (e.g., using interrupt requests). Additionally, the network device 312 can place received frames/packets into the storage locations and mitigate or eliminate interruptions of and/or interactions with the one or more processors on the host system.

Figure 4:
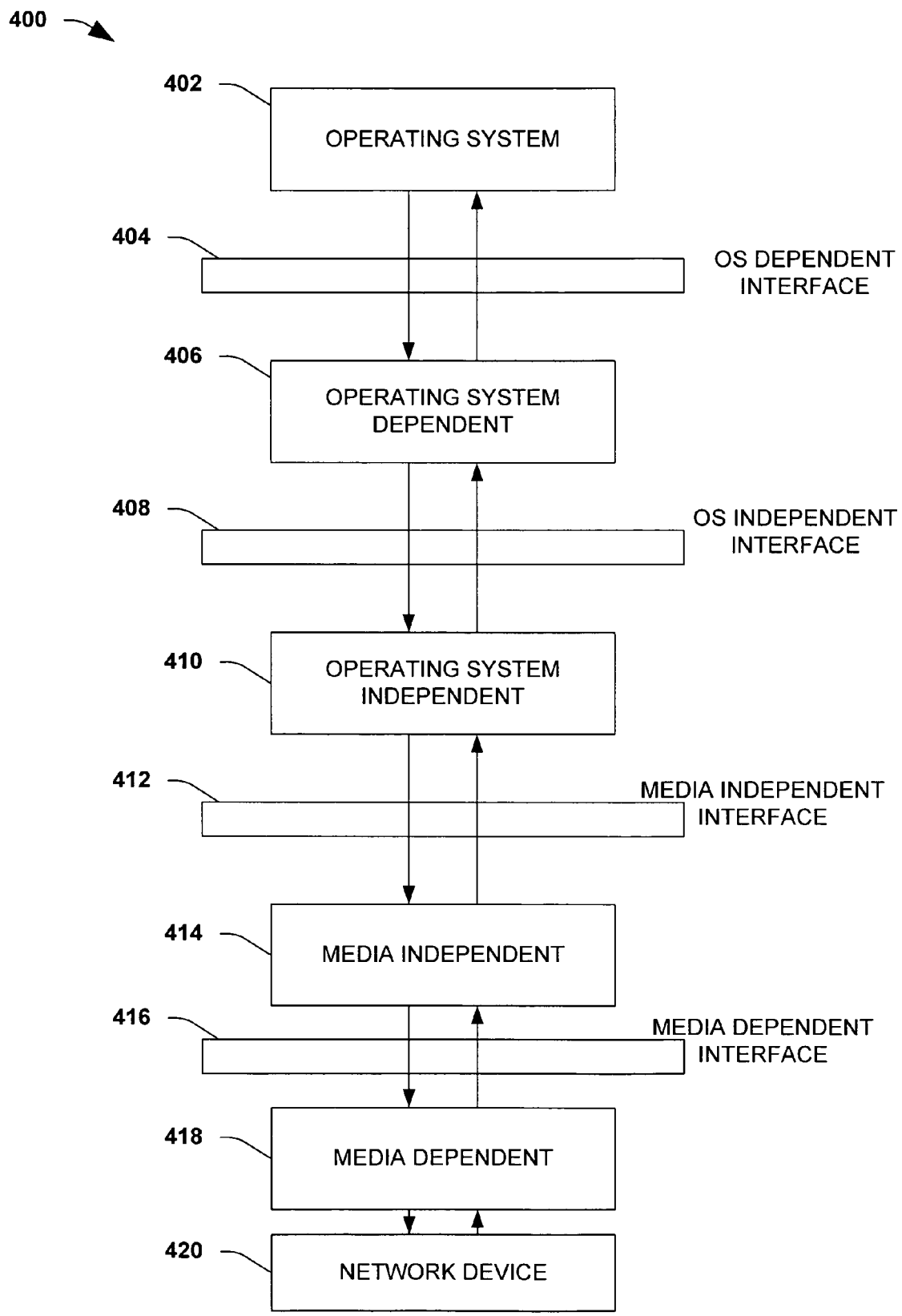
FIG. 4 is a block diagram illustrating a four layered network device driver system in accordance with an aspect of the present invention.

FIG. 4 is a block diagram illustrating a device driver system 400 in accordance with an aspect of the present invention. The system 400 includes four layers or modules: an operating system dependent module 406, an operating system independent module 410, a media independent module 414, and a media dependent module 418. Additionally, the system 400 also includes an operating system dependent interface 404, an operating system independent interface 408, a media independent interface 412, and a media dependent interface 416.

The system 400 creates and manages a software interface to a network device or controller. The system 400 is operable to set up device configuration registers, such as memory mapped configuration registers, and to configure those registers as needed, typically during initialization. The system 400 permits other software (e.g., operating systems) to access I/O resources of the network device for purposes such as, performance tuning, selecting options, statistics collecting, and starting transmissions. Additionally, the system 400 configures and manages data structures employed for normal network device operations, such as, descriptors, descriptor rings, receiver status, buffer areas, and the like that are shared between software and the network device. Descriptor area boundaries are set by the system 400 and are generally maintained during normal operation. Separate descriptor rings, which contain descriptors, are employed for different receive and transmit priority queues. The descriptors contain pointers to network frame data held in buffers in system memory. Receiver status space contains information from the device about the status of the network device and operation. The buffer areas are locations that hold frame data to be transmitted or that accept received frame data. Further, the system 400 is operable to set the network device in operational modes, such as, run, suspend, power saving, and the like.

The operating system dependent module 406 is designed and is operable to interact with a specific operating system via the operating system dependent interface 404. The operating system dependent module 406 receives commands and/or requests from an operating system 402 and translates those commands and/or requests to a format that is independent of the operating system. Generally, the operating system dependent module 406 receives commands and/or requests such as, transfer data, initialize device, load device driver, unload device driver and the like. The operating system dependent module 406 can verify requests and/or commands from the operating system to ensure that they are in proper format. Once verified, the operating system dependent module 406 then translates the commands to the operating system independent format as discussed supra. Subsequently, the commands and/or requests are transmitted to the operating system independent module via the operating system independent interface 404. Additionally, the operating system dependent module 406 is operable to transmit acknowledgments and/or other information to the operating system received from other modules of the system 400. For example, the operating system dependent module 406 can notify the operating system 402 that one or more packets have been received.

The operating system independent module 410 includes functionality that is independent of the operating system on which the system 400 operates. The operating system independent module 410 receives commands and/or requests from the operating system dependent module 410 in an operating system independent format via the operating system independent interface 408. The operating system independent module 410 then initiates processing of these received commands and/or requests. Furthermore, the operating system independent module 410 can transmit acknowledgments and/or other information to the operating system dependent module 406, which in turn informs the operation system. In addition to receiving commands and/or requests from the operating system dependent module 406, the operating system independent module 410 also issues commands to the media independent module 414 via the media independent interface 412.

The media independent module 414 includes functionality that is independent of the media/device that the system 400 supports. The media independent module 414 interacts with the operating system independent module 410 on one side and with the media dependent module 418 on the other side. The media independent module 414 can interact with the media dependent module 418 and obtain media specific information. This obtained information can then be manipulated to form media independent information that can be send to other modules in the system 400.

The media dependent module 418 includes functionality that is specific to the media/device that the driver system 400 supports. The media dependent module 418 interacts with the media independent module on one side and with the device (not shown) on the other. The media dependent module 418 reads card configuration details and services them to the media independent module 414 and the operating system dependent module 404. Additionally, the operating system dependent module 406 interacts with this module to receive media specific information during initialization.

The four layered architecture of the present invention is operable to employ one or more descriptor rings for sending data (transmit descriptor rings), one or more descriptor rings for receiving data (receive descriptor rings), and one or more descriptor rings for receive status (receive status rings). A descriptor ring is basically a physical or logical chunk of memory that is shared between a device (e.g., network device) and software (e.g., operating system, application, and the like) and contains a number of descriptors. As a result, both the software and the device have the ability to read and write this memory. The descriptors, also referred to as message blocks, include control information (e.g., via some special bits) in order to determine current ownership and a pointer to one or more buffers.

The one or more transmit descriptor rings are employed by the software to fill buffers with data that it wants the network device to transmit. Generally, when one or more buffers are filled with data (e.g., a frame), ownership of the corresponding descriptor is relinquished so that the network device can take ownership and transmit the data. Multiple transmit descriptor rings facilitate priority service. Similar to the one or more transmit descriptor rings, the one or more receive descriptor rings are employed by the network device to fill buffers with data that have been received. When one or more buffers are filled with data, ownership of the corresponding descriptor is relinquished so that the software can take ownership and process the received data. Status information is written to an appropriate receive status ring. The setting and unsetting of ownership can be accomplished by utilizing system interrupts. Additionally, multiple receive descriptor rings can facilitate priority service wherein individual rings correspond to a class or priority level of service.

Figure 5:
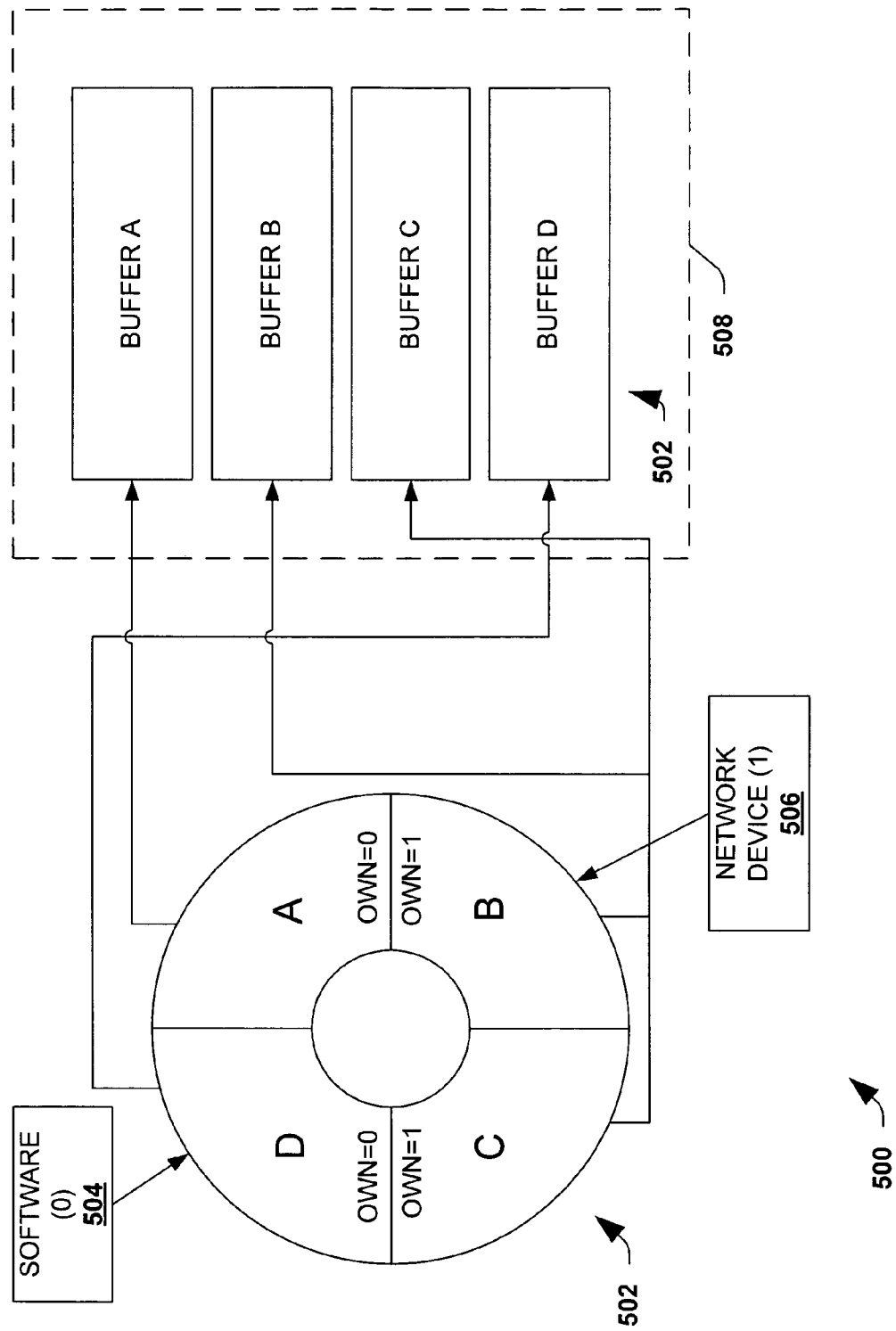
FIG. 5 is a block diagram illustrating an exemplary descriptor ring system in accordance with an aspect of the present invention.

FIG. 5 is a block diagram illustrating an exemplary descriptor ring system 500 in accordance with an aspect of the present invention. The system is presented for illustrative and exemplary purposes. The system 500 can be employed as a transmit descriptor ring and/or as a receive descriptor ring. The system 500 includes a descriptor ring 502, a software component 504, a network device 506, and system memory 508. The software component 504 is software executed by a process including, but not limited to, an operating system, user application, device driver, and the like.

The descriptor ring 502 is depicted with four descriptors, A, B, C, and D that individually include ownership status and include pointer(s) to one or more buffers 510 in the system memory 508. However, it is appreciated that the present invention is not limited to a specific number of descriptors. Descriptors A and D are currently "owned" by the software 504 and descriptors B and C are currently "owned" by the network device 506. Accordingly, the software component 504 can access buffer A and buffer D whereas the network device 506 can access buffer B and buffer C. The buffers 510 contain data or packets of information, mandatory parameters, optional parameters, and the like.

A four layer device driver in accordance with the present invention interacts with other software layers of a host computer (e.g., operating system) in order to transmit and receive data. Thus, on transmitting data, an operating system "furnishes" data to the device driver along with header information and optional parameters and on receiving data, the operating system "receives" data from the device driver along with header information and optional parameters. However, it is desirable to avoid physically copying data from one location to another. A format or data structure that the present invention employs is a message block, which can mitigate physical transfer of data.

Figure 6:
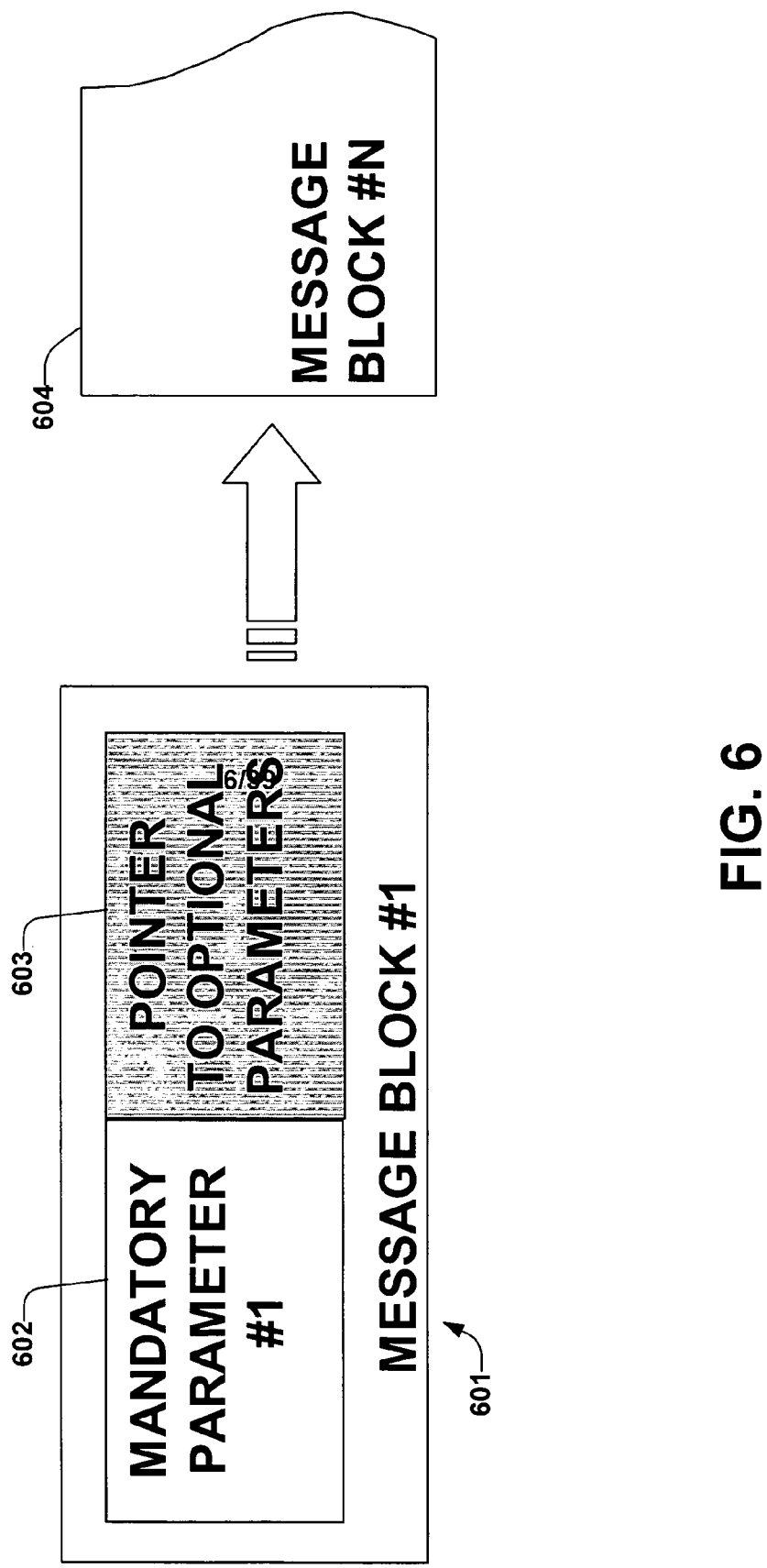
FIG. 6 is a diagram illustrating an exemplary message block format in accordance with an aspect of the present invention.

Turning now to FIG. 6, a diagram illustrating an exemplary message block format 600 in accordance with an aspect of the present invention is provided. The depicted format 600 is illustrative in nature and illustrates one of many possible suitable message block formats for use with the four layered device driver architecture in accordance with the present invention. Generally, application software generates or requests data associated with the message block and other software layers obtain and generate header information, including encryption and verification information, associated with the packet data.

The format 600 is depicted with a first message block 601, which includes a mandatory parameter 602 and a pointer to optional parameters 603. The mandatory parameter 602 is described in detail in the next drawing, but generally comprises pointers to virtual data buffers that contain packet data and header information. The pointer to optional parameters 603 can point to void, NULL or an empty location thereby indicating that no optional parameters are present. Alternately, the pointer to optional parameters can point to a memory location or space that contains one or more optional parameters. A more detailed description of the optional parameters is also provided infra.

The first message block 601 is generally associated with one or more other message blocks 604 as a group of associated message blocks. The group typically has identical or similar header information and can be coalesced or combined in order to improve performance and/or memory utilization.

Figure 7:
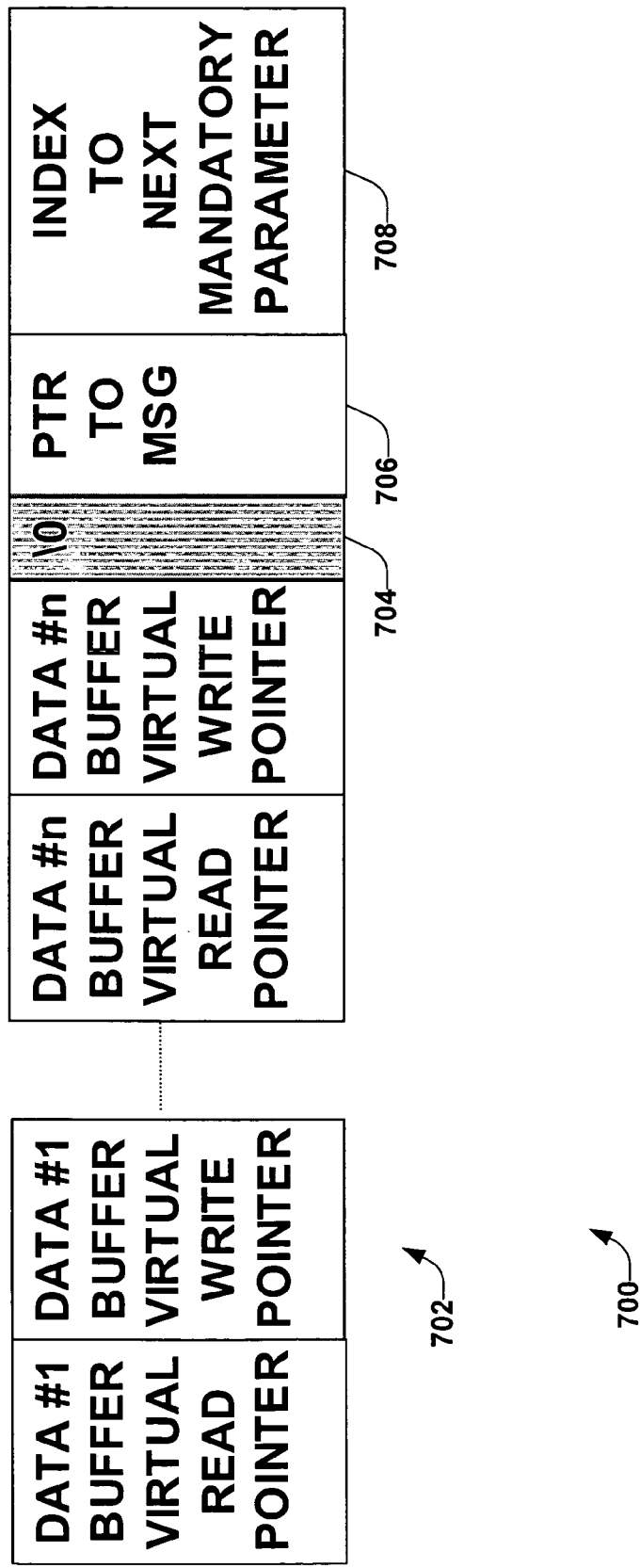
FIG. 7 is a block diagram illustrating a mandatory parameter format in accordance with an aspect of the present invention.

FIG. 7 is a block diagram illustrating a mandatory parameter format 700 in accordance with an aspect of the present invention. This format is exemplary in nature and serves to illustrate a suitable mandatory parameter format in accordance with the present invention.

The parameter format 700 includes a plurality of data buffer virtual read/write pointer pairs 702, a terminator character 704, a message pointer 706, and an index to a next mandatory parameter 708. The plurality of virtual pointer pairs 702 provide read/write access to a plurality of data buffers in system memory space. The terminator character 704 marks the end of the pointer pairs 702 and thus facilitates having a variable number of pointer pairs 702. The message pointer 706 provides a pointer to the memory location at which a message block is stored. The parameter format 700 limits the plurality of pointer pairs 702 to a fixed maximum number of pairs. Thus, if a frame requires more data buffers, the index pointer 708 is employed to provide access to additional data buffers by referencing a next mandatory parameter that includes additional pointers to data buffers. The index pointer 708 can be set with a NULL in the event that a next mandatory parameter is not present.

Figure 8:
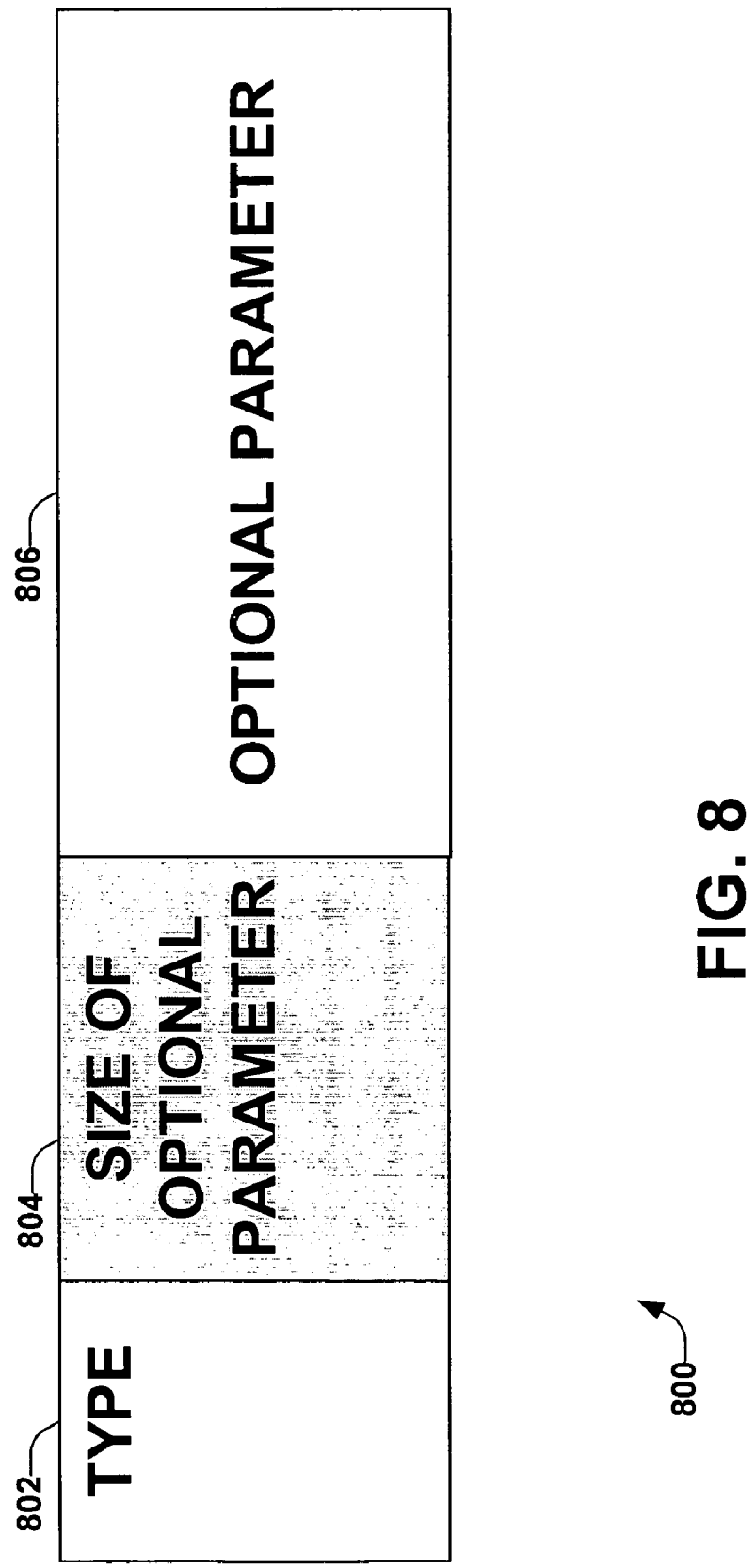
FIG. 8 is a block diagram illustrating an optional parameter format in accordance with an aspect of the present invention.

Continuing with FIG. 8, a block diagram illustrating an optional parameter format 800 in accordance with an aspect of the present invention is depicted. The format 800 includes a parameter type 802, a size of optional parameter 804, and an optional parameter field 806. The parameter type 802 indicates a type for the optional parameter, such as, VLAN, IP header checksum, TCP checksum, UDP checksum, security associations, header information, and the like. The size 804 yields a storage size or byte size of the optional parameter 806. The size 804 is employed because some parameters can have varying sizes. The optional parameter field 806 includes all of the data and information for the parameter and can be parsed according to the parameter type 802 and the size of parameter 804.

Receive Operation of Device Driver

Figure 9:
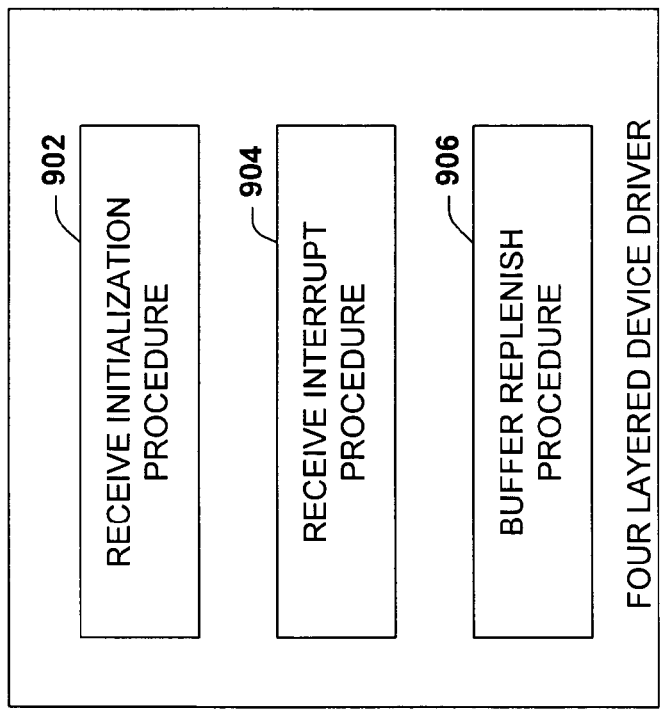
FIG. 9 is a block diagram illustrating three functions of the layered device driver in accordance with an aspect of the present invention.

To receive data or information, the four modules or layers discussed supra operate in a coordinated fashion. For receive operations, there are three basic functions performed by the device driver in accordance with the present invention. FIG. 9 is a block diagram illustrating the three basic functions performed by the device driver 900 comprising a receive initialization procedure 902, a receive interrupt procedure 904, and a buffer replenish procedure 906. A number of queues, an adapter queue, a leaky queue, a duplicate queue, and a free queue are employed for receive operations by the device driver. The queues are operative to store and maintain the data structures described below. An example of the queue operation is provided below.

Figure 10:
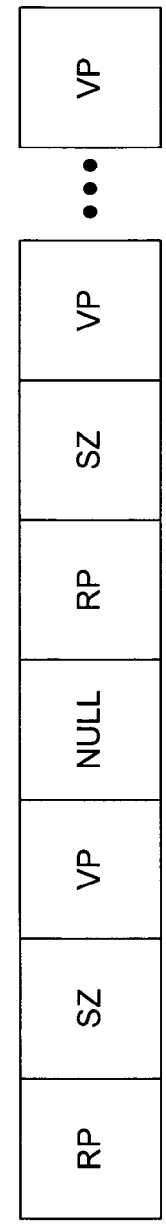
FIG. 10 is a diagram illustrating an exemplary data structure employed by an operating system dependent module in accordance with an aspect of the present invention.

As stated above, the four layered device driver comprises an operating system independent module, an operating system independent module, a media independent module, and a media dependent module. The receive initialization procedure 902 initializes various data structures within the four modules and associated with the four modules. For the operating system dependent module, memory for receive descriptors is allocated and an array of read pointers are initialized. As a result, the operating system dependent module defines and maintains an array of read pointers or data structures as illustrated in FIG. 10. This structure includes a read pointer (RP), a size (SZ), and a void pointer (VP), which is used to free the message block.

Figure 11:
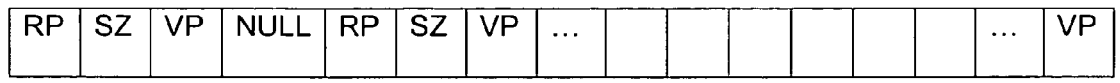
FIG. 11 is a diagram illustrating an exemplary data structure employed by an operating system independent module in accordance with an aspect of the present invention.

The operating system independent module converts each virtual address of the read pointers to physical memory addresses. Thus, each read pointer has a separate physical address in the operating system independent module. The output of the operating system independent module is an array of physical address read pointers that may or may not be contiguous. FIG. 11 illustrates a representation of the array of physical address read pointers in accordance with an aspect of the present invention. This format of FIG. 11 is similar to that illustrated in FIG. 10, however the read pointer (RP) is a pointer to a physical address instead of a virtual address.

The media independent module is operative to populate one or more receive descriptors with the array elements. As described supra, the network driver places received data in data buffers referenced by receive descriptor rings, which comprise a fixed number of descriptors. A void pointer (pointer to a message block) can be filled in a user space provided, for example, in a chipset.

Referring again to FIG. 9, the receive interrupt procedure 904 processes receive interrupts generated by a network device on receiving one or more frames. The media independent module is the interrupt entry point. Thus, on generation of an interrupt, processing of that interrupt begins with the media independent module. The media independent module calls the media dependent module which accesses and interprets data referenced by one or more receive descriptors that correspond to one or more entries in an adapter queue. After the media dependent module has completed its operation, the operating system dependent module is called to send the message upstream to the operating system.

Figure 12:
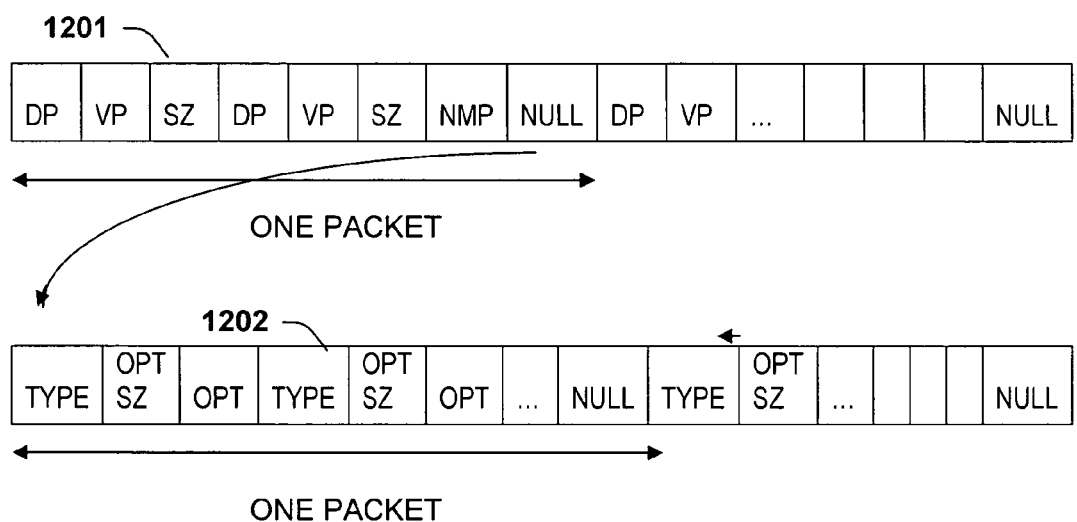
FIG. 12 is a diagram illustrating an exemplary data structure employed by a media independent module in accordance with an aspect of the present invention.
Figure 13:
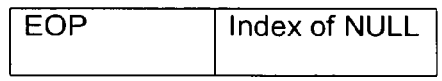
FIG. 13 is a diagram illustrating an exemplary data structure for optional parameters in accordance with an aspect of the present invention.

An array type data structure is employed by the media independent module and the media dependent module that consists of void pointers, the size of the data buffers for the descriptor(s), and a virtual address of the data. FIG. 12 illustrates one such exemplary array employed in the media independent module and the media dependent module in accordance with an aspect of the present invention. The media dependent module fills in portions of the array, including pointers to data buffers containing the received data. The media independent module, on receiving this array 1201, fills in the NULL pointer with its own array 1202 that consists of optional parameters and size. It can also contain a virtual address of the data. As such, the array 1201 includes a physical address of a data block (DP), a void pointer (VP) that is used to free the buffers, followed by a size of the buffer (SZ), a next mandatory pointer (NMP) that refers to the index of the next mandatory pointer, and a NULL pointer. On receiving this array, the media dependent module would fill in the NULL pointer with its own array of optional parameters and size to generate an array 1202 for the media dependent module. The optional parameters are present within this structure because the media dependent module is the only module that can properly process optional elements, at least in some aspects of the invention. FIG. 13 illustrates an exemplary data structure for maintaining the optional parameters in accordance with an aspect of the present invention.

This resulting array is an array properly in the format of the array present in the operating system independent module in a transmit routine. This array is then passed to the operating system independent module where a TCP checksum or other type of error checking is performed and/or calculated. Then, the array is passed to the operating system dependent module where buffers are sent to a free pool from where they are replenished to an adapter queue. This mechanism is operable when the operating system supports a call to convert a physical address of data into a virtual address. If the operating system does not provide such support, the virtual address of the data pointer is also passed with the array.

Turning again to FIG. 9. a buffer replenish procedure 906 replenishes buffers for the adapter queue and reallocates used data buffers. Generally, the buffer replenish procedure 906 attempts to ensure that data buffers are available for incoming receive frames. Data buffers freed by the operating system dependent module are placed back in the adapter queue for future receive frames.

Figure 14:
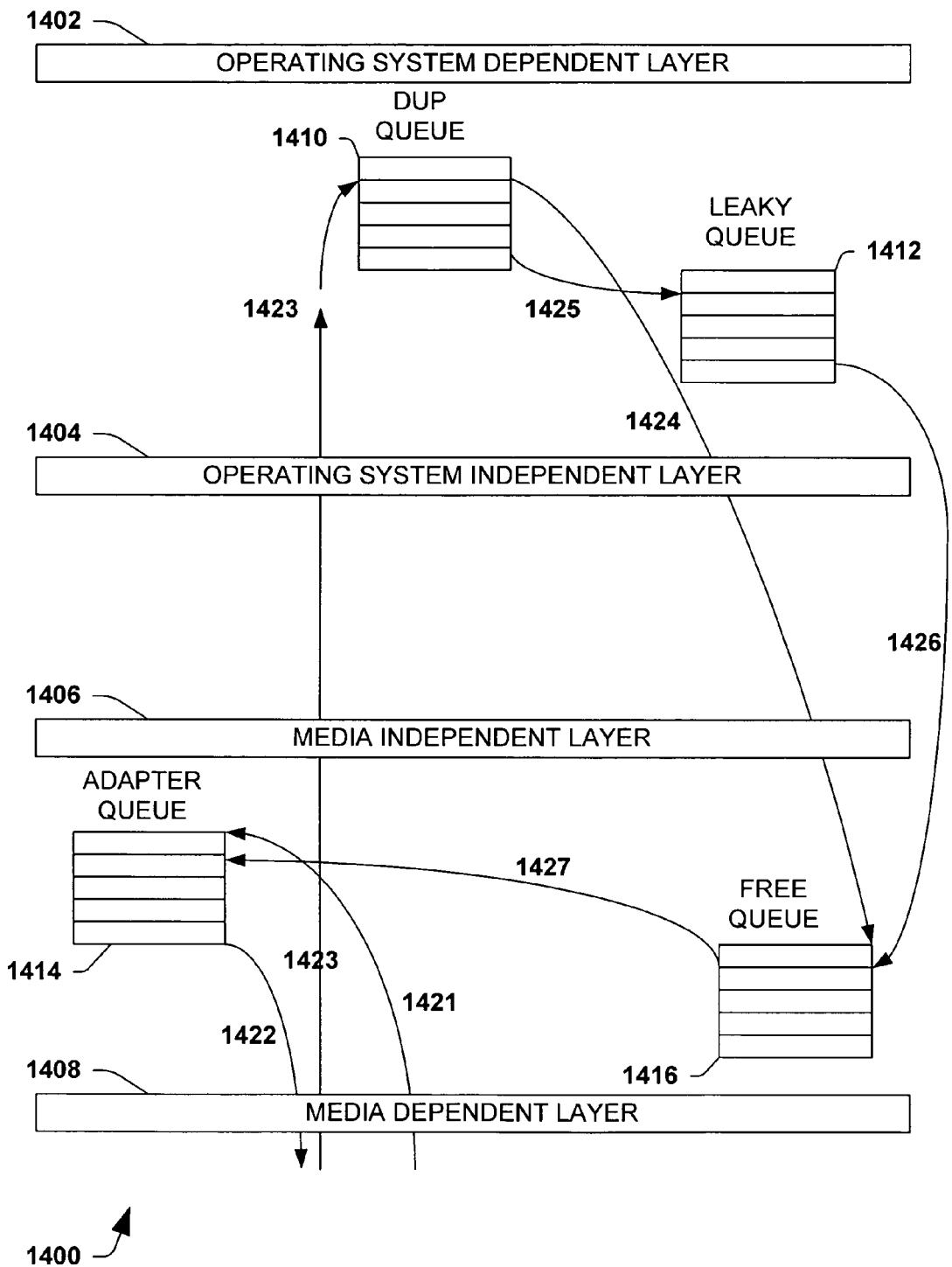
FIG. 14 is a block diagram illustrating an exemplary buffer replenish procedure in accordance with an aspect of the present invention.

FIG. 14 illustrates an exemplary, suitable buffer replenish procedure for a four layer architecture 1400 in accordance with an aspect of the present invention. The architecture 1400 include an operating system dependent layer 1402, an operating system independent layer 1404, a media independent layer 1406, and a media dependent layer 1408, that operate substantially as described supra. Additionally, the architecture includes a duplicate queue 1410, a leaky queue 1412, an adapter queue 1414, and a free queue 1416.

At 1421, a packet is received and is placed in the adapter queue 1414. Once received, the media independent module passes the received packet to the media dependent module in the form of an array at 1422. Subsequently, the media dependent module obtains and analyzes status information for the received packet. The media dependent module duplicates the packet by providing the packet to the duplicate queue 1410 and thereby made available to the operating system dependent layer 1402. Such duplication reduces "memory copying". A handler for the packet/message block is retained by the media dependent module so that the message block can be reused when other layers free the packet/message block. Once the packet has been duplicated (e.g., placed in the duplicate queue 1410) and obtained by the operating system dependent module 1402, the operating system dependent module removes the packet/message block from the adapter queue 1414. The operating system dependent module can then return the data buffers from the duplicate queue 1410 that were storing the packet to the free queue 1416 at 1424. Typically, this reallocation involves a copy of buffers from the free queue to the adapter queue.

If the received packet is identified as having errors at 1425, the buffers storing the packet in the duplicate queue 1410 are moved to the leaky queue 1412. Those buffers are not immediately freed. Additionally error processing and/or a corrective action is performed for the packet and then, the buffers are moved at 1426 from the leaky queue to the free queue 1416. Then, at 1427 buffers from the free queue 1416 are moved to the adapter queue 1414 in order to replenish the adapter queue 1414.

Turning now to FIG. 15, a diagram illustrating exemplary queue formats 1500 in accordance with an aspect of the present invention is depicted. These formats are considered to be exemplary in nature and are not intended to limit the scope of the present invention. Accordingly, it is appreciated that variations in these queues, different numbers of queues, and different queues can be present and still be in accordance with the present invention.

A first exemplary queue is an adapter queue 1502, which is where received packets are placed. Thus, the adapter queue 1502 is essentially an array of receive descriptors. Another exemplary queue is a duplicate queue 1504, which reduces memory copying. The duplicate queue 1504 includes a void pointer, data pointer (virtual address VA), and size. Yet another exemplary queue is a free queue 1506, which holds "available" buffers or storage areas. Buffers are placed in the free queue 1506 when they are no longer used and available for new storage. The free queue 1506 replenishes the adapter queue 1502 dynamically so as to have enough available buffer space for incoming packets/data. The free queue is essentially an array of receive descriptors. Another exemplary queue is a leaky queue 1508 that is employed to hold packets that have errors. Thus, a packet that has an error can be transferred from the adapter queue 1502 to the leaky queue 1508 freeing up space on the adapter queue 1502 instead of simply freeing the buffer(s) storing the packet. Separate error processing can be performed on the data/packets in the leaky queue 1508. The leaky queue 1508 is an array of structures consisting of a void pointer, data pointer, and size.

Figure 16:
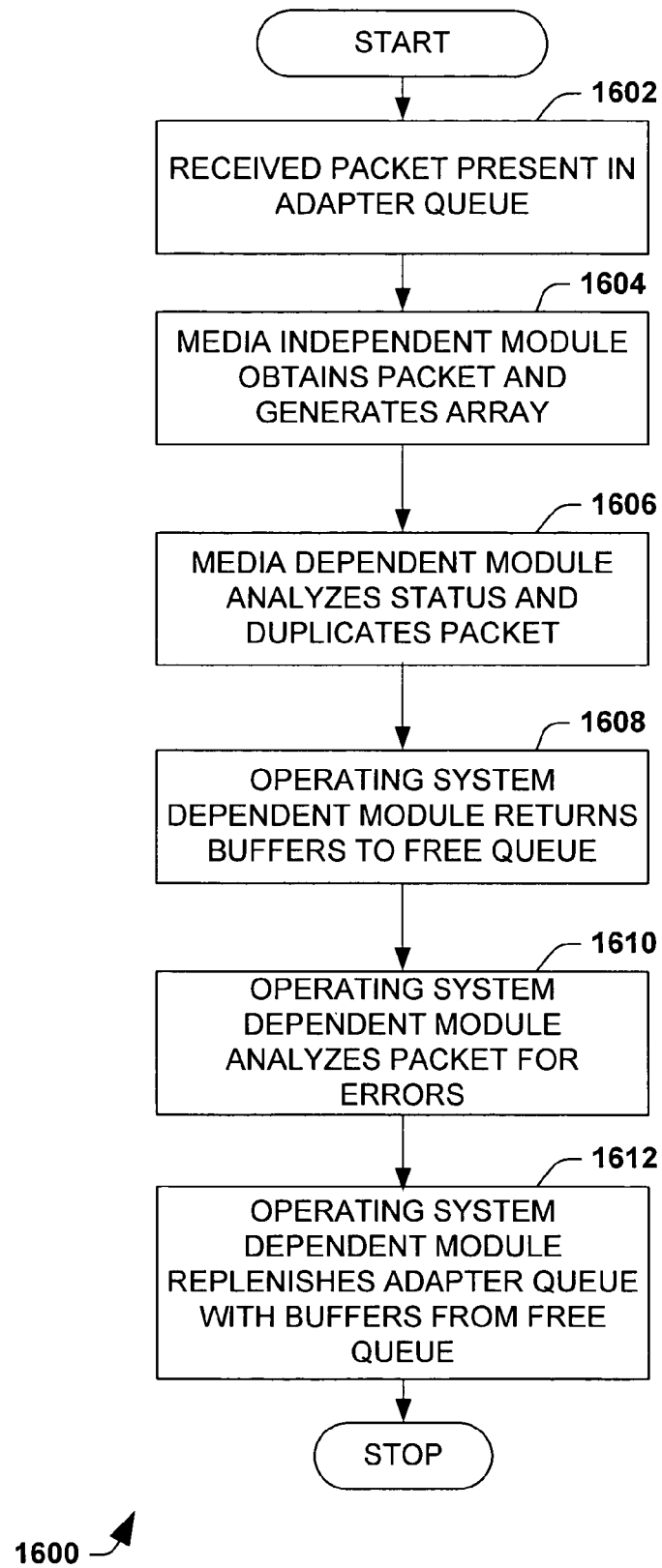
FIG. 16 is a flow diagram illustrating a method of receiving data in accordance with an aspect of the present invention.

Turning now to FIG. 16, a flow diagram of a method 1600 of receiving data using the four layered driver architecture in accordance with an aspect of the present invention is illustrated. The method 1600 employs and/or interacts with a network device, a receive descriptor ring(s), and an operating system. The receive descriptor ring includes a number of receive descriptors, which individually reference one or more buffers (e.g., locations in memory). A number of available buffers are present and attached to queues including an adapter queue, a duplicate queue, a free queue, a leaky queue. The buffers present in the adapter queue are attached and correspond to one of the receive descriptors. The adapter queue is ordered such that the first entry of the adapter queue is the next receive descriptor.

A continuous pool of memory is allocated for received data and is organized into a pool of the available data buffers. These buffers are initialized to particular values and sizes as described supra. For the receive operation, each entry of the adapter queue and descriptor point to a fixed sized data buffer which is set to a maximum value for received frames. The available data buffers are initially placed in or assigned to a free queue and are subsequently attached to typically all of the receive descriptors of one or more receive descriptor rings. Virtual addresses for the buffers are converted to physical addresses, which are then placed in the receive descriptors. A separate queue can be employed for storing the virtual addresses of these buffers and received packets or frames.

On receiving a packet or frame, the network device accesses a receive descriptor on the receive descriptor ring(s) and stores the packet (e.g., via a direct memory access operation) into one or more buffers pointed to by the descriptor. Once written, an interrupt or another suitable signaling mechanism is employed to notify the device driver that a packet has been received. Further, the network device can write to a predetermined space in memory that the packet has been received so that the device driver is not required to poll or read registers on the device in order to know which receive descriptors have been used for receive frames. Additionally, the one or more buffers are placed in an adapter queue such that each entry in the queue corresponds to one receive frame. Additional frames can be received and placed in the adapter queue prior to existing entries in the queue being at least partially processed by the device driver.

The method 1600 begins at 1602 where a received packet is present in the adapter queue. An entry of the adapter queue as well as the receive descriptor indicates where the packet is located in memory (the address associated with one or more data buffers). A media independent module (e.g., operating in response to an interrupt) passes the received packet to a media dependent module in an array format at 1604, such as described supra. On receiving the packet in array format, the media dependent module analyzes status information of the packet, duplicates the packet and sends the packet to a next layer (e.g., operating system independent module, operating system dependent module, ...) at 1606. The media dependent module duplicates the packet by inserting an entry into a duplicate queue thereby avoiding a memory copy operationg. The media dependent module retains a handler to the received packet and thereby can reuse it when freed by other, upper layers.

Once the received packet has been duplicated and passed to an operating system, an operating system dependent module removes the reference of the corresponding data block from the receive descriptor and the adaptor queue. The operating system dependent module attaches one or more buffers from the free queue to the receive descriptor in order to replace the buffers used to store the received packet. The operating system dependent module continues to monitor the buffers until the operating system indicates that the buffers are no longer in use and then the operating system dependent module returns the buffers used for the packet to the free queue at 1608 so that they can be reused.

The operating system dependent module analyzes the packet for errors and if the packet has errors, the buffers are placed in a leaky queue at 1610 by the operating system dependent module. The operating system dependent module checks for errors by checking status parameters of the packet for errors such as, checksum errors, encryption errors, and the like. The packet can be forwarded to the operating system for further processing. Eventually, processing of the packet is completed and the buffers for the packet are removed from the leaky queue and added to the free queue by the operating system dependent module. At 1612, buffers from the free queue are employed to replenish the adapter queue. Thus, ownership of the buffers is given to the network device thereby permitting the network device to store incoming data/packets in them.

Figure 17:
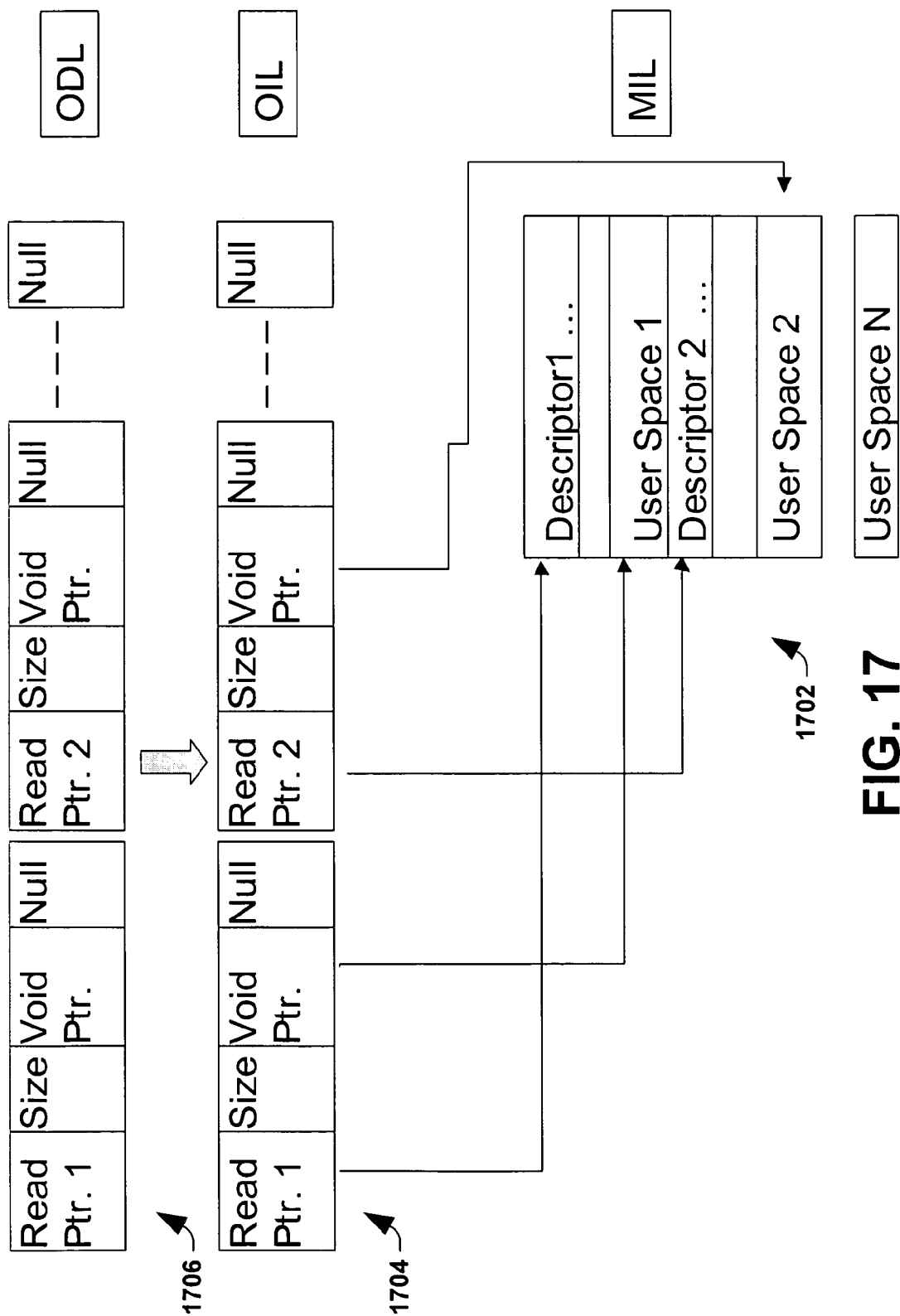
FIG. 17 is a diagram illustrating exemplary data structures employed during receive operations in accordance with an aspect of the present invention.

FIG. 17 is a diagram illustrating data structures employed by a device driver during receive operation and their relationship to receive descriptors in accordance with an aspect of the present invention. A media independent module has access to a number of receive descriptors 1702. An operating system independent module employs an array like data structure 1704 that includes a read pointer and a void pointer. The read pointer maps to one or more data buffers identified by the receive descriptor and the void pointer maps to user space and can include parameters such as optional parameters. An operating system dependent module employs an array like data structure 1706 similar to that employed by the operating system independent module.

Figure 18:
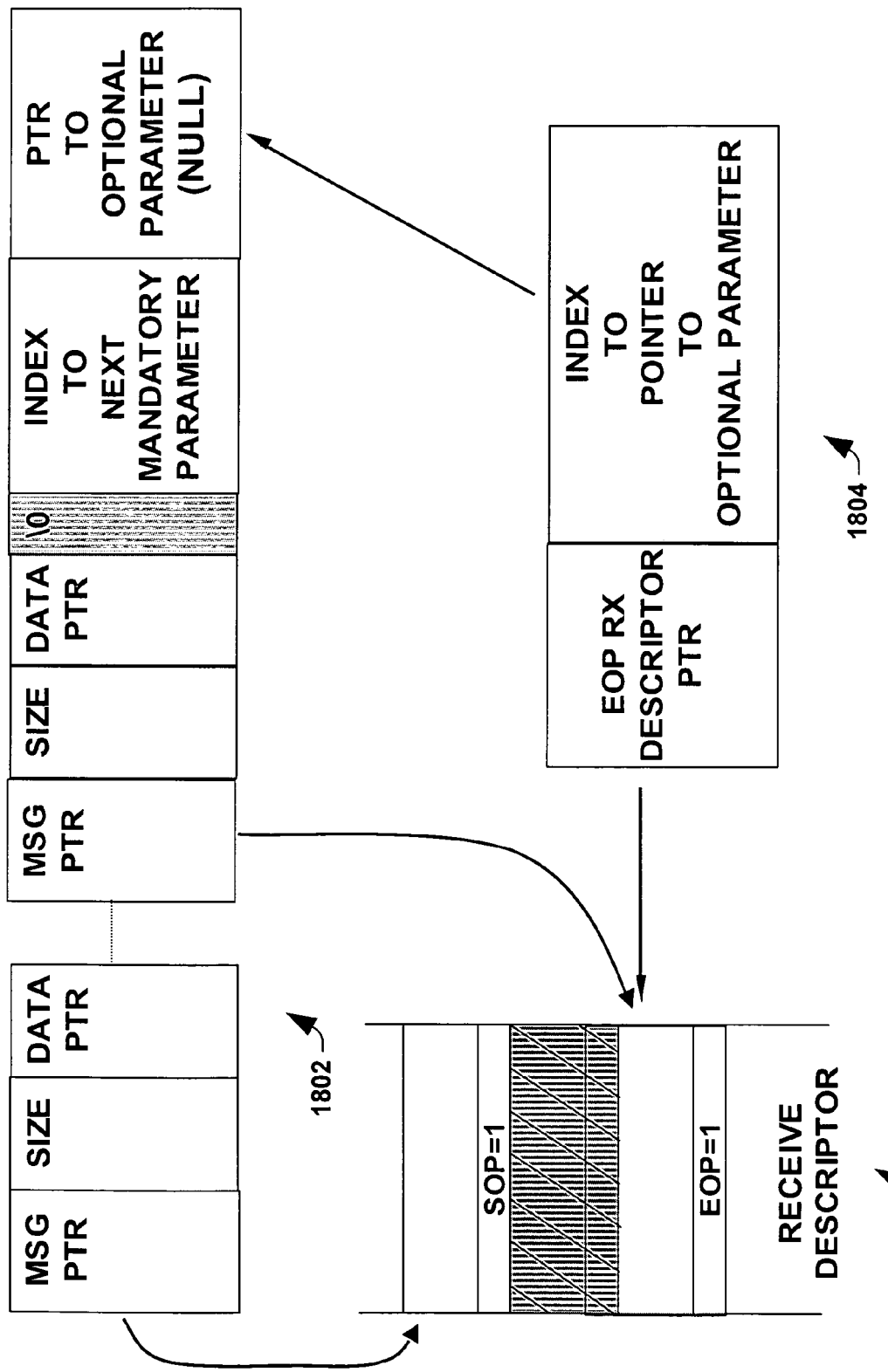
FIG. 18 is a diagram illustrating a relationship of receive descriptors with employed data structures in accordance with an aspect of the present invention.

FIG. 18 is a diagram illustrating a relationship of receive descriptors with data structures employed by the four layered device driver in accordance with the present invention. A receive descriptor 1801 and a data structure 1802 used by an operating system independent module and an operating system dependent module are depicted. Additionally, optional parameters 1804 that can be present in the receive descriptor 1801 are also depicted. Pointers to data buffers of the receive descriptor 1801, beginning at SOP=1 (start of parameter) and ending at EOP=1 (end of parameter), are mapped to pointers to data buffers in the data structure 1802, also referred to as a mandatory parameter. If another frame is associated with this particular descriptor, a reference is made in a next mandatory parameter of the data structure 1802. The optional parameter 1804 is obtained from optional or user space of the receive descriptor 1801.

Figure 19:
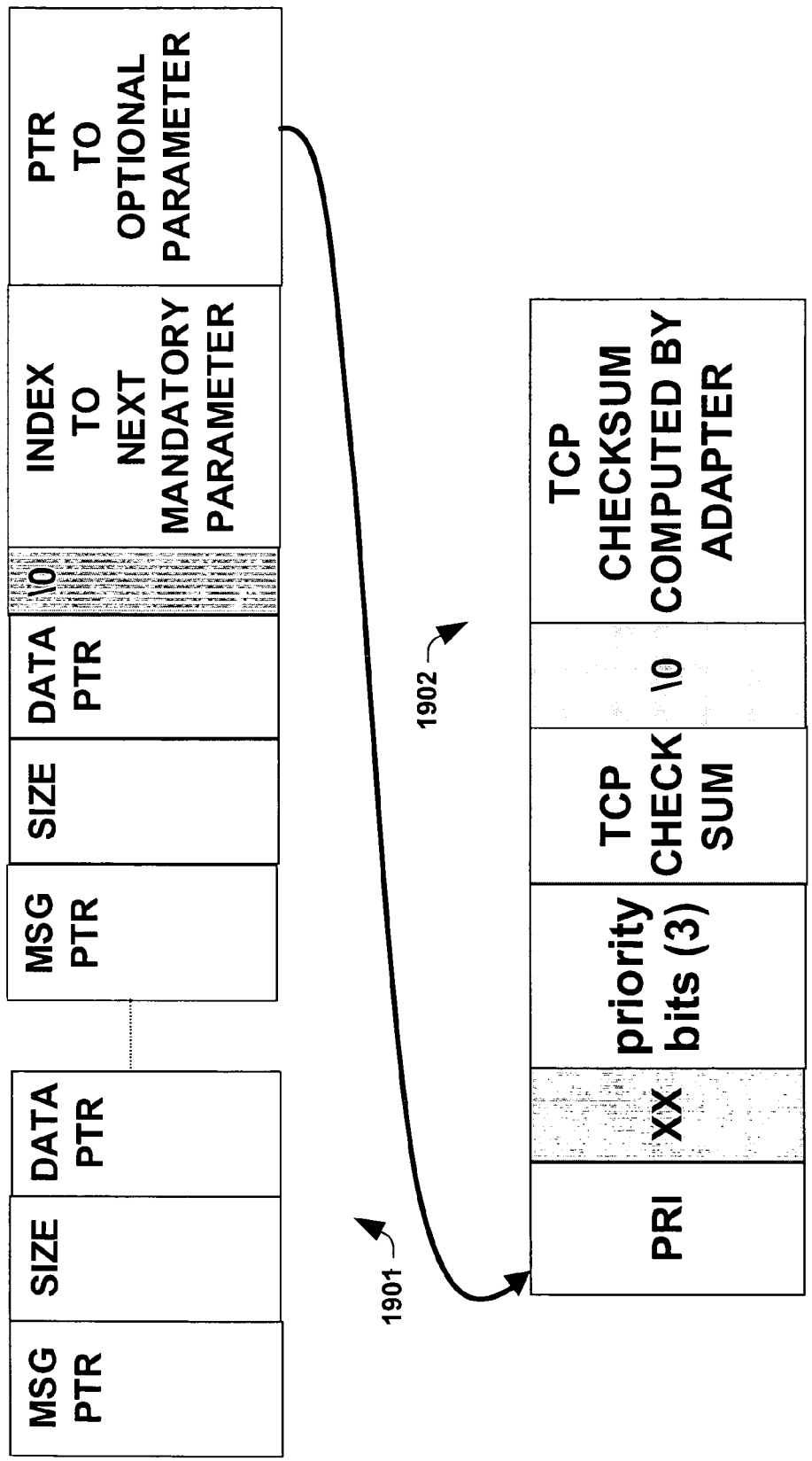
FIG. 19 is a diagram illustrating an exemplary data structure employed during receive operations in accordance with an aspect of the present invention.

FIG. 19 is a diagram illustrating an exemplary data structure 1900 employed by the four layered device driver during receive operation in accordance with an aspect of the present invention. This data structure 1900 is employed by the operating system dependent module and the operating system independent module in receive operation. A message block 1901 includes one or more pointers to data buffers that contain data for a received frame and optionally includes a pointer to optional parameters. An optional parameter block 1902 comprises one or more optional parameters. The pointer to optional parameters of the message block 1901 points to or references the optional parameter block 1902.

Transmit Operation of Device Driver

Figure 20:
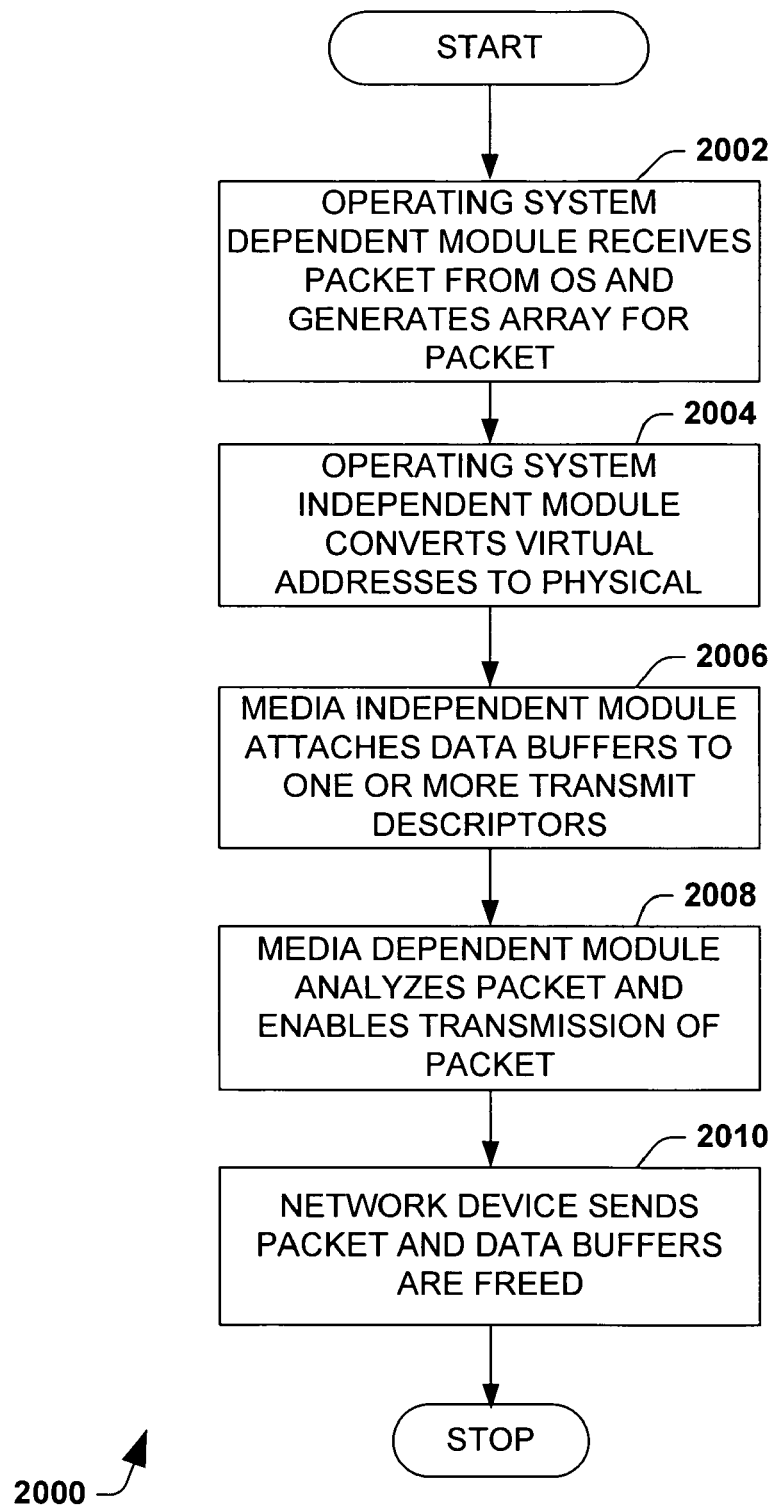
FIG. 20 is a flow diagram illustrating a method of transmitting data in accordance with an aspect of the present invention.

FIG. 20 is a flow diagram illustrating a method 2000 of transmitting data in accordance with an aspect of the present invention. The method 2000 employs and/or interacts with a network device, one or more transmit descriptor rings, and an operating system. The transmit descriptor ring(s) includes a number of transmit descriptors, which are operable to reference one or more buffers (e.g., locations in memory). The method 2000 receives packets from the operating system and sends the packets to a network via the network device. A four layered architecture employs a send queue and stores packets from the operating system in the send queue. Packets are handled by the device driver architecture, assembled into transmit frames and attached to the transmit descriptors. Once attached, the network device is able to transmit the packets.

A continuous pool of memory is allocated for data to be transmitted and is organized into a pool of the available buffers in the send queue. Packets received from the operating system are placed into the send queue and processed in order. However, some packets, typically those of shorter length, can be coalesced to avoid unnecessary operations.

The method 2000 is described in terms of a single packet for illustrative purposes. However, it is appreciated that the present invention includes transmission of any suitable number of packets. The method 2000 begins at block 2002 where a packet or message block, which includes the packet along with other information, is received by the operating system dependent module from the operating system. The packet typically stored in one or more data buffers located in memory and may be copied into one or more other data buffers and virtual address of the one or more data buffers are inserted as an entry into the send queue as an array of elements. The packet, now stored in one or more data buffers, includes header information (e.g., destination address, source address, and the like) as well as data. Generally, the header information is stored at the front of the packet. Additionally, the message block includes optional parameter(s) and mandatory parameters received from the operating system. The optional elements or parameters of the message block include pointers to parameters such as, a VLAN tag, packet priority, CFI, routing tag, compute checksum flag, and the like.

The operating system independent module operates on the array of elements and converts virtual addresses of the data buffers into physical addresses at block 2004. The operating system independent module identifies physically contiguous data buffers and can, therefore, replace a number of virtual pointers with a single physical pointer and a corresponding size. As a result, the number of physical pointers can be substantially less than the number of virtual pointers. Additionally, the operating system independent module computes a checksum (if so indicated) and updates the TCP header for the message block and appends the TCP header to the array.

FIG. 21 is a block diagram illustrating the array of elements or data structure generated by the operating system dependent module and the operating system independent module in accordance with an aspect of the present invention. A first entry 2101 is the array of elements generated by the operating system dependent module. The entry 2101 includes a number of virtual pointers 2102, a terminator element 2103, a pointer to a message block 2104 and an index to a next mandatory parameter. A second entry 2110 is the array of elements generated by the operating system independent module. Instead of the number of virtual pointers, the entry 2111 includes pairs of physical pointers and size parameters 2112, a terminator element 2113, a pointer to a message block 2114 and an index to a next mandatory parameter 2115.

Figure 22:
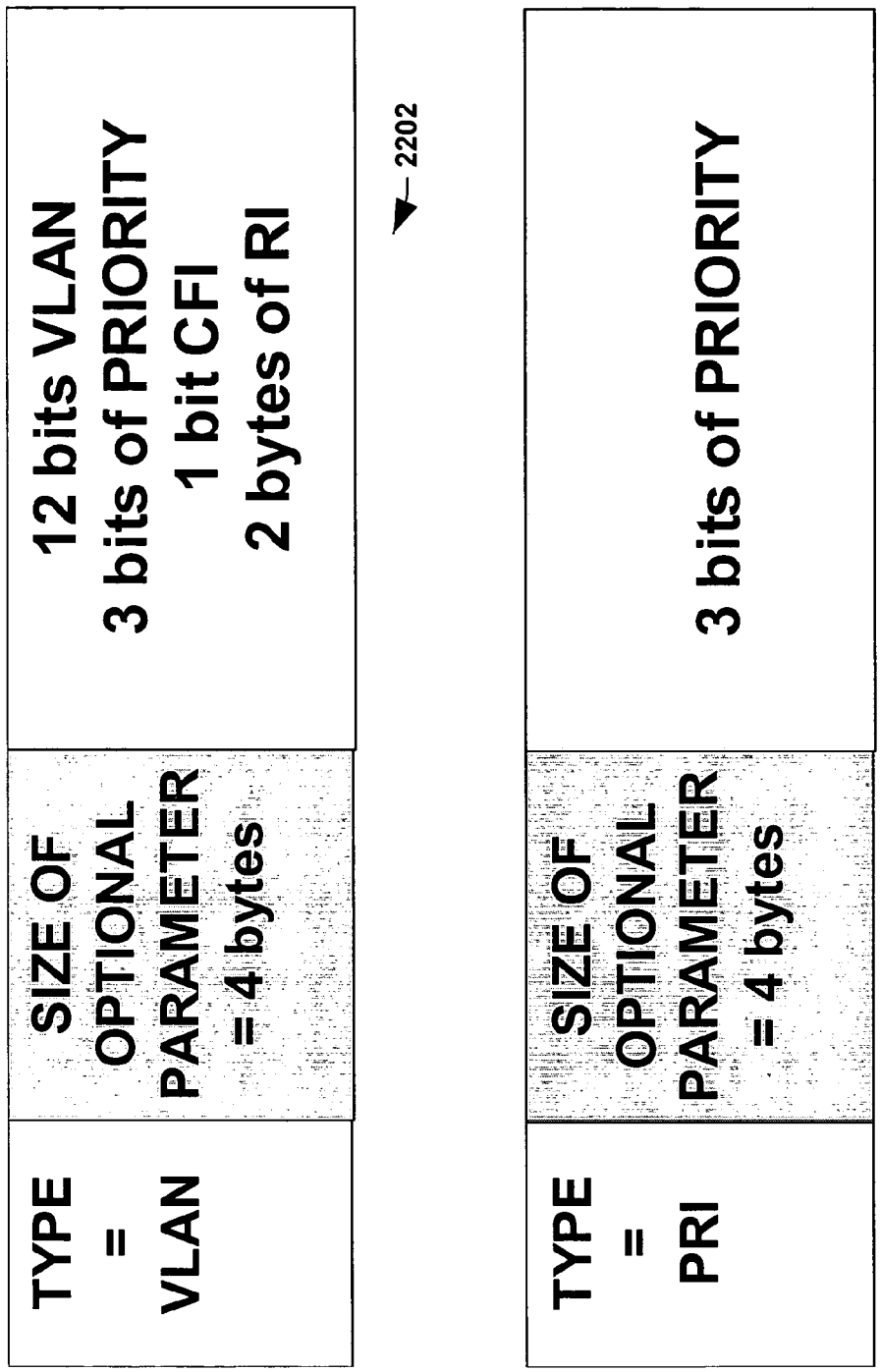
FIG. 22 is a block diagram illustrating exemplary optional parameters generated during transmit operations in accordance with an aspect of the present invention.

FIG. 22 is a block diagram illustrating exemplary optional parameters generated by the operating system dependent module in accordance with an aspect of the present invention. A first exemplary option 2201 is for a virtual local area network (VLAN) having a size of 4 bytes, 12 bits for VLAN, 3 bits for priority, 1 bit CFI, and 2 bytes of RI. A second exemplary option 2202 is for a priority optional parameter.

Figure 23:
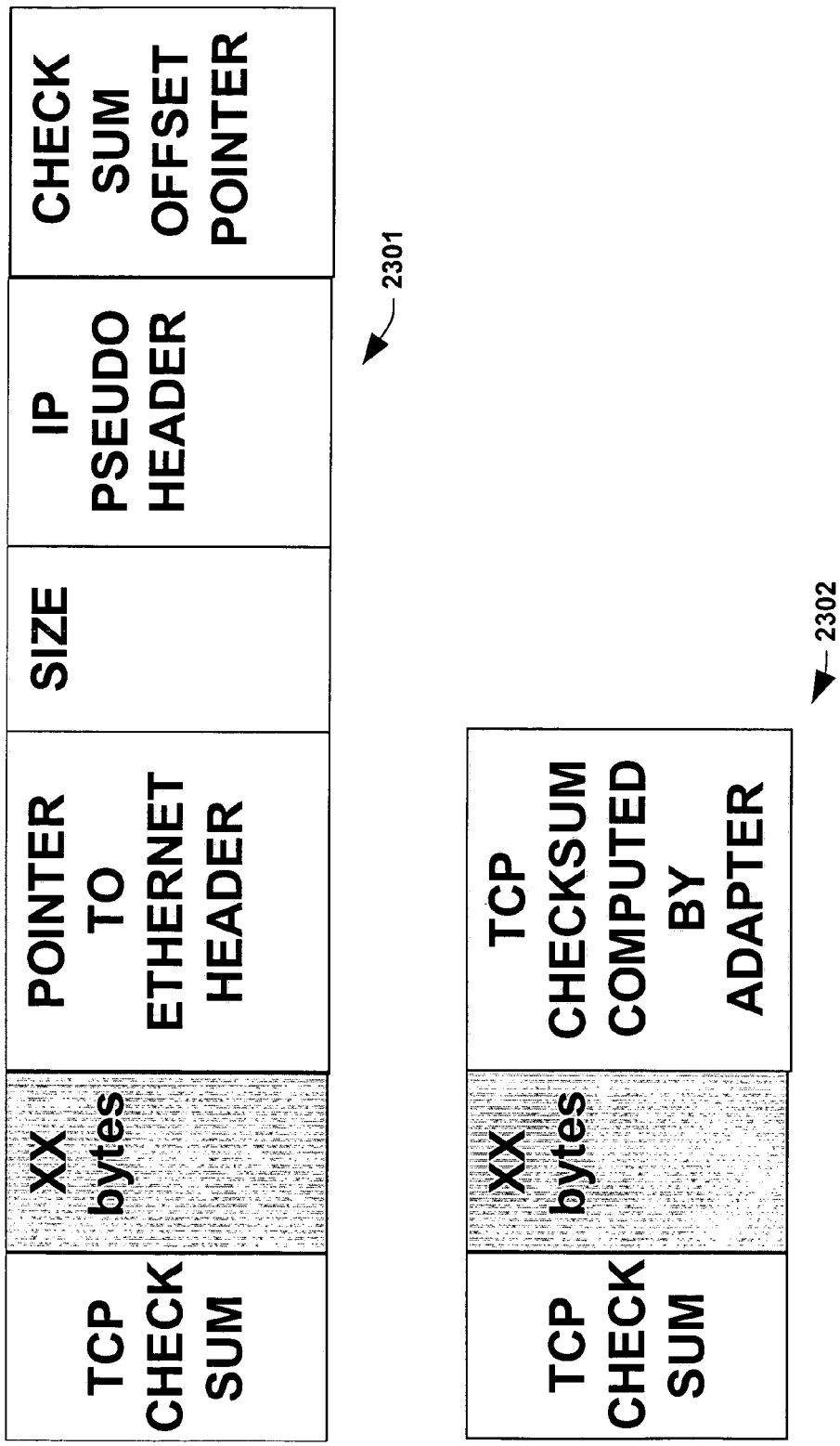
FIG. 23 is a block diagram illustrating exemplary optional parameters generated during transmit operations in accordance with an aspect of the present invention.

FIG. 23 is another block diagram illustrating exemplary optional parameters generated by the operating system dependent module in accordance with an aspect of the present invention. A first exemplary TCP checksum optional parameter 2301 includes a TCP checksum type, number of bytes (size), a pointer to an Ethernet header, size, IP pseudo header, and a checksum offset pointer. The checksum offset referenced by the optional parameter 2301 is depicted at 2302 and includes a TCP checksum type, number of bytes, and a TCP checksum.

Figure 24:
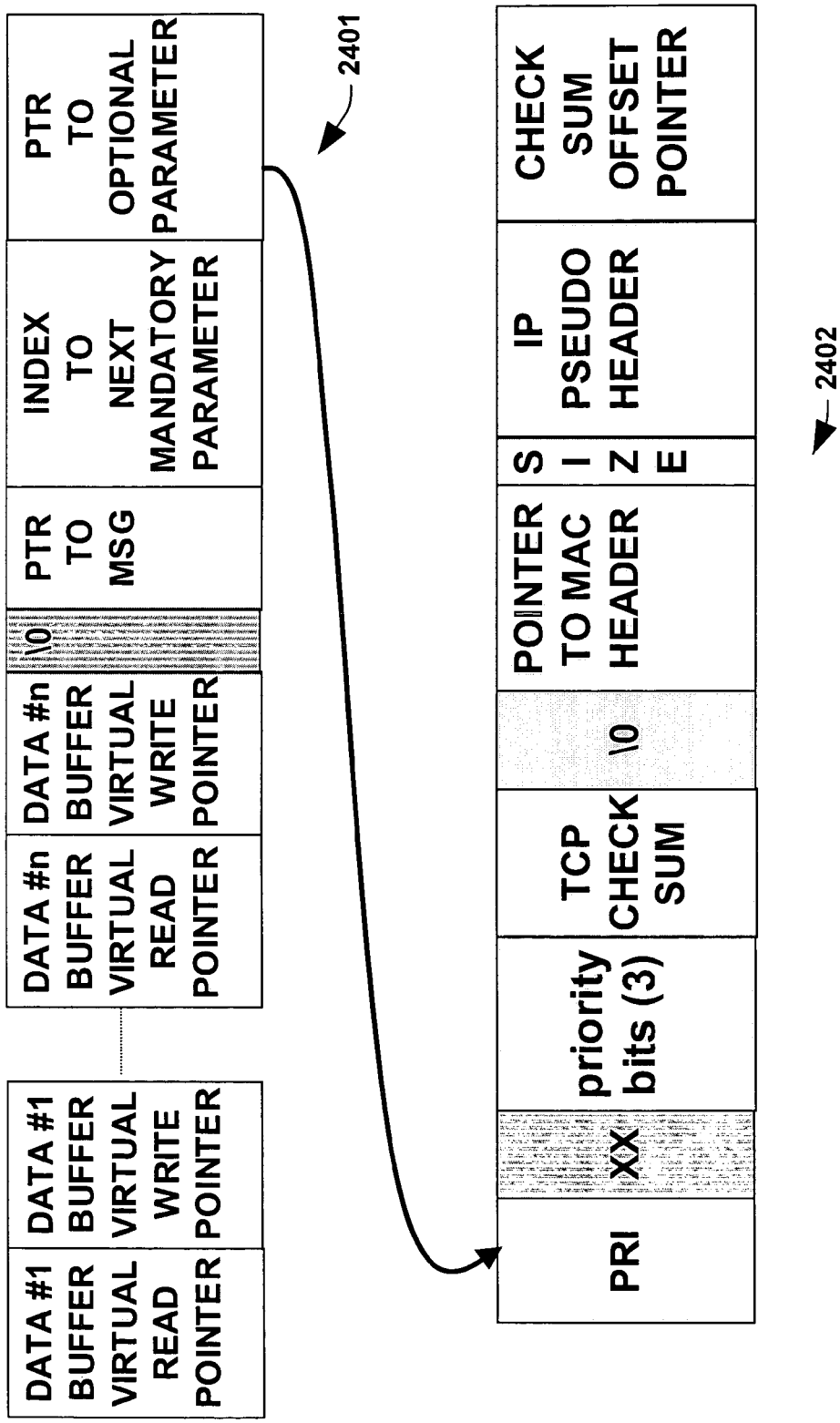
FIG. 24 is a block diagram illustrating an exemplary data structure and optional parameter in accordance with an aspect of the present invention.

FIG. 24 is a block diagram that illustrates a relationship between an array of elements 2401 and optional parameters 2402 in accordance with an aspect of the present invention. The array of elements 2401 is generated by the operating system dependent module. It can be seen that a pointer within the array 2401 references the array of optional parameters 2402, which can include option values or pointers to memory locations that store the option values.

Returning now to FIG. 20 and continuing at block 2006, the media independent module attaches the data buffers to one or more transmit descriptors. The pointer to the message block is updated to an optional space or user space of the transmit descriptors. Optional elements of the array or referenced by the array can also be inserted into the user space of the transmit descriptors.

The media dependent module analyzes the array and checks for inconsistencies and un-supported elements at block 2008. The media dependent module can access information regarding the capabilities of the network device and is operable to identify errors in the optional elements (e.g., elements or option not implemented on the device) and perform appropriate corrective actions (e.g., removing them from the array and/or transmit descriptor and notifying the operating system of the error).

For relatively smaller packets, the media dependent module is operable to coalesce the packet with other packets to reduce overhead and improve efficiency. Generally, if the packet is less than a coalescing size limit (e.g., 256 bytes), the media dependent module can optionally coalesce the packet and buffers with one or more other packets and buffers.

Continuing at block 2010, the media independent module also sets ownership of the transmit descriptor thereby permitting the network device to access the transmit descriptor and in turn, access mandatory parameters, optional parameters, and the data buffers, which hold the packet as well as some header information and transmit the frame. After being transmitted, the data buffers are freed and can, for example, be placed into a free queue for other use. The network device generally performs other additional processing on the frame such as, checksum generation, encryption, and the like.

The four layered architecture of the present invention is designed to reduce run-time overheads. In order to accomplish this, it allows the layers to establish the sequence of functions that need to be called during initialization. For instance, if the controller supports a scatter-gather feature, the buffer coalescing feature of the Media dependent layer may not need to be used. During initialization, the Media dependent layer may discover that scatter gather is supported by the controller and may decide not to publish the buffer coalescing interface. As a result, a packet to be sent to the hardware, would go from the Operating system dependent layer to the Media Independent Layer (via the Operating system Independent layer) where the hardware descriptors would get updated without calling the Media Dependent Layer to coalesce the buffers into one or more contiguous physical buffers.

This type of dynamic binding allows for better performance since the overheads are only during initialization. It also provides increased flexibility for developers to add new functionality into the layers.

A structural/functional and operational overview of a network controller in accordance with the present invention will be provided below in conjunction with FIGS. 25-27, in order to facilitate a thorough understanding of the present invention. The network controller described below is an example of a network controller that can be employed in addition to the four layered device driver to perform network data transfer and related functions. The combination permits relatively fast data transfer while mitigating CPU usage of a host computer on which the device driver is present.

FIG. 25 illustrates a network peripheral or network controller 102 in accordance with one or more aspects of the present invention, and FIGS. 27 and 28 illustrate an exemplary single-chip implementation 102a of the network controller 102. The network controller 102 includes a 64-bit PCI-X bus interface 104 for connection with a host PCI or PCI-X bus 106 that operates at a clock speed up to 133 MHz in PCI-X mode or up to 66 MHz in standard PCI mode, for example. The network controller 102 may be operated as a bus master or a slave. Much of the initialization can be done automatically by the network controller 102 when it reads an optional EEPROM (not shown), for example, via an EEPROM interface 114 (FIG. 26). The network controller 102 can be connected to an IEEE 802.3 or proprietary network 108 through an IEEE 802.3-compliant Media Independent Interface (MII) or Gigabit Media Independent Interface (GMII) 110, for interfacing the controller 102 with the network 108 via an external transceiver device 111 for physical or wireless type connections. For 1000 Mb/s operation the controller 102 supports either the byte-wide IEEE 802.3 Gigabit Media Independent Interface (GMII) for 1000BASE-T PHY devices 111 or the IEEE 802.3 Ten-Bit Interface (TBI) for 1000BASE-X devices 111. The network controller 102 supports both half-duplex and full-duplex operation at 10 and 100 Mb/s rates and full-duplex operation at 1000 Mb/s.

A host device, such as a host processor 112 on the host PCI-X bus 106 in a host system 180, may interface with the network controller 102 via the bus 106. The host processor 112 includes one or more processors that can operate in a coordinated fashion. Referring also to FIG. 27, the network single-chip network controller 102a may be provided on a network interface card or circuit board 182, together with a PHY transceiver 111 for interfacing the host processor 112 with the network 108 via the host bus 106 and the transceiver 111. The PCI-X bus interface 104 includes PCI configuration registers used to identify the network controller 102a to other devices on the PCI bus and to configure the device. Once initialization is complete, the host processor 112 has direct access to the I/O registers of the network controller 102 for performance tuning, selecting options, collecting statistics, and starting transmissions. One or more application software programs 184 executing in the host processor 112 may be provided with network service via what is referred to as layer 4 (e.g., transport layer) software, such as transmission control protocol (TCP) layer software 186, what is referred to as layer 3 (e.g., network layer) software 188, such as internet protocol (IP) software 188, and a software network driver 190, also running on the host processor 112. As discussed below, the network driver software 190 interacts with the host memory 128, host software (e.g., the operating system) and the network controller 102 to facilitate data transfer between the application software 184 and the network 108.

As illustrated in FIG. 25, the exemplary network controller 102 comprises first and second internal random access memories MEMORY A 116 and MEMORY B 118, organized as first-in first-out (FIFO) memories for storage of frames. A memory control unit 120 is provided for control and operation of the memories 116 and 118. The network controller 102 also comprises a media access control (MAC) engine 122 satisfying requirements for operation as an Ethernet/IEEE 802.3-compliant node and providing the interface between the memory 118 and the GMII 110. The MAC engine 122 may be operated in full or half-duplex modes. An Internet Protocol Security (IPsec) engine 124 coupled with the memories 116 and 118 provides authentication and/or encryption functions.

The PCI-X bus interface 104 includes a Direct Memory Access (DMA) controller 126 that automatically transfers network frame data between the network controller 102 and buffers in host system memory 128 without direct processor control via the host bus 106. The operation of the DMA controller 126 is directed by a descriptor management unit 130 according to data structures called descriptors 192, which include pointers to one or more data buffers 194 in system memory 128, as well as control information. The descriptors 192 are stored in the host system memory 128 in queues called descriptor rings. Four transmit descriptor rings are provided for transmitting frames and four receive descriptor rings for receiving frames, corresponding to four priorities of network traffic in the illustrated controller 102. Additionally, four receive status rings are provided, one for each priority level, that facilitate synchronization between the network controller 102 and the host system. Transmit descriptors 192 facilitate or permit the transfer of frame data from the system memory 128 to the controller 102, and receive descriptors 192 facilitate or permit the transfer of frame data in the other direction. In the exemplary controller 102, each transmit descriptor 192 corresponds to one network frame, whereas each receive descriptor 192 corresponds to one or more host memory buffers in which frames received from the network 108 can be stored.

The software interface allocates contiguous memory blocks for descriptors 192, receiver status, and data buffers 194. These memory blocks are shared between the software (e.g., the network driver 190) and the network controller 102 during normal network operations. The descriptor space includes pointers to network frame data in the buffers 194, the receiver status space includes information passed from the controller 102 to the software in the host 112, and the data buffer areas 194 for storing frame data that is to be transmitted (e.g., outgoing data) and for frame data that has been received (e.g., incoming data).

Synchronization between the controller 102 and the host processor 112 is maintained by pointers stored in hardware registers 132 in the controller 102, pointers stored in a controller status block (CSB) 196 in the host system memory 128, and interrupts. The CSB 196 is a block of host system memory 128 that includes pointers into the descriptor and status rings and a copy of the contents of the controller's interrupt register. The CSB 196 is written by the network controller 102 and read by the host processor 112. Each time the software driver 190 in the host 112 writes a descriptor or set of descriptors 192 into a descriptor ring, it also writes to a descriptor write pointer register in the controller 102. Writing to this register causes the controller 102 to start the transmission process if a transmission is not already in progress. Once the controller has finished processing a transmit descriptor 192, it writes this information to the CSB 196. After receiving network frames and storing them in receive buffers 194 of the host system memory 128, the controller 102 writes to the receive status ring and to a write pointer, which the driver software 190 uses to determine which receive buffers 194 have been filled. Errors in received frames are reported to the host memory 128 via a status generator 134.

The IPsec module or engine 124 provides standard authentication, encryption, and decryption functions for transmitted and received frames. For authentication, the IPsec module 124 implements the HMAC-MD5-96 algorithm defined in RFC 2403 (a specification set by the Internet Engineering Task Force) and the HMAC-SHA-1-96 algorithm defined in RFC 2404. For encryption, the module implements the ESP DES-CBC (RFC 2406), the 3DES-CBC, and the AES-CBC encryption algorithms. For transmitted frames, the controller 102 applies IPsec authentication and/or encryption as specified by Security Associations (SAs) stored in a private local SA memory 140, which are accessed by IPsec system 124 via an SA memory interface 142. SAs are negotiated and set by the host processor 112. SAs include IPsec keys, which are required by the various authentication, encryption, and decryption algorithms; IPsec key exchange processes are performed by the host processor 112. The host 112 negotiates SAs with remote stations and writes SA data to the SA memory 140. The host 112 also maintains an IPsec Security Policy Database (SPD) in the host system memory 128.

A receive (RX) parser 144 associated with the MAC engine 122 examines the headers of received frames to determine what processing needs to be done. If the receive parser 144 finds an IPsec header, the parser uses header information, including a Security Parameters Index (SPI), an IPsec protocol type, and an IP destination address to search the SA memory 140 using SA lookup logic 146 and retrieves the applicable security association. The result is written to an SA pointer FIFO memory 148, which is coupled to the lookup logic 146 through the SA memory interface 142. The key corresponding to the SA is fetched and stored in RX key FIFO 152. A receive (RX) IPsec processor 150 performs the processing required by the applicable SA using the key. The controller 102 reports what security processing it has done, so that the host 112 can check the SPD to verify that the frame conforms with policy. The processed frame is stored in the memory 116.

A receive IPsec parser 154, associated with IPsec processor 150, performs parsing that cannot be carried out before packet decryption. Some of this information is used by a receive (Rx) checksum and pad check system 156, which computes checksums specified by headers that may have been encrypted and also checks pad bits that may have been encrypted to verify that they follow a pre-specified sequence for pad bits. These operations are carried out while the received frame is passed to the PCI-X bus 104 via FIFO 158. The checksum and pad check results are reported to the status generator 134.

In the transmit path, an assembly RAM 160 is provided to accept frame data from the system memory 128, and to pass the data to the memory 116. The contents of a transmit frame can be spread among multiple data buffers 194 in the host memory 128, wherein retrieving a frame may involve multiple requests to the system memory 128 by the descriptor management unit 130. These requests are not always satisfied in the same order in which they are issued. The assembly RAM 160 ensures that received chunks of data are provided to appropriate locations in the memory 116. For transmitted frames, the host 112 checks the SPD (Ipsec Security Policy Database) to determine what security processing is needed, and passes this information to the controller 102 in the frame's descriptor 192 in the form of a pointer to the appropriate SA in the SA memory 140. The frame data in the host system memory 128 provides space in the IPsec headers and trailers for authentication data, which the controller 102 generates. Likewise, space for padding (to make the payload an integral number of blocks) is provided when the frame is stored in the host system memory buffers 194, but the pad bits are written by the controller 102.

As the data is sent out from the assembly RAM 160, it passes also into a first transmit (TX) parser 162, which reads the MAC header, the IP header (if present), the TCP or UDP header, and determines what kind of a frame it is, and looks at control bits in the associated descriptor. In addition, the data from the assembly RAM 160 is provided to a transmit checksum system 164 for computing IP header and/or TCP checksums, which values will then be inserted at the appropriate locations in the memory 116. The descriptor management unit 130 sends a request to the SA memory interface 142 to fetch an SA key, which is then provided to a key FIFO 172 that feeds a pair of TX IPsec processors 174a and 174b. Frames are alternately provided to TX IPsec processors 174a and 174b for encryption and authentication via TX IPsec FIFOs 176a and 176b, respectively, wherein a transmit IPsec parser 170 selectively provides frame data from the memory 116 to the processors 174. The two transmit IPsec processors 174 are provided in parallel because authentication processing cannot begin until after encryption processing is underway. By using the two processors 174, the speed is comparable to the receive side where these two processes can be carried out simultaneously.

Authentication does not cover mutable fields, such as occur in IP headers. The transmit IPsec parser 170 accordingly looks for mutable fields in the frame data, and identifies these fields to the processors 174a and 174b. The output of the processors 174a and 174b is provided to the second memory 118 via FIFOs 178a and 178b, respectively. An Integrity Check Value (ICV), which results from authentication processing, is inserted at the appropriate location (e.g., within the IPsec header) by an insertion unit 179 as the frame data is passed from the memory 118 to the MAC engine 122 for transmission to the network 108.

In the single-chip implementation of FIG. 26, the controller 102a comprises a network port manager 182, which may automatically negotiate with an external physical (PHY) transceiver via management data clock (MDC) and management data I/O (MDIO) signals. The network port manager 175 may also set up the MAC engine 122 to be consistent with the negotiated configuration. Circuit board interfacing for LED indicators is provided by an LED controller 171, which generates LED driver signals LED0'-LED3' for indicating various network status information, such as active link connections, receive or transmit activity on the network, network bit rate, and network collisions. Clock control logic 173 receives a free-running 125 MHz input clock signal as a timing reference and provides various clock signals for the internal logic of the controller 102a.

A power management unit 188, coupled with the descriptor management unit 130 and the MAC engine 122, can be used to conserve power when the device is inactive. When an event requiring a change in power level is detected, such as a change in a link through the MAC engine 122, the power management unit 188 provides a signal PME' indicating that a power management event has occurred.

The external serial EEPROM interface 114 implements a standard EEPROM interface, for example, the 93Cxx EEPROM interface protocol. The leads of external serial EEPROM interface 114 include an EEPROM chip select (EECS) pin, EEPROM data in and data out (EEDI and EEDO, respectively) pins, and an EEPROM serial clock (EESK) pin.

In the bus interface unit 104, address and data are multiplexed on bus interface pins AD[63:0]. A reset input RST' may be asserted to cause the network controller 102a to perform an internal system reset. A cycle frame I/O signal FRAME' is driven by the network controller when it is the bus master to indicate the beginning and duration of a transaction, and a PCI clock input PCI_CLK is used to drive the system bus interface over a frequency range of 15 to 133 MHz on the PCI bus (e.g., host bus 106). The network controller 102a also supports Dual Address Cycles (DAC) for systems with 64-bit addressing, wherein low order address bits appear on the AD[31:0] bus during a first clock cycle, and high order bits appear on AD[63:32] during the second clock cycle. A REQ64' signal is asserted by a device acting as bus master when it wants to initiate a 64-bit data transfer, and the target of the transfer asserts a 64-bit transfer acknowledge signal ACK64' to indicate that it is willing to transfer data using 64 bits. A parity signal PAR64 is an even 8 byte parity signal that protects AD[63:32]. The bus master drives PAR64 for address and write data phases and the target drives PAR64 for read data phases.

The network controller 102a asserts a bus request signal REQ' to indicate that it wishes to become a bus master, and a bus grant input signal GNT' indicates that the access to the bus has been granted to the network controller. An initialization device select input signal IDSEL is used as a chip select for the network controller during configuration read and write transactions. Bus command and byte enable signals C/BE[7:0] are used to transfer bus commands and to indicate which physical bytes of data lines AD[63:0] carry meaningful data. A parity I/O signal PAR indicates and verifies even parity across AD[31:0] and C/BE[3:0].

The network controller drives a drive select I/O signal DEVSEL' when it detects a transaction that selects the network controller 102a as a target. The network controller 102a checks DEVSEL' to see if a target has claimed a transaction that the network controller initiated. TRDY' is used to indicate the ability of the target of the transaction to complete the current data phase, and IRDY' indicates the ability of the initiator of the transaction to complete the current data phase. Interrupt request output signal INTA' indicates that one or more enabled interrupt flag bits are set. The network controller 102a asserts a parity error I/O signal PERR' when it detects a data parity error, and asserts a system error output signal SERR' when it detects an address parity error. In addition, the controller 102a asserts a stop I/O signal STOP' to inform the bus master to stop the current transaction.

In the MAC engine 122, a physical interface reset signal PHY_RST is used to reset the external PHY 111 (MII, GMII, TBI), a PHY loop-back output PHY_LPBK is used to force an external PHY device 111 into loop-back mode for systems testing, and a flow control input signal FC controls when the MAC sends a frame requesting the PHY 111 to pause. The network controller 102a provides an external PHY interface 110 that is compatible with either the Media Independent Interface (MII), Gigabit Media Independent Interface (GMII), or Ten Bit Interface (TBI) per IEEE Std 802.3. Receive data input signals RXD[7:0] and output signals TXD [7:0] are used for receive and transmit data exchange, respectively. When the network controller 102a is operating in GMII or MII mode, TX_EN/TXD[8] is used as a transmit enable. In TBI mode, this signal is bit 8 of the transmit data bus. RX_DV/RXD[8] is an input used to indicate that valid receive data is being presented on the RX pins. In TBI mode, this signal is bit 8 of the receive data bus.

When the network controller 102a is operating in GMII or MII mode, RX_ER/RXD[9] is an input that indicates that the external transceiver device has detected a coding error in the receive frame currently being transferred on the RXD pins. In TBI mode, this signal is bit 9 of the receive data bus, wherein TXD9 is bit 9 of the transmit data bus for TBO mode. MII transmit clock input TX_CLK is a continuous clock input that provides the timing reference for the transfer of the TX_EN and TXD[3:0] signals out of the network controller 102a in MII mode. GTX_CLK is a continuous 125 MHz clock output that provides the timing reference for the TX_EN and TXD signals from the network controller when the device is operating in GMII or TBI mode. RX_CLK is a clock input that provides the timing reference for the transfer of signals into the network controller when the device is operating in MII or GMII mode. COL is an input that indicates that a collision has been detected on the network medium, and a carrier sense input signal CRS indicates that a non-idle medium, due either to transmit or receive activity, has been detected (CRS is ignored when the device is operating in full-duplex mode).

In TBI mode, 10-bit code groups represent 8-bit data packets. Some 10-bit code groups are used to represent commands. The occurrence of even and odd code groups and special sequences called commas are all used to acquire and maintain synchronization with the PHY 110. RBCLK[0] is a 62.5 MHz clock input that is used to latch odd-numbered code groups from the PHY device, and RBCLK[1] is used to latch even-numbered code groups. RBCLK[1] is always 180 degrees out of phase with respect to RBCLK[0]. COM_DET is asserted by an external PHY 111 to indicate the code group on the RXD[9:0] inputs includes a valid comma.

The IPsec module 124 includes an external RAM interface to memories 116 and 118. When CKE is driven high, an internal RAM clock is used to provide synchronization, otherwise the differential clock inputs CK and CK_L are used. The RAM's have a command decoder, which is enabled when a chip select output CS_L is driven low. The pattern on the WE_L, RAS_L, and CAS_L pins defines the command that is being issued to the RAM. Bank address output signals BA[1:0] are used to select the memory to which a command is applied, and an address supplied by RAM address output pins A[10:0] selects the RAM word that is to be accessed. A RAM data strobe I/O signal DQS provides the timing that indicates when data can be read or written, and data on RAM data I/O pins DQ[31:0] are written to or read from either memory 116 or 118.

Returning again to FIG. 25, an operational discussion of receive and transmit operation of the network controller 102 is provided below. Starting with receipt of a data frame from the network media 108 (e.g., an optical fiber), the frame is delivered to the GMII 110 (the Gigabit Media-Independent Interface), for example, as a series of bytes or words in parallel. The GMII 110 passes the frame to the MAC 122 according to an interface protocol, and the MAC 122 provides some frame management functions. For example, the MAC 122 identifies gaps between frames, handles half duplex problems, collisions and retries, and performs other standard Ethernet functions such as address matching and some checksum calculations. The MAC 122 also filters out frames, checks their destination address and accepts or rejects the frame depending on a set of established rules.

The MAC 122 can accept and parse several header formats, including for example, IPv4 and IPv6 headers. The MAC 122 extracts certain information from the frame headers. Based on the extracted information, the MAC 122 determines which of several priority queues (not shown) to put the frame in. The MAC places some information, such as the frame length and priority information, in control words at the front of the frame and other information, such as whether checksums passed, in status words at the back of the frame. The frame passes through the MAC 122 and is stored in the memory 118 (e.g., a 32 KB RAM). In this example, the entire frame is stored in memory 118. The frame is subsequently downloaded to the system memory 128 to a location determined by the descriptor management unit 130 according to the descriptors 192 in the host memory 128 (FIG. 27), wherein each receive descriptor 192 comprises a pointer to one or more data buffers 194 in the system memory 128. Transmit descriptors include a pointer or a list of pointers, as will be discussed in greater detail supra. The descriptor management unit 130 uses the DMA 126 to read the receive descriptor 192 and retrieve the pointer to the buffer 194. After the frame has been written to the system memory 128, the status generator 134 creates a status word and writes the status word to another area in the system memory 128, which in the present example, is a status ring. The status generator 134 then interrupts the processor 112. The system software (e.g., the network driver 190 in FIG. 27) can then check the status information, which is already in the system memory 128. The status information includes, for example, the length of the frame, what processing was done, and whether or not the various checksums passed.

In transmit operation, the host processor 112 initially dictates a frame transmission along the network 108, and the TCP layer 186 of the operating system (OS) in the host processor 112 is initiated and establishes a connection to the destination. The TCP layer 186 then creates a TCP frame that may be quite large, including the data packet and a TCP header. The IP layer 188 creates an IP header, and an Ethernet (MAC) header is also created, wherein the data packet, and the TCP, IP, and MAC headers may be stored in various locations in the host memory 128. The network driver 190 in the host processor 112 may then assemble the data packet and the headers into a transmit frame, and the frame is stored in one or more data buffers 194 in the host memory 128. For example, a typical transmit frame might reside in four buffers 194: the first one containing the Ethernet or MAC header, the second one having the IP header, the third one the TCP header, and the fourth buffer containing the data. The network driver 190 generates a transmit descriptor 192 that includes a list of pointers to all these data buffers 194.

The frame data is read from the buffers 194 into the controller 102. To perform this read, the descriptor management unit 130 reads the transmit descriptor 192 and issues a series of read requests on the host bus 106 using the DMA controller 126. The requested data portions may not arrive in the order they were requested, but the PCI-X interface 104 indicates to the DMU 130 the request with which each data portion is associated. Using such information, the assembly RAM logic 160 organizes and properly orders the data to reconstruct the frame. The assembly RAM 160 may also perform some packing operations to fit the various pieces of data together and remove gaps.

After assembly in the assembly RAM 160, the frame is passed to the memory 116 (e.g., a 32 KB RAM in the illustrated example). As the data passes from the assembly RAM 160, the data also passes to the TX parser 162. The TX parser 162 reads the headers, for example, the MAC headers, the IP headers (if there is one), the TCP or UDP header, and determines what kind of a frame it is, and also looks at the control bits that were in the associated transmit descriptor 192. The data frame is also passed to the transmit checksum system 164 for computation of TCP and/or IP layer checksums.

The transmit descriptor 192 may comprise control information, including bits that instruct the transmit checksum system 164 whether to compute an IP header checksum and/or TCP checksum. If those control bits are set, and the parser 162 identifies or recognizes the headers, then the parser 162 tells the transmit checksum system 164 to perform the checksum calculations, and the results are put at the appropriate location in the frame in the memory 116. After the entire frame is loaded in the memory 116, the MAC 122 can begin transmitting the frame, or outgoing security processing (e.g., encryption and/or authentication) can be performed in the IPsec system 124 before transmission to the network 108.

By offloading the transmit checksumming function onto the network controller 102 of the present invention, the host processor 112 is advantageously freed from that task. In order for the host processor 112 to perform the checksum, significant resources must be expended. Although the computation of the checksum is relatively simple, the checksum, which covers the entire frame, must be inserted at the beginning of the frame. In conventional architectures, the host computer makes one pass through the frame to calculate the checksum, and then inserts the checksum at the beginning of the frame. The data is then read another time as it is loaded into the controller. The network controller 102 further reduces the load on the host processor 112 by assembling the frame using direct access to the system memory 128 via the descriptors 192 and the DMA controller 126. Thus, the network controller 102 frees the host processor 112 from several time-consuming memory access operations.

In addition to the receive and transmit functions identified above, the network controller 102 may also be programmed to perform various segmentation functions during a transmit operation. For example, the TCP protocol allows a TCP frame to be as large as 64,000 bytes. The Ethernet protocol does not allow data transfers that large, but instead limits a network frame to about 1500 bytes plus some headers. Even in the instance of a jumbo frame option that allows 16,000 byte network frames, the protocol does not support a 64 KB frame size. In general, a transmit frame initially resides in one or more of the data buffers 194 in system memory 128, having a MAC header, an IP header, and a TCP header, along with up to 64 KB of data. Using the descriptor management unit 130, the frame headers are read, and an appropriate amount of data (as permitted by the Ethernet or network protocol) is taken and transmitted. The descriptor management unit 130 tracks the current location in the larger TCP frame and sends the data block by block, each block having its own set of headers.

For example, when a data transmit is to occur, the host processor 112 writes a descriptor 192 and informs the controller 102. The descriptor management unit 130 receives a full list of pointers, which identify the data buffers 194, and determines whether TCP segmentation is warranted. The descriptor management unit 130 then reads the header buffers and determines how much data can be read. The headers and an appropriate amount of data are read into the assembly RAM 160 and the frame is assembled and transmitted. The controller 102 then re-reads the headers and the next block or portion of the untransmitted data, modifies the headers appropriately and forms the next frame in the sequence. This process is then repeated until the entire frame has been sent, with each transmitted portion undergoing any selected security processing in the IPsec system 124.

The network controller 102 of the present invention also advantageously incorporates IPsec processing therein. In contrast with conventional systems that offload IPsec processing, the present invention employs on-board IPsec processing, which may be implemented as a single-chip device 102*a* (FIG. 26). In conventional systems, either the host processor carries out IPsec processing or a co-processor, separate from the network controller, is employed. Use of the host processor can be slow, and in either case, the frame passes at least three times through the memory bus. For example, when a co-processor is used, the frame passes through the bus once as it is read from memory and sent to the co-processor, again as it passes back to the system memory, and a third time as it is sent to the network controller. This processing consumes significant bandwidth on the PCI bus and negatively impacts system performance. A similar performance loss is realized in the receive direction.

IPsec processing has two primary goals: first is to encrypt, or scramble, the data so that an unauthorized person or system cannot read the data. The second goal is authentication, which ensures that the packet is uncorrupted and that the packet is from the expected person or system. A brief discussion of the on-board IPsec processing follows below. The network controller 102 of the present invention takes advantage of security associations (SAs) using the SA memory interface 142, the SA lookup 146, and the SA memory 140. As briefly highlighted above, a security association is a collection of bits that describe a particular security protocol, for example, whether the IPsec portion 124 is to perform an encryption or authentication, or both, and further describes what algorithms to employ. There are several standard encryption and authentication algorithms, so the SA interface 142 and SA lookup 146 indicates which one is to be used for a particular frame. The SA memory 140 in the present example is a private memory, which stores the encryption keys. The SAs are obtained according to an IPsec protocol whereby sufficient information is exchanged with a user or system on the network to decide which algorithms to use and allow both parties to generate the same keys. After the information exchange is completed, the software calls the driver 190, which writes the results into the SA memory 140.

Once the key exchange is complete, the appropriate bits reside in the SA memory 140 that indicate which key is to be used and which authentication algorithm, as well as the actual keys. In transmit mode, part of the descriptor 192 associated with a given outgoing frame includes a pointer into the SA memory 140. When the descriptor management unit 130 reads the descriptor 192, it sends a request to the SA memory interface 142 to fetch the key, which then sends the key to the key FIFO 172, that feeds the TX IPSec processing modules 174*a* and 174*b*, respectively. When both encryption and authentication are to be employed in transmit, the process is slightly different because the tasks are not performed in parallel. The authentication is a hash of the encrypted data, and consequently, the authentication waits until at least a portion of the encryption has been performed. Because encryption may be iterative over a series of data blocks, there may be a delay between the beginning of the encryption process and the availability of the first encrypted data. To avoid having this delay affect device performance, the exemplary network interface 102 employs two TX IPSec process engines 174*a* and 174*b*, wherein one handles the odd numbered frames and the other handles the even numbered frames in the illustrated example.

Prior to performing the IPsec processing, the TX IPsec parser 170 parses the frame headers and looks for mutable fields therein, which are fields within the headers that are not authenticated because they vary as the frame travels over the network 108. For example, the destination address in the IP header varies as the frame goes across the Internet from router to router. The transmit IPsec parser 170 identifies the mutable fields and passes the information to the TX IPsec processors 174, which selectively skip over the mutable field portions of the frames or alternatively treat the mutable field portions as if they were filled with zeros. The processed frames are sent to FIFOs 178*a* and 178*b* and subsequently accumulated in the memory 118. The result of the authentication processing is an integrity check value (ICV), which is inserted by insertion block 179 into the appropriate location (e.g., IPsec header) as the frame is transmitted from the memory 118 to the network media 108.

In receive mode, a received frame comes into the MAC 122 and the RX parser 144. The RX parser 144 parses the incoming frame up to the IPsec headers and extracts information therefrom. The fields that are important to the RX parser 144 are, for example, the destination IP address in the IP header, the SPI (Security Protocol Index), and a protocol bit that indicates whether an IPsec header is an authentication header (AH) or an encapsulation security protocol (ESP) header. Some of the extracted information passes to the SA lookup block 146. The SA lookup block 146 identifies the appropriate SA and conveys the information to the SA memory interface 142 that retrieves the SA and places it into the key FIFO 152.

The SA lookup block 146 employs an on-chip SPI Table and the off-chip SA memory 140. The SPI Table is organized into 4096 bins, each comprising 4 entries. The entries include the 32-bit SPI, a hash of the destination address (DA), a bit to indicate the protocol, and a bit to indicate whether the entry is used. Corresponding entries in the SA memory contain the full DAs and the SA (two SAs when there is both authentication and encryption). The bin for each entry is determined by a hash of the SPI. To look up an SA, a hash of the SPI from the received frame is used to determine which bin to search. Within the bin, the SA lookup block 146 searches the entries for a match to the full SPI, the destination address hash, and the protocol bit. After searching, the SA lookup block writes an entry to the SA pointer FIFO 148, which either identifies a matching entry or indicates no match was found. A check of the DA address from the SA memory is made just before security processing. If there is no match, security processing is not performed on the frame in question. Based on the entries in the SA pointer FIFO 148, the keys are fetched from the external SA memory 140 and placed in the key FIFO 152. The RX IPsec processor 150 takes the keys that come in from the FIFO 152, reads the corresponding frame data out of the memory 118, and begins processing the frame, as required. For receive processing, decryption and authentication proceed in parallel (on receive, decryption and authentication are not sequential processes), and thus in this example only one RX IPsec processor is used.

The RX IPsec parser 154 parses the headers that follow the ESP header. Any header that follows an ESP header will be encrypted and cannot be parsed until decryption has taken place. This parsing must be completed before TCP/UDP checksums can be computed and before pad bits can be checked. The decrypted data is stored in the memory 116. To perform the TCP/UDP checksums and pad checks without having to store the frame data another time, these functions are carried out by checksum and pad check system 156 while the data is being transferred from the memory 116 to the host memory 128.

In addition to the on-board IPsec processing and TCP segmentation highlighted above, the network controller 102 also provides performance improvements in the execution of interrupts. Read latencies are large when a host processor is required to read a register from a network device. These latencies negatively impact system performance. In particular, as the host processor clock speed continues to increase, the disparity between the clock speed and the time it takes to get a response from a network controller over a PCI or other host bus becomes larger. Accordingly, when a host processor needs to read from a network device, the processor must wait a greater number of clock cycles, thereby resulting in opportunity loss.

The network interface 102 avoids many read latencies by replacing read operations with write operations. Write operations tend to be faster, use less processor cycles and are not as problematic because they can take place without involving the processor 112. Thus when write information is sent to a FIFO, as long as the writes are in small bursts, the network controller 102 can take the necessary time to execute the writes without negatively loading the processor. To avoid read operations during a transmit operation, the driver creates a descriptor 192 in the system memory 128 and then writes a pointer to that descriptor to the register 132 of the network controller 102. The DMU 130 of the controller 102 sees the contents in the register 132 and reads the necessary data directly from the system memory 128 without further intervention of the processor 112. For receive operations, the driver software 190 identifies empty buffers 194 in the system memory 128, and writes a corresponding entry to the register 132. The descriptor management unit 130 writes to pointers in the transmit descriptor rings to indicate which transmit descriptors 192 have been processed and to pointers in the status rings to indicate which receive buffers 194 have been used. Unlike conventional architectures that require a host processor to read an interrupt register in the network controller, the present invention generates and employs a control status block (CSB) 196 located in a predetermined region of the system memory 128 (e.g., a location determined upon initialization). The network controller 102 writes to the CSB 196 any register values the system needs. More particularly, after a frame has been completely processed, prior to generating an interrupt, the network controller 102 writes a copy of the interrupt register to the CSB 196. Then the controller 102 asserts the interrupt; thus when the host processor 112 sees the interrupt in the register 132, the received data is already available in the receive data buffer 194.

The single-chip network controller 102a includes all the functionality and components described herein with respect to the network interface system 102. The various blocks, systems, modules, engines, etc. described herein may be implemented using appropriate analog and/or digital circuitry, wherein one or more of the blocks, etc. described herein may be combined with other circuitry in accordance with the invention.

Descriptor Management

Figure 28A:
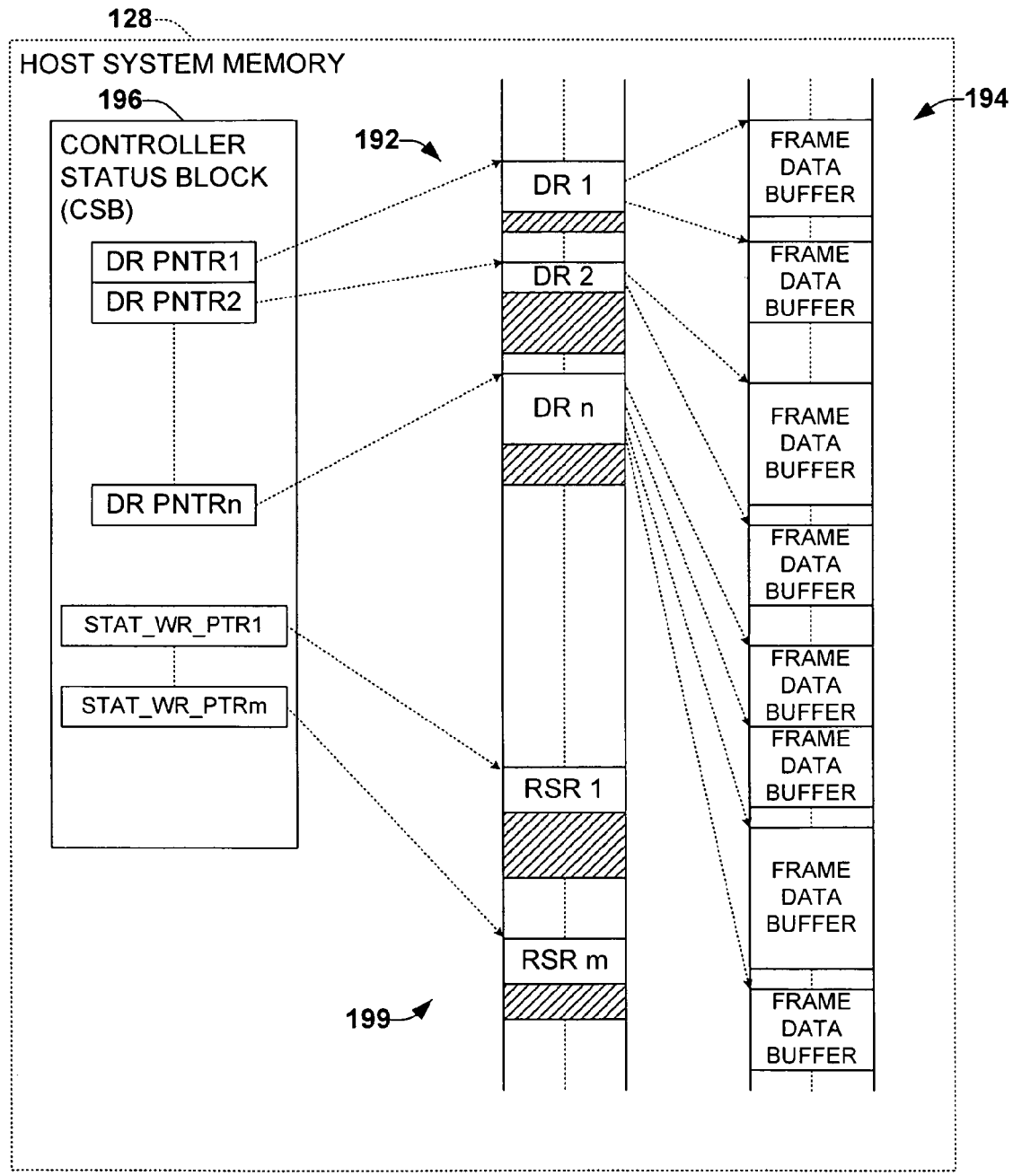
FIG. 28A is a schematic diagram illustrating a control status block in a host system memory with pointers to descriptor rings and receive status rings in the host system of FIG. 25.
Figure 28B:
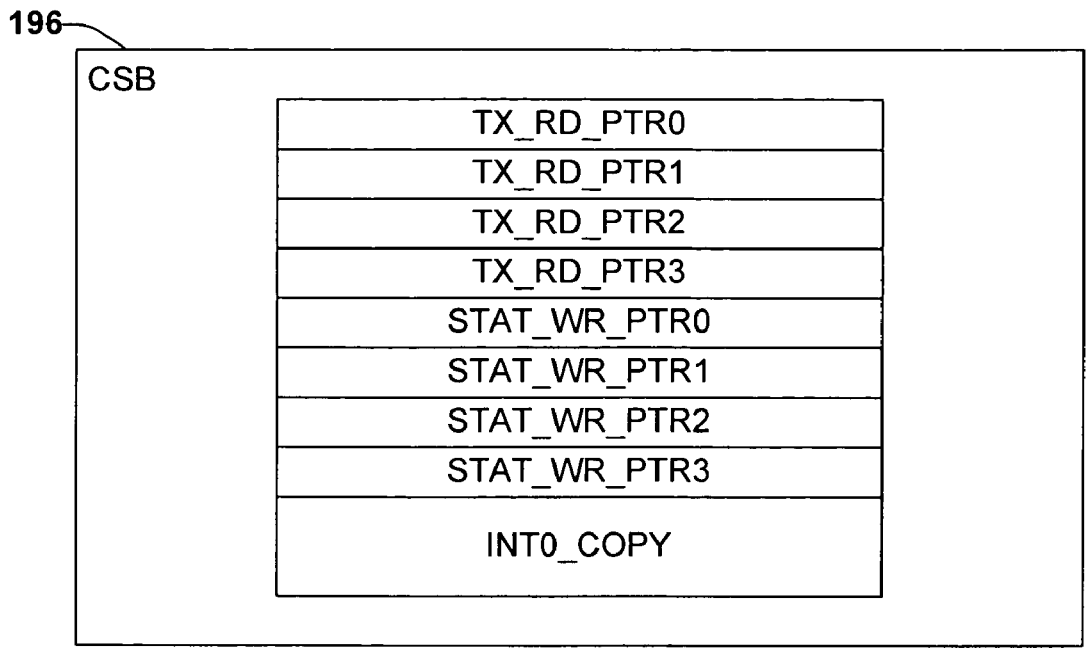
FIG. 28B is a schematic diagram illustrating a controller status block in the host memory of the host system of FIG. 25.
Figure 28C:
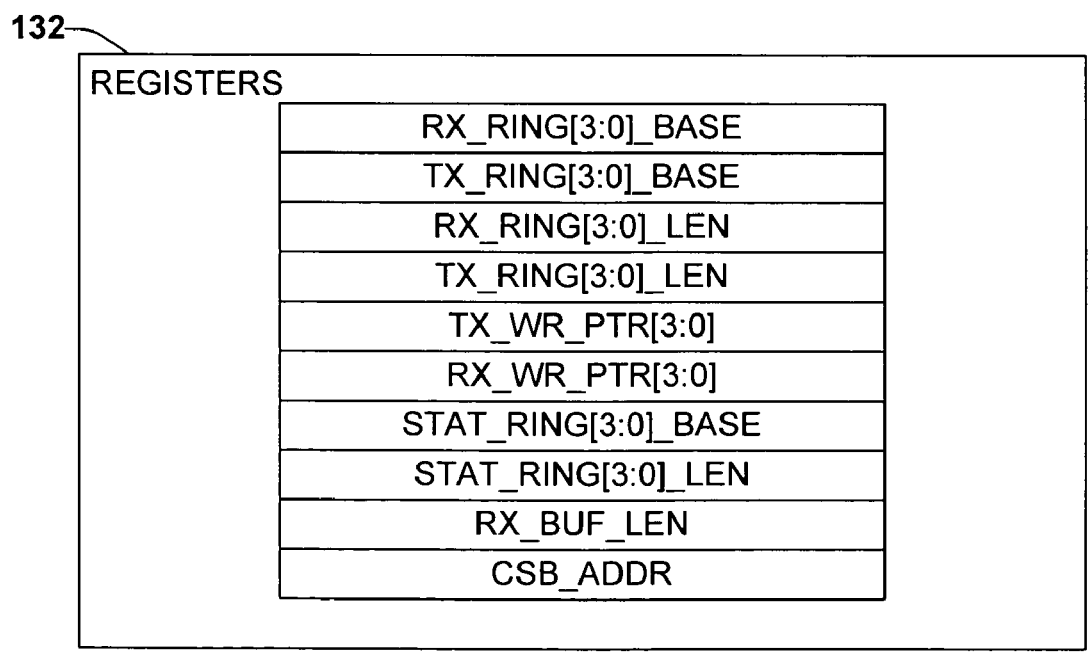
FIG. 28C is a schematic diagram illustrating descriptor management unit registers in the network interface system of FIG. 25.
Figure 28D:
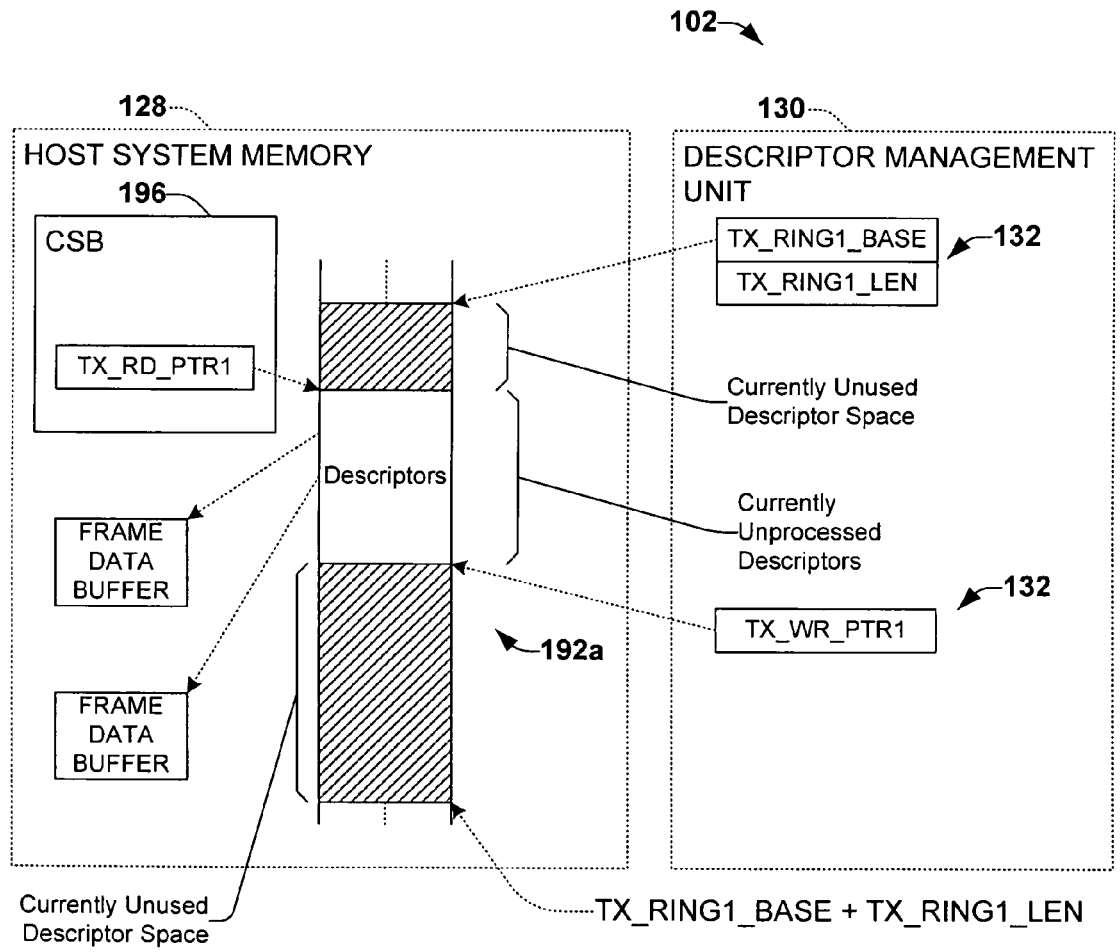
FIG. 28D is a schematic diagram illustrating an exemplary transmit descriptor ring in host system memory and pointer registers in a descriptor management unit of the network interface system of FIG. 25.
Figure 28E:
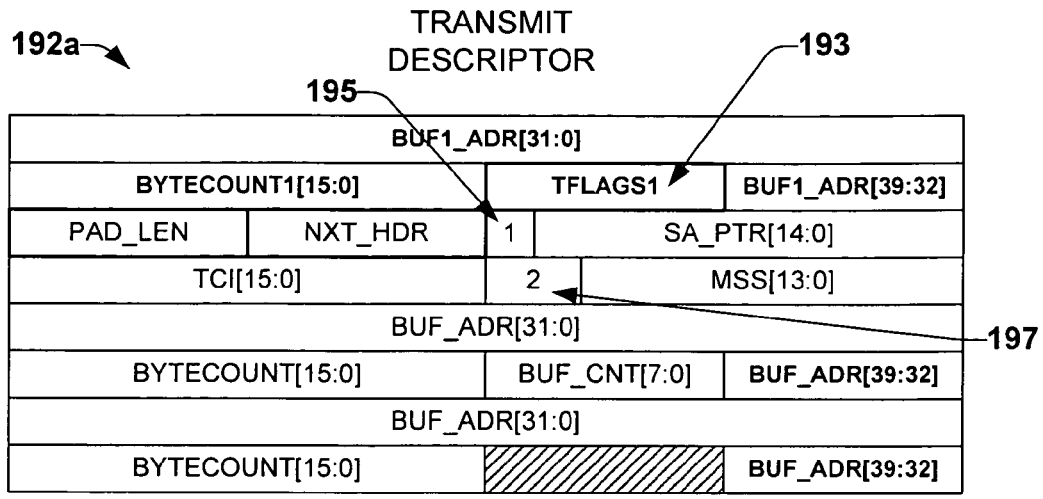
FIG. 28E is a schematic diagram illustrating an exemplary transmit descriptor in the network interface system of FIG. 25.
Figure 28F:
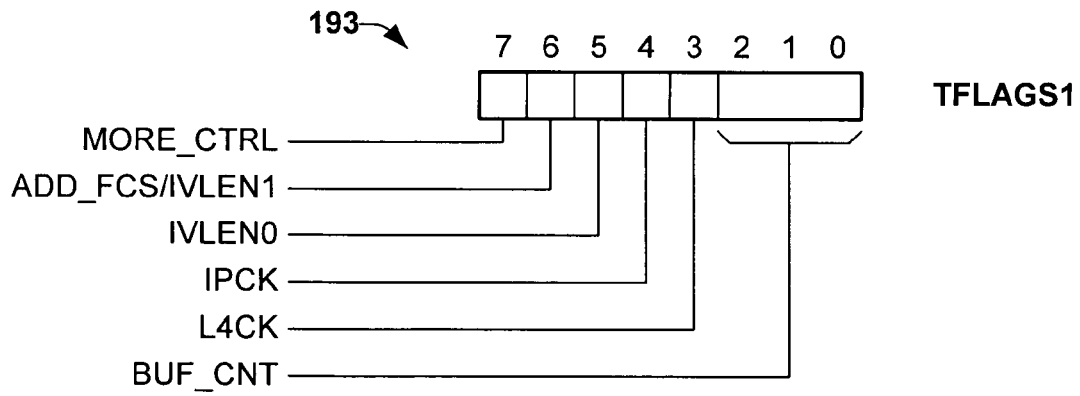
FIG. 28F is a schematic diagram illustrating a transmit flags byte in the transmit descriptor of FIG. 28E.
Figure 28G:
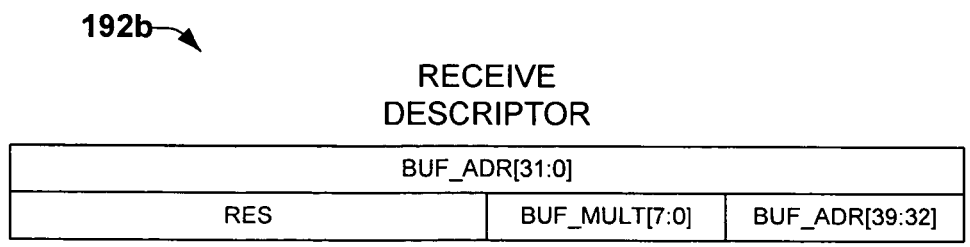
FIG. 28G is a schematic diagram illustrating an exemplary receive descriptor in the network interface system of FIG. 25.
Figure 28H:
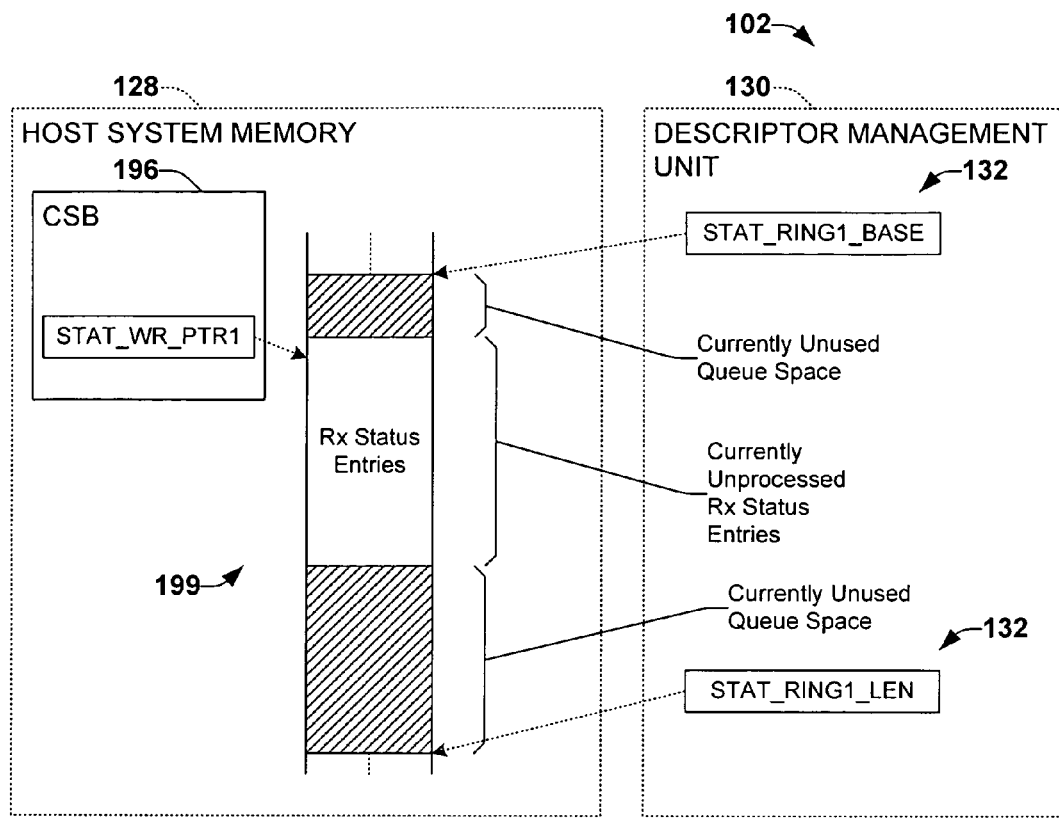
FIG. 28H is a schematic diagram illustrating an exemplary receive status ring in host system memory and pointer registers in the descriptor management unit in the network interface system of FIG. 25.
Figure 28I:
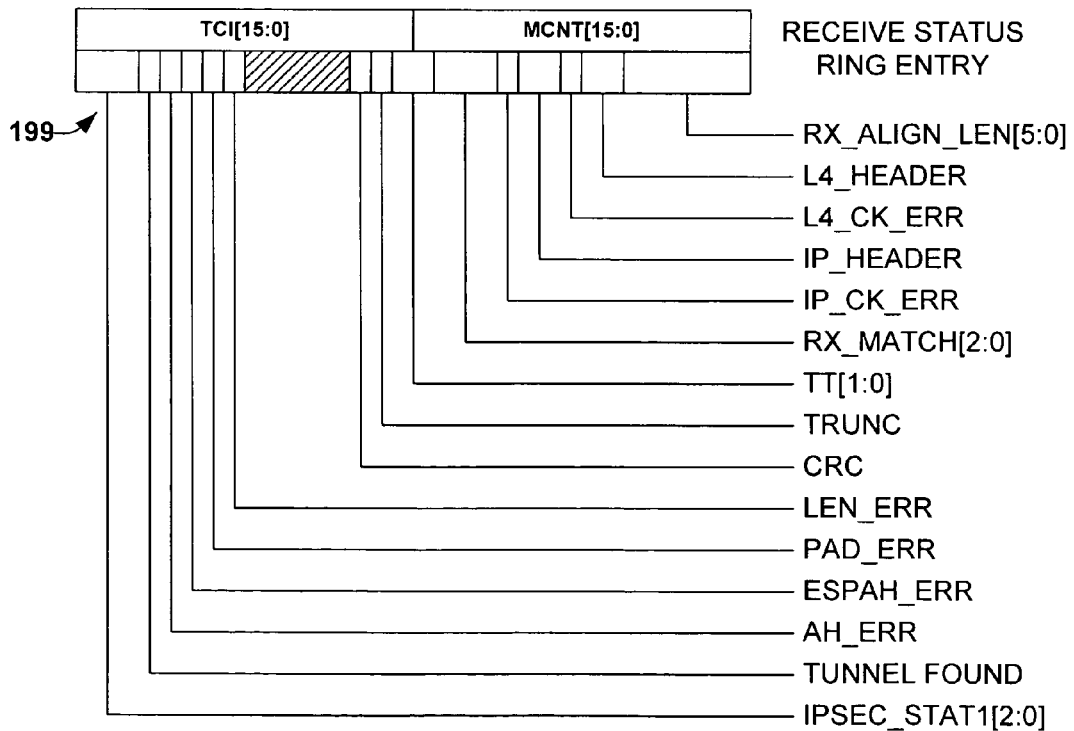
FIG. 28I is a schematic diagram illustrating an exemplary receive status ring in the host system memory.
Figure 29A:
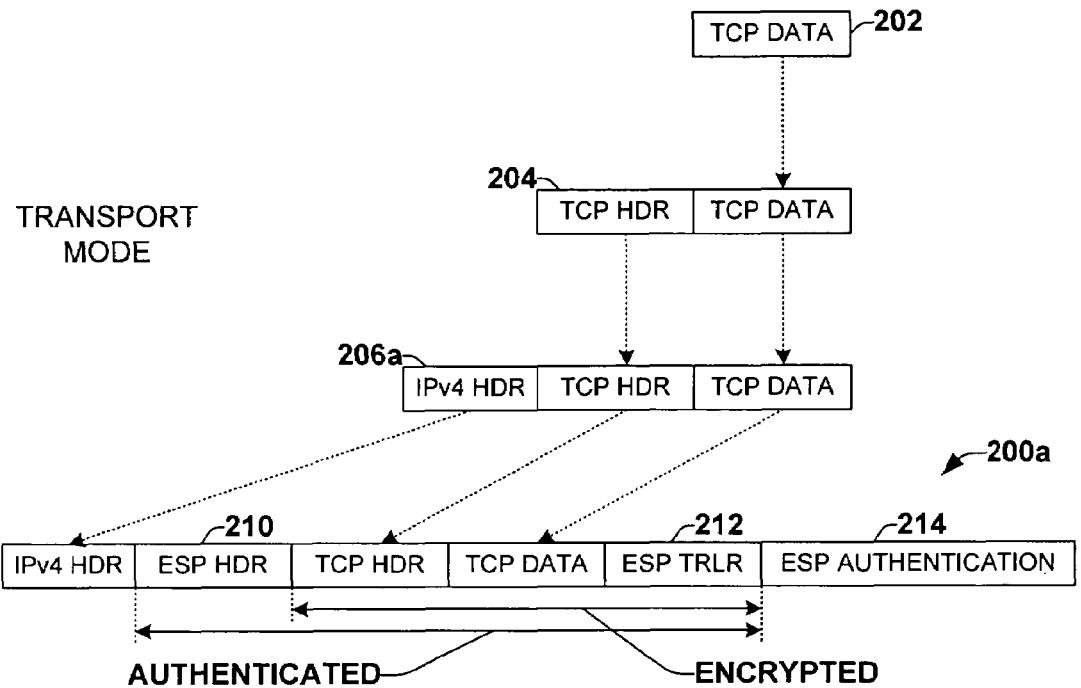
FIGS. 29A and 29B are schematic diagrams illustrating outgoing data from TCP through transport mode ESP processing for IPv4 and IPv6, respectively.
Figure 29B:
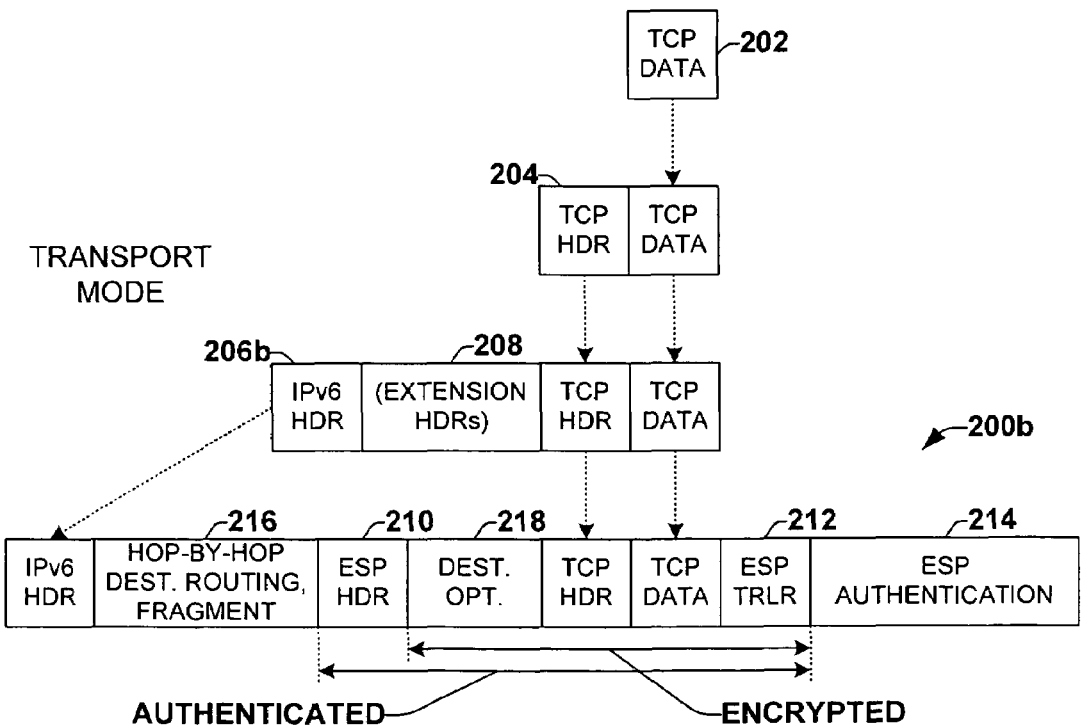
Figure 29C:
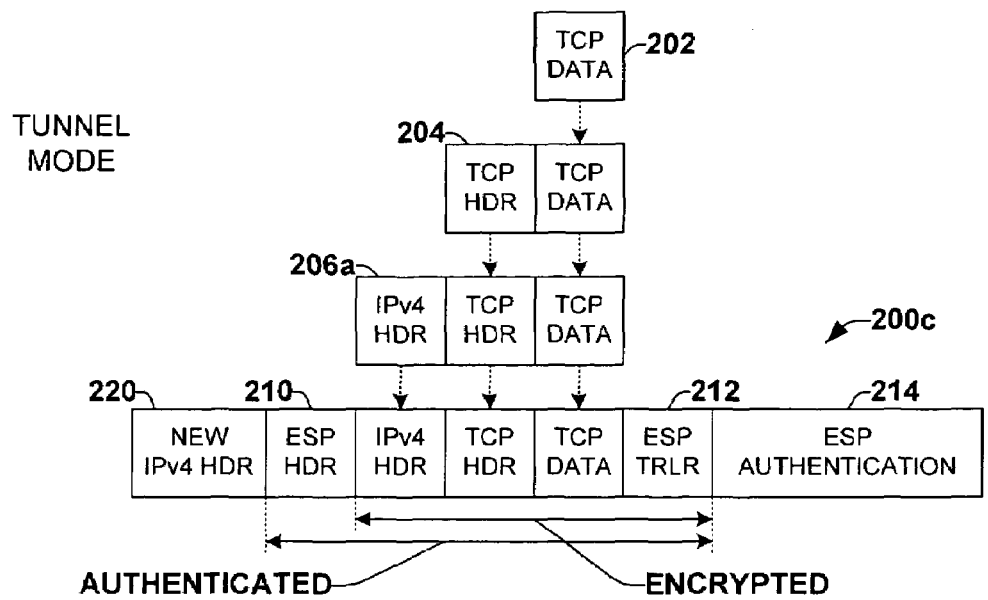
FIGS. 29C and 29D are schematic diagrams illustrating outgoing data from TCP through tunnel mode ESP processing for IPv4 and IPv6, respectively.
Figure 29D:
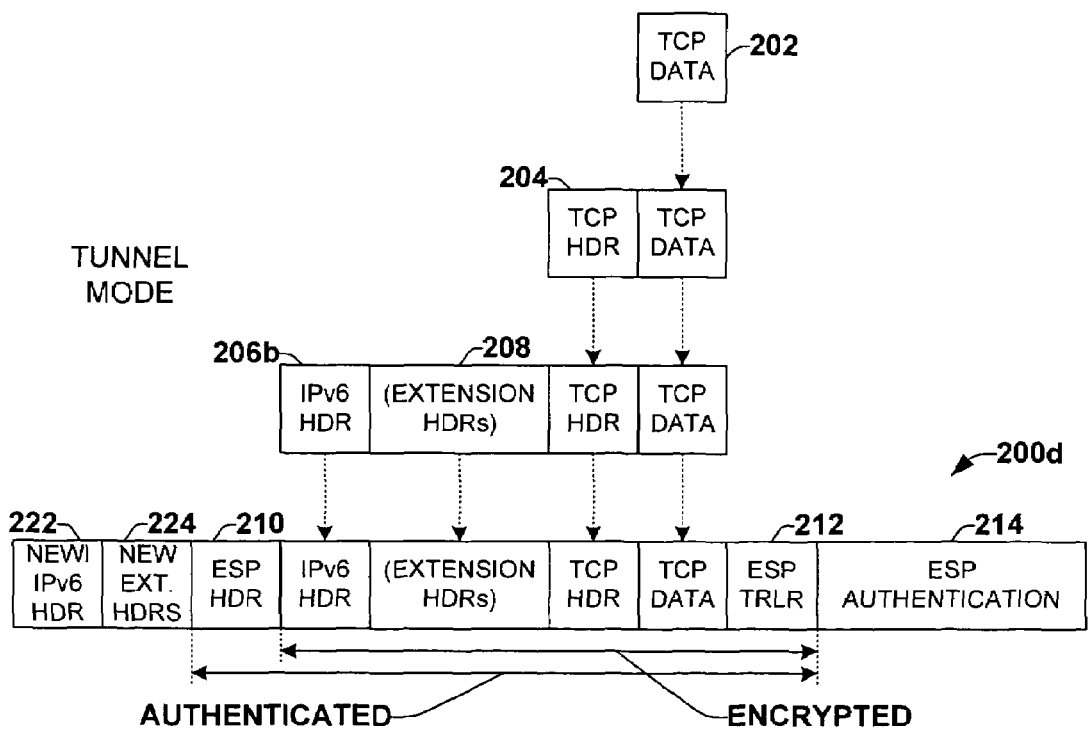
Figure 29E:
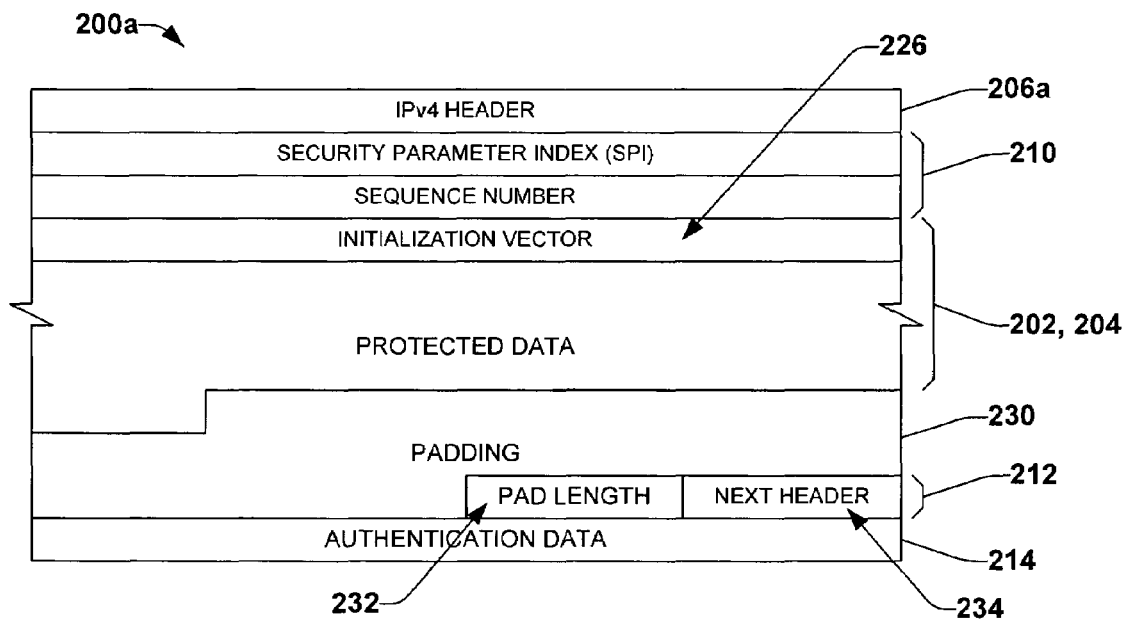
FIG. 29E is a schematic diagram illustrating exemplary ESP header, ESP trailer, authentication data, and protected data.

Referring now to FIGS. 26, 28, and 29A-29I, further details of the descriptors 192 and the operation of the exemplary controller 102 are illustrated and described below. FIG. 28A illustrates the host memory 128, including the controller status block (CSB) 196, frame data buffers 194, an integer number 'n' descriptor rings DR1 . . . DRn for transmit and receive descriptors 192, and an integer number 'm' receive status rings 199 RSR1 . . . RSRm. The transmit and receive descriptors 192 are stored in data structures referred to herein as descriptor rings DR, and the CSB 196 includes descriptor ring pointers DR_PNTR1 . . . DR_PNTRn to the descriptor rings DR. In the exemplary controller 102, four transmit descriptor rings are provided for transmitted frames and four receive descriptor rings are provided for received frames, corresponding to four priorities of network traffic. Each descriptor ring DR in this implementation is treated as a continuous ring structure, wherein the first memory location in the ring is considered to come just after the last memory location thereof. FIG. 28B illustrates pointers and other contents of the exemplary CSB 196 and FIG. 28C illustrates various pointer and length registers 132 in the controller 102. FIG. 28D illustrates further details of an exemplary transmit descriptor ring, and FIG. 28H shows details relating to an exemplary receive status ring. FIGS. 29E and 29F illustrate an exemplary transmit descriptor, FIG. 28G illustrates an exemplary receive descriptor, and FIG. 28I illustrates an exemplary receive status ring entry.

As shown in FIG. 28A, the descriptors 192 individually include pointers to one or more data buffers 194 in the system memory 128, as well as control information, as illustrated in FIGS. 29E-29G. Synchronization between the controller 102 and the software driver 190 is provided by pointers stored in the controller registers 132 (FIG. 28C), pointers stored in the CSB 196 in the system memory 128, and interrupts. In operation, the descriptor management unit 130 in the controller 102 reads the descriptors 192 via the DMA controller 126 of the bus interface 104 in order to determine the memory location of the outgoing frames to be transmitted (e.g., in the data buffers 194) and where to store incoming frames received from the network 108. The CSB 196 is written by the network controller 102 and read by the driver 190 in the host processor 112, and the descriptor management registers 132 are written by the driver 190 and read by the descriptor management unit 130 in the controller 102. The exemplary descriptor system generally facilitates information exchange regarding transmit and receive operations between the software driver 190 and the controller 102.

Referring now to FIG. 28B, the exemplary CSB 196 includes pointers into the descriptor and status rings, as well as a copy of the contents of the controller's interrupt register. Transmit pointers TX_RD_PTR0 through TX_RD_PTR3 are descriptor read pointers corresponding to transmit priorities 3 through 0, respectively, which point just beyond a last 64-bit quad-word (QWORD) that the controller 102 has read from the corresponding priority transmit descriptor ring. Receive status pointers STAT_WR_PTR0 through STAT_WR_PTR3 are descriptor write pointers corresponding to transmit priorities 3 through 0, respectively, which point just beyond the last QWORD that the controller 102 has written to the corresponding priority receive status ring. The CSB 196 also comprises an interrupt zero register copy INT0_COPY, which is a copy of the contents of an interrupt 0 register in the controller 102.

FIG. 28C illustrates registers 132 related to the descriptor management unit 130 in the controller 102. Transmit descriptor base pointers TX_RING[3:0]_BASE include the memory addresses of the start of the transmit descriptor rings of corresponding priority, and the lengths of the transmit descriptor rings are provided in TX_RING[3:0]_LEN registers. Transmit descriptor write pointers are stored in registers TX_WR_PTR[3:0], where the driver software 190 updates these registers to point just beyond the last QWORD that the driver has written to the corresponding transmit descriptor ring. Receive descriptor base pointers RX_RING[3:0]_BASE include the memory address (e.g., in host memory 128) of the start of the receive descriptor rings of corresponding priority, and the lengths of these receive descriptor rings are provided in RX_RING[3:0]_LEN registers. Receive descriptor write pointers RX_WR_PTR[3:0] are updated by the driver 190 to point just beyond the last QWORD that the driver has written to the corresponding receive descriptor ring. Receive status ring base pointer registers STAT_RING[3:0]_BASE indicate the memory address of the receive status rings, and STAT_RING[3:0]_BASE indicate the lengths of the corresponding receive status rings 199 in memory 128. RX_BUF_LEN indicates the number of QWORDS of the receive data buffers 194, where all the receive data buffers 294 are of the same length, and CSB_ADDR indicates the address of the CSB 196 in the host memory 128.

To further illustrate descriptor management operation in data transmission, FIG. 28D illustrates the host memory 128 and the descriptor management unit 130, including an exemplary transmit descriptor ring in the host memory 128 and the corresponding descriptor registers 132 in the descriptor management unit 130 of the controller 102. In addition, FIGS. 5E and 5F illustrate an exemplary transmit descriptor 192a and control flags 193 thereof, respectively. In the transmit descriptor 102 of FIG. 28E, BUF1_ADR[31:0] includes an address in the host memory 128 of the first data buffer 194 associated with the descriptor 192a. The descriptor 192a also includes transmit flags (TFLAGS1, FIGS. 5E and 5F) 193, which include a MORE_CTRL bit to indicate inclusion of a second 64-bit control word with information relating to virtual local area network (VLAN) operation and TCP segmentation operation. An ADD_FCS/IVLEN1 bit and an IVLEN0 bit are used for controlling FCS generation, where these bits indicate the length of an encapsulation security protocol (ESP) initialization vector (IV) when IPsec security and layer 4 processing are selected. An IPCK bit is used to indicate whether the controller 102 generates a layer 3 (IP layer) checksum for transmitted frames, and an L4CK flag bit indicates whether the controller 102 generates a layer 4 (e.g., TCP, UDP, etc.) checksum. Three buffer count bits BUF_CNT indicate the number of data buffers 194 associated with the descriptor 192a, if less than 8. If more than 8 data buffers 194 are associated with the descriptor 192a, the buffer count is provided in the BUF_CNT[7:0] field of the descriptor 192a.

A BYTECOUNT1[15:0] field in the descriptor 192a indicates the length of the first data buffer 194 in bytes. A PAD_LEN field includes a pad length value from an ESP trailer associated with the frame and a NXT_HDR field provides next header information (protocol data for IPv4) from the ESP trailer if the MORE_CTRL bit is set. Following the NXT_HDR field, an ESP_AUTH bit 195 indicates whether the frame includes an authentication data field in the ESP trailer, and a security association (SA) pointer field SA_PTR [14:0] points to an entry in the external SA memory 140 (FIG. 25) that corresponds to the frame. A two bit VLAN tag control command field TCC[1:0] 197 includes a command which causes the controller 102 to add, modify, or delete a VLAN tag or to transmit the frame unaltered, and a maximum segment size field MSS[13:0] specifies the maximum segment size that the TCP segmentation hardware of the controller 102 will generate for the frame associated with the descriptor 192a. If the contents of the TCC field are 10 or 11, the controller 102 will transmit the contents of a tag control information field TCI[15:0] as bytes 15 and 16 of the outgoing frame. Where the frame data occupies more than one data buffer 194, one or more additional buffer address fields BUF_ADR[31:0] are used to indicate the addresses thereof, and associated BYTECOUNT[15:0] fields are used to indicate the number of bytes in the extra frame buffers 194.

When the network software driver 190 (FIG. 27) writes a descriptor 192 to a descriptor ring in order to transmit a frame, it also writes to a descriptor write pointer register 132 in the descriptor management unit registers 132 to inform the controller 102 that new descriptors 192 are available. The value that the driver 190 writes to a given descriptor management register 132 is a pointer to the 64-bit word (QWORD) in the host memory 128 just past the descriptor 192 that it has just written, wherein the pointer is an offset from the beginning of the descriptor ring measured in QWORDs. The controller 102 does not read from this offset or from anything beyond this offset. When a transmit descriptor write pointer register (e.g., DMU register 132 (e.g., TX_WR_PTR1 in FIG. 28D) has been written, the controller 102 starts a transmission process if a transmission is not already in progress. When the transmission process begins, it continues until no unprocessed transmit descriptors 192 remain in the transmit descriptor rings regardless of receipt of additional interrupts. When the controller 102 finishes a given transmit descriptor 192, the controller 102 writes a descriptor read pointer (e.g., pointer TX_RD_PTR1 in FIG. 28D) to the CSB 196.

At this point, the descriptor read pointer TX_RD_PTR1 points to the beginning of the descriptor 192 that the controller 102 will read next. The value of the descriptor 192 is the offset in QWORDs of the QWORD just beyond the end of the last descriptor that has been read. This pointer TX_RD_PTR1 thus indicates to the driver 190 which part of descriptor space it can reuse. The driver 190 does not write to the location in the descriptor space that the read pointer points to or to anything between that location and 1 QWORD before the location that the descriptor write pointer TX_WR_PTR1 points to. When the descriptor read pointer TX_RD_PTR1 is equal to the corresponding descriptor write pointer TX_WR_PTR1, the descriptor ring is empty. To distinguish between the ring empty and ring full conditions, the driver 190 insures that there is always at least one unused QWORD in the ring. In this manner, the transmit descriptor ring is full when the write pointer TX_WR_PTR1 is one less than the read pointer TX_RD_PTR1 modulo the ring size.

Referring also to FIG. 28G, an exemplary receive descriptor 192b is illustrated, comprising a pointer BUF_ADR[31:0] to a block of receive buffers 194 in the host system memory 128, and a count field BUF_MULT[8:0] indicating the number of buffers 194 in the block, wherein all the receive buffers 194 are the same length and only one buffer is used for each received frame in the illustrated example. If the received frame is too big to fit in the buffer 104, the frame is truncated, and a TRUNC bit is set in the corresponding receive status ring entry 199.

FIGS. 5H and 5I illustrate further details of an exemplary receive status ring 199 and an entry therefor, respectively. The exemplary receive status ring entry of FIG. 28I includes VLAN tag control information TCI[15:0] copied from the receive frame and a message count field MCNT[15:0] indicating the number of bytes received which are copied in the receive data buffer 194. A three bit IPSEC_STAT1[2:0] field indicates encoding status from the IPsec security system 124 and a TUNNEL_FOUND bit indicates that a second IP header was found in the received data frame. An AH_ERR bit indicates an authentication header (AH) failure, an ESPA-H_ERR bit indicates an ESP authentication failure, and a PAD_ERR bit indicates an ESP padding error in the received frame. A CRC bit indicates an FCS or alignment error and a TRUNC bit indicates that the received frame was longer than the value of the RX_BUF_LEN register 132 (FIG. 28C above), and has been truncated. A VLAN tag type field TT[1:0] indicates whether the received frame is untagged, priority tagged, or VLAN tagged, and an RX_MATCH[2:0] field indicates a receive address match type. An IP_CK_ERR bit indicates an IPv4 header checksum error, and an IP header detection field IP_HEADER[1:0] indicates whether an IP header is detected, and if so, what type (e.g., IPv4 or IPv6). An L4_CK_ERR bit indicates a layer 4 (e.g., TCP or UDP) checksum error in the received frame and a layer 4 header detection field L4_HEADER indicates the type of layer 4 header detected, if any. In addition, a receive alignment length field RCV_ALIGN_LEN[5:0] provides the length of padding inserted before the beginning of the MAC header for alignment.

In receive operation, the controller 102 writes receive status ring write pointers STAT_WR_PTR[3:0] (FIG. 28B) to the CSB 196. The network driver software 190 uses these write pointers to determine which receive buffers 194 in host memory 128 have been filled. The receive status rings 199 are used to transfer status information about received frames, such as the number of bytes received and error information, wherein the exemplary system provides four receive status rings 199, one for each priority. When the controller 102 receives an incoming frame from the network 108, the controller 102 uses the next receive descriptor 192 from the appropriate receive descriptor ring to determine where to store the frame in the host memory 128. Once the received frame has been copied to system memory 128, the controller 102 writes receiver status information to the corresponding receive status ring 199. Synchronization between controller 102 and the driver software 190 is provided by the receive status write pointers (STAT_WR_PTR[3:0]) in the CSB 196. These pointers STAT_WR_PTR[3:0] are offsets in QWORDs from the start of the corresponding ring.

When the controller 102 finishes receiving a frame from the network 108, it writes the status information to the next available location in the appropriate receive status ring 199, and updates the corresponding receive status write pointer STAT_WR_PTR. The value that the controller 102 writes to this location is a pointer to the status entry in the ring that it will write to next. The software driver 190 does not read this entry or any entry past this entry. The controller 102 does not have registers that point to the first unprocessed receive status entry in each ring. Rather, this information is derived indirectly from the receive descriptor pointers RX_WR_PTR. Thus, when the software driver 190 writes to one of the RX_WR_PTR registers 132 (FIG. 28C) in the controller 102, the driver 190 provides enough space available in the receive status ring 199 for the entry corresponding to this buffer 104.

Transmit Frame Data

Referring now to FIGS. 2-4, 6A-6E, and 7A-7B, the controller 102 transmits frames 200 located in the data buffers 194 in host memory 128 as indicated by the transmit descriptors 192 described above. When an application software program 184 running in the host processor 112 needs to send a packet of data or information to another computer or device on the network 108, the packet is provided to the operating system layer 4 and 3 software (e.g., TCP layer software 186 and IP software 188 in FIG. 27), or other software layers. These software layers construct various headers and trailers to form a transmit frame 200. The network interface driver software 190 then assembles or places the frame 200, including one or more headers, a trailer, and the data packet, into the host memory data buffers 194 and updates the descriptors and descriptor management unit registers 132 in the controller 102 accordingly.

The assembled frame will include layer 3 and layer 4 headers and corresponding checksums (e.g., IP and TCP headers and checksums), as well as a MAC header, as illustrated in FIGS. 7A and 7B. FIGS. 6A and 6C schematically illustrate the formation of transmit frames 200a and 200c using layer 4 TCP, layer 3 internet protocol version 4 (IPv4), and encapsulating security payload (ESP) security processing, for transport and tunnel modes, respectively. FIGS. 6B and 6D schematically illustrate the formation of transmit frames 200b and 200d using IPv6 for transport and tunnel modes, respectively. However, the invention is not limited to TCP/IP implementations and ESP processing; other protocols may be used. For example, the exemplary controller 102 may also be used for transmission and receipt of data using user datagram protocol (UDP) layer 4 software.

In FIGS. 6A-6D, the original data packet from the application software 184 is provided to the TCP layer 186 as TCP data 202. The TCP layer 186 stores the TCP data 202 in host memory 128 and creates a TCP header 204. The exemplary TCP headers are illustrated and described below with reference to FIGS. 7A and 7B. The TCP data 202 and TCP header (e.g., or pointers thereto) are provided to the layer 3 software (e.g., IP layer 188 in this example). The IP layer 188 creates an IP header 206 (e.g., IPv4 headers 206a in FIGS. 6A and 6C, or IPv6 headers 206b in FIGS. 6B and 6D). For IPv6 (FIGS. 6B and 6D), the IP layer 188 may also create optional extension headers 208.

Where ESP processing including ESP encryption and authentication is to be employed, the IP layer 188 also creates an ESP header 210, and ESP trailer 212, and an ESP authentication field 214 for IPv4 (FIGS. 6A and 6C). For IPv6 in transport mode (FIG. 29B), a hop-by-hop destination routing field 216 and a destination option field 218 are created by the IP layer 188. For IPv4 in tunnel mode, the IP layer 188 also creates a new IPv4 header 220. For IPv6 in tunnel mode (FIG. 29D), the IP layer 188 further creates a new IPv6 header 222 and new extension headers 224 preceding the ESP header 210.

For the frame 200a of FIG. 29A, the TCP header 204, the TCP data 202, and the ESP trailer 212 are encrypted, wherein the host software may do the encryption or the exemplary network interface controller 102 may be configured to perform the encryption. Authentication is performed across the ESP header 210 and the encrypted TCP header 204, the TCP data 202, and the ESP trailer 212. For the transport mode IPv6 frame 200b in FIG. 29B, the destination option 218, the TCP header 204, the TCP data 202, and the ESP trailer 212 are encrypted and the ESP header 210 is authenticated together with the encrypted TCP header 204, the TCP data 202, and the ESP trailer 212. In tunnel mode IPv4 example of FIG. 29C, the TCP header 204, the TCP data 202, the original IPv4 header 206a, and the ESP trailer 212 are encrypted and may then be authenticated along with the ESP header 210. For the IPv6 tunnel mode example of FIG. 29D, the TCP header 204, the TCP data 202, the ESP trailer 212, the original extension headers 208, and the original IPv6 header 206b are encrypted, with these and the ESP header 210 being authenticated.

FIG. 29E illustrates an exemplary transmit frame 200a after creation of the ESP header 210 and trailer 212, showing further details of an exemplary ESP header 210. The ESP header 210 includes a security parameters index (SP), which, in combination with the destination IP address of the IP header 206a and the ESP security protocol uniquely identifies the security association (SA) for the frame 200a. The ESP header 210 further includes a sequence number field indicating a counter value used by the sender and receiver to identify individual frames, where the sender and receiver counter values are initialized to zero when a security association is established. The payload data of the frame 200a includes an initialization vector (IV) 226 if the encryption algorithm requires cryptographic synchronization data, as well as the TCP data 202 and TCP or other layer 4 header 204.

Padding bytes 230 are added as needed to fill the plain text data to be a multiple of the number of bytes of a cipher block for an encryption algorithm, and/or to right-align the subsequent PAD LENGTH and NEXT HEADER fields 232 and 234, respectively, in the ESP trailer 212 within a 4-byte word, thereby ensuring that the ESP authentication data 214 following the trailer 212 is aligned to a 4-byte boundary. In the ESP trailer 212, the PAD LENGTH field 232 indicates the number of PAD bytes 230, and the NEXT HEADER field 234 identifies the type of data in the protected payload data, such as an extension header in IPv6, or an upper layer protocol identifier (e.g., TCP, UDP, etc.). Where security processing is selected for the frame 200a, the IP layer 188 modifies the protocol header immediately preceding the ESP header 210 (e.g., the IPv4 header 206a in the illustrated frame 200a) to have a value (e.g., '50') in the PROTOCOL field (e.g., 'NEXT HEADER' field for IPv6) indicating that the subsequent header 210 is an ESP header.

Figure 30A:
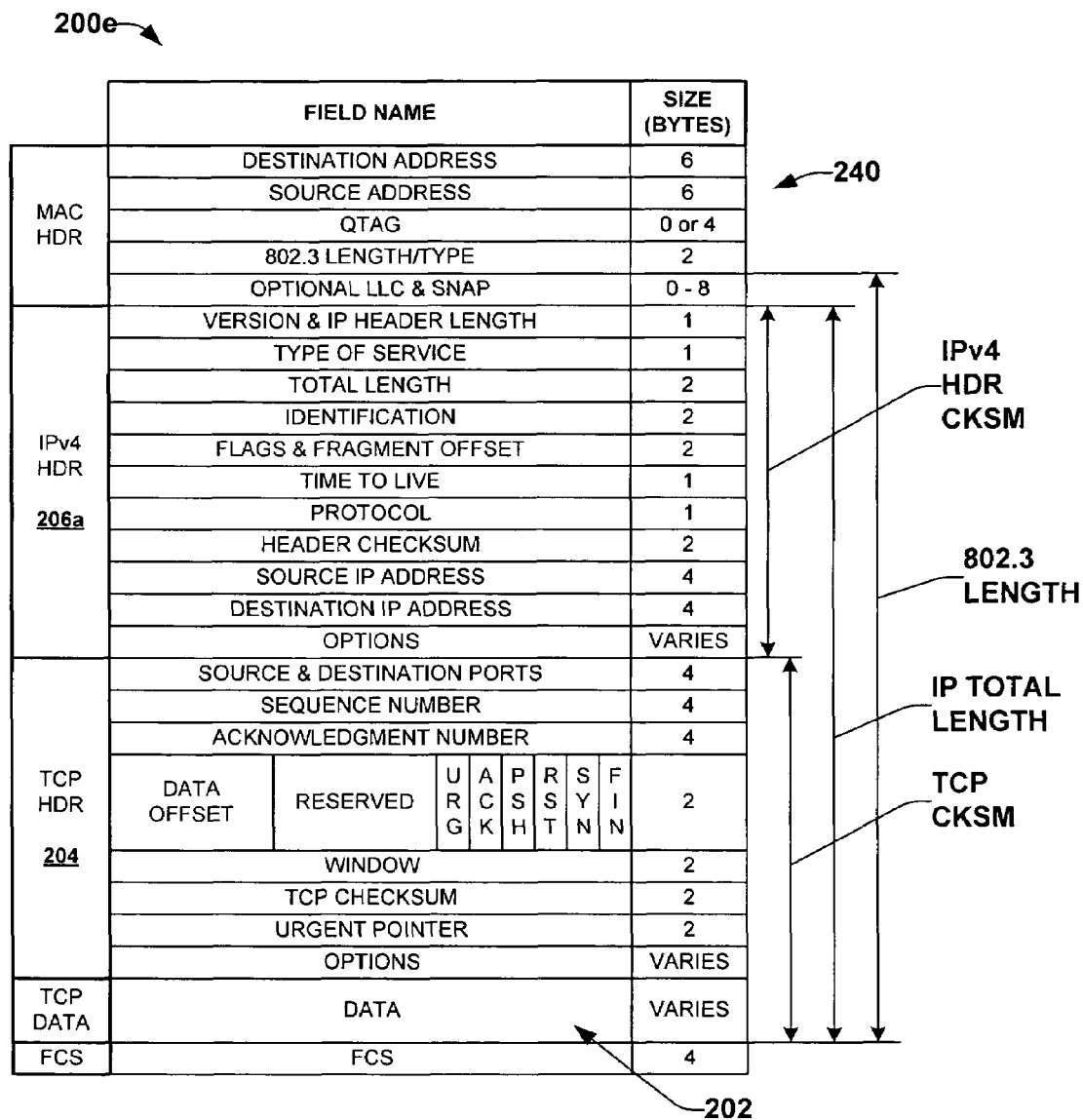
FIGS. 30A and 30B are schematic diagrams illustrating exemplary TCP frame formats for IPv4 and IPv6, respectively.
Figure 30B:
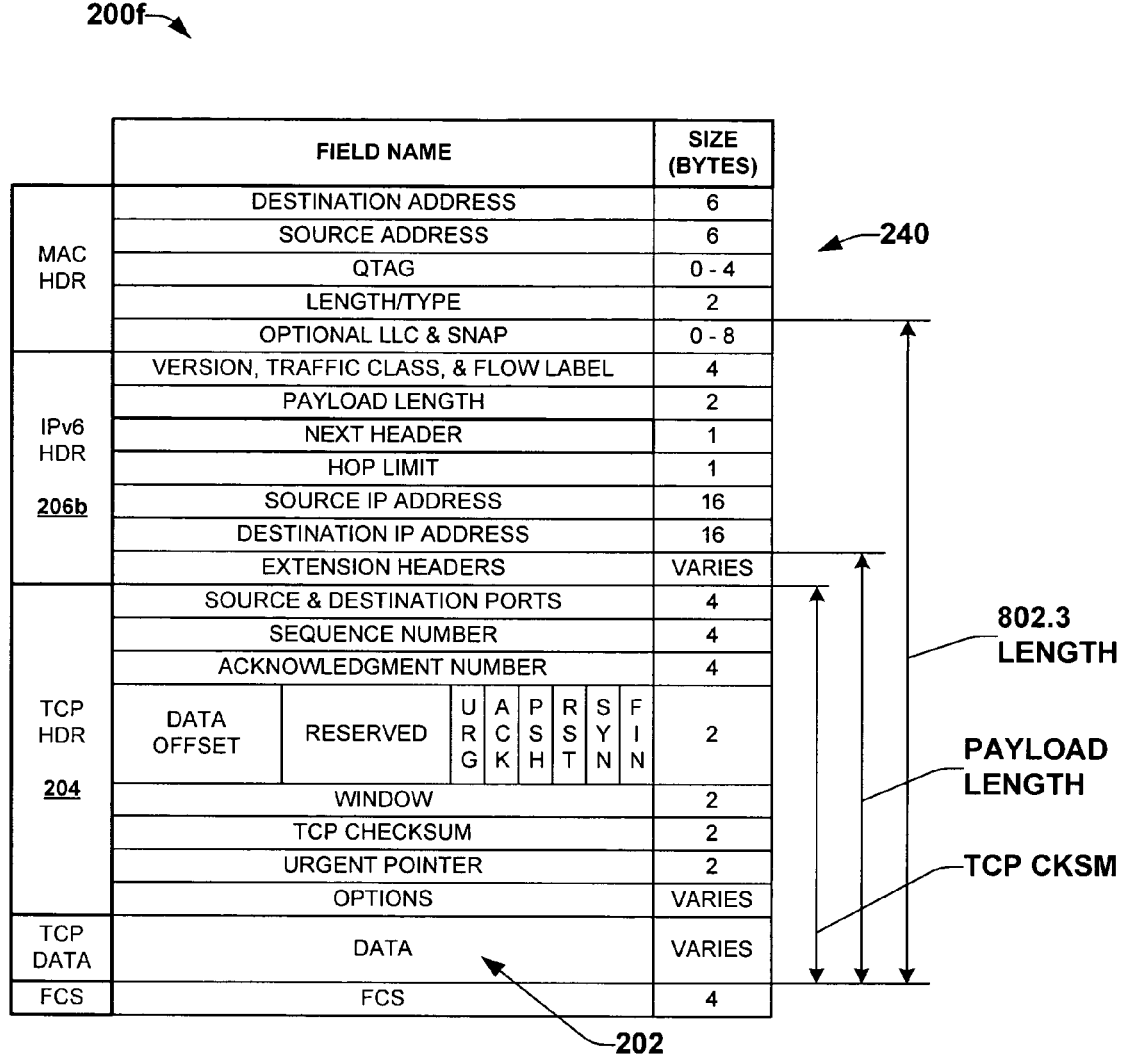
Figure 32:
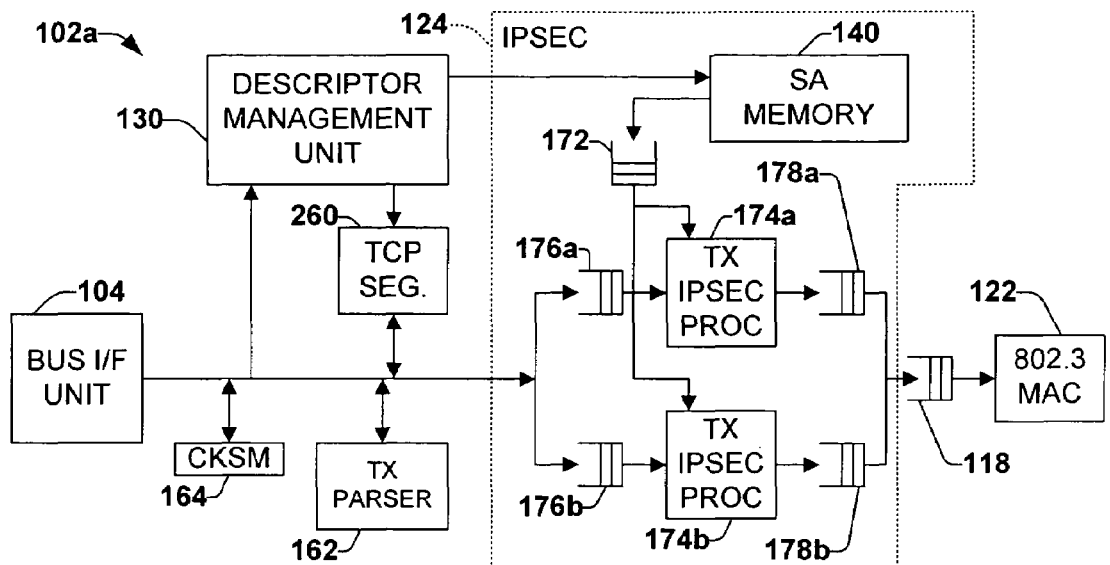
FIG. 32 is a schematic diagram illustrating security processing of outgoing data in the network interface system of FIG. 26.

FIGS. 7A and 7B illustrate exemplary TCP frame formats 200e and 200f for IPv4 and IPv6, respectively, to show the contents of various headers. In FIG. 30A, the exemplary frame 200e is illustrated having a TCP data packet 202, a TCP header 204, an IPv4 header 206a and a MAC header 240, as well as a 4-byte FCS field for a frame check sequence. In FIG. 30B, the frame 200f similarly includes a TCP data packet 202, a TCP header 204, and a MAC header 240, as well as a 4-byte FCS field and an IPv6 header 206b. In both cases, the TCP checksum is computed across the TCP data 202 and the TCP header 204. In the IPv4 example 200e, the IPv4 header checksum (HEADER CHECKSUM field of the IPv4 header 206a) is computed across the IPv4 header 206a, the IP total length (TOTAL LENGTH field in the Ipv4 header 206a) is the combined length of the IPv4 header 206a, the TCP header 204, and the TCP data 202, and the IEEE 802.3 length is the IP total length plus 0-8 bytes for the optional LLC & SNAP field of the MAC header 240 (802.3 LENGTH/TYPE field in the MAC header). In the IPv6 example 2006 of FIG. 30B, the IEEE 802.3 length is the TCP data 202 plus the TCP header 204 and any optional extension headers (illustrated as the last field in the IPv6 header in FIG. 30B), the value of which goes into the LENGTH/TYPE field of the MAC header 240, and the IP payload length is the TCP data 202 plus the TCP header 204 and any optional extension headers (PAYLOAD LENGTH field of the IPv6 header 206b).

TCP Segmentation

Referring now to FIGS. 8A-8D and 9, the controller 102 can optionally perform outgoing TCP and/or IP layer checksumming, TCP segmentation, and/or IPsec security processing. Where one or more of these functions are offloaded from the host processor 112 to the controller 102, the layer 3 software 186 may provide certain of the fields in the frame 200 (e.g., checksums, lengths, etc.) with pseudo values. With respect to TCP layer segmentation, the controller 102 can be programmed to automatically retrieve a transmit frame from the host memory 128, and where the frame is large, to break the large frame into smaller frames or frame segments which satisfy a maximum transmission unit (MTU) requirement of the network 108 using a TCP segmentation system 260. The segmentation system 260 comprises any circuitry operatively coupled with the descriptor management unit 130, and is configured to perform the segmentation tasks as described herein. The controller 102 transmits the smaller frames (the large frame segments) with appropriate MAC, IP, and TCP headers. In the illustrated example, the original TCP frame 200 in the host system memory 128 is in the form of a (possibly oversized) IEEE 802.3 or Ethernet frame complete with MAC, IP, and TCP headers. In the exemplary controller 102, the IP headers 206 can be either version 4 or version 6, and the IP and TCP headers may include option fields or extension headers. The network controller 102 will use suitably modified versions of these headers in each segmented frame that it automatically generates. In the exemplary device 102, the original TCP frame can be stored in host system memory 128 in any number of the buffers 194, wherein all headers from the beginning of the frame through the TCP header 204 may be stored in the first buffer 194.

Referring also to FIGS. 7A and 7B, the frame fields 802.3 LENGTH/TYPE, TOTAL LENGTH, IDENTIFICATION, HEADER CHECKSUM, SEQUENCE NUMBER, PSH, FIN, and TCP CHECKSUM of the IPv4 frame 200e (FIG. 30A) are modified in the controller 102 and the others are copied directly from the original frame. In FIG. 30B, the LENGTH/TYPE, PAYLOAD LENGTH, SEQUENCE NUMBER, PSH, FIN, and TCP CHECKSUM fields of the IPv6 frame 200f are modified in the controller 102 for each generated (e.g., segmented) frame. The other fields are copied from the original frame. To enable automatic TCP segmentation for a frame 200 by the controller 102, the driver 190 in the host 112 sets the bits in the MORE_CTRL field (FIG. 28F) of the corresponding transmit descriptor 192, and also includes a valid value for the maximum segment size (MSS[13:0]) field of the descriptor 192. For all corresponding generated frames except for the last frame, the length will be the value of the MSS[13:0] field plus the lengths of the MAC, IP, and TCP headers 240, 206, and 204, respectively, plus four bytes for the FCS. The length of the last frame generated may be shorter, depending on the length of the original unsegmented data.

FIG. 31A illustrates a table 250 showing frame fields modified by outgoing ESP processing, and FIG. 31B shows a table 252 with the frame fields modified by authentication header (AH) processing, wherein the tables 250 and 252 further indicate which frame fields are created by the host processor software, and those added by the controller 102. Before submitting a transmit frame to the controller 102 for automatic TCP segmentation, the IP layer 188 (FIG. 27) provides an adjusted pseudo header checksum in the TCP checksum field of the TCP header 204. FIGS. 8C and 8D provide tables 254 and 256 illustrating pseudo header checksum calculations for IPv4 and IPv6, respectively, performed by the IP layer software 188 in generating the transmit frames 200. The value of this checksum is a standard TCP pseudo header checksum described in the Transmission Control Protocol Functional Specification (RFC 793), section 3.1 for IPv4 frames and in the Internet Protocol, Version 6 Specification (RFC 2460), section 8.1 for IPv6 frames, except that the value zero is used for the TCP length in the calculation. The controller 102 adds the TCP length that is appropriate for each generated segment.

For IPv4 frames, the pseudo header 254 in FIG. 31C includes the 32-bit IP source address, the 32-bit IP destination address, a 16-bit word consisting of the 8-bit Protocol Field from the IP Header padded on the left with zeros, and the TCP length (which is considered to be 0 in this case). For IPv6 frames, the pseudo header 256 in FIG. 31D includes the 128-bit IPv6 source address, the 128-bit IPv6 destination address, the 16-bit TCP length (which is considered to be zero), and a 16-bit word consisting of the 8-bit Protocol identifier padded on the left with zeros. The 8-bit protocol identifier is the contents of the Next Header field of the IPv6 Header or of the last IPv6 extension Header, if extension headers are present, with a value of 6 for TCP. If TCP or UDP checksum generation is enabled without TCP segmentation, the TCP length used in the pseudo header checksum includes the TCP header plus TCP data fields. However, when TCP segmentation is enabled, the controller 102 automatically adjusts the pseudo header checksum to include the proper length for each generated frame.

Where the controller 102 is programmed to perform TCP segmentation, the values of the various modified fields are calculated as described below. The LENGTH/TYPE field in the MAC header 240 is interpreted as either a length or an Ethernet type, depending on whether or not its value is less than 600 h. If the value of the field is 600 h or greater, the field is considered to be an Ethernet type, in which case the value is used for the LENGTH/TYPE field for all generated frames. However, if the value is less than 600 h, the field is interpreted as an IEEE 802.3 length field, in which case an appropriate length value is computed in the controller 102 for each generated frame. The value generated for the length field will indicate the length in bytes of the LLC Data portion of the transmitted frame, including all bytes after the LENGTH/TYPE field except for the FCS, and does not include any pad bytes that are added to extend the frame to the minimum frame size. The Tx parser 162 in the controller 102 parses the headers of the transmit frames 200 to determine the IP version (IPv4 or IPv6) and the location of the various headers. The IPv4 TOTAL LENGTH is the length in bytes of the IPv4 datagram, which includes the IPv4 header 206a (FIG. 30A), the TCP header 204, and the TCP data 202, not including the MAC header 240 or the FCS. If the IP version is 4, the hardware will use this information to generate the correct TOTAL LENGTH field for each generated frame. For IPv6, the PAYLOAD LENGTH field is computed as the number of bytes of the frame 200f between the first IPv6 header and the FCS, including any IPv6 extension headers. For both IPv4 and IPv6, the Tx parser 162 generates the corresponding TOTAL LENGTH or PAYLOAD LENGTH field values for each generated transmit frame where TCP segmentation is enabled.

Because each generated TCP segment is transmitted as a separate IP frame, the IDENTIFICATION field in the IPv4 header of each segment frame is unique. In the first such segment frame, the IDENTIFICATION field is copied from the input frame by the Tx parser 162 into the appropriate location in the first memory 116 in constructing the first segment frame. The parser 162 generates IDENTIFICATION fields for subsequent segment frames by incrementing by one the value used for the previous frame. For the SEQUENCE NUMBER field in the TCP header 204, the TCP protocol software 186 establishes a logical connection between two network nodes and treats all TCP user data sent through this connection in one direction as a continuous stream of bytes, wherein each such frame is assigned a sequence number. The TCP SEQUENCE NUMBER field of the first TCP packet includes the sequence number of the first byte in the TCP data field 202. The SEQUENCE NUMBER field of the next TCP packet sent over this same logical connection is the sequence number of the previous packet plus the length in bytes of the TCP data field 202 of the previous packet. When automatic TCP segmentation is enabled, the Tx parser 162 of the controller 102 uses the TCP SEQUENCE NUMBER field from the original frame for the sequence number of the first segment frame 200, and the SEQUENCE NUMBER for subsequent frames 200 is obtained by adding the length of the TCP data field 202 of the previous frame 200 to the SEQUENCE NUMBER field value of the previous segment frame 200.

The TCP push (PSH) flag is an indication to the receiver that it should process the received frame immediately without waiting for the receiver's input buffer to be filled, for instance, where the input buffer may have space for more than one received frame. When automatic TCP segmentation is requested, the parser 162 in the controller 102 sets the PSH bit to 0 for all generated frames 200 except for the last frame 200, which is set to the value of the PSH bit from the original input frame as set by the TCP layer software 186. The TCP finish (FIN) flag is an indication to the receiver that the transmitter has no more data to transmit. When automatic TCP segmentation is requested, the parser 162 sets the FIN bit to 0 for all generated segment frames 200 except for the last frame 200. The parser 162 inserts the value of the FIN bit from the original input frame (e.g., from the TCP layer software 186) for the value of the FIN bit in the last generated segment frame 200.

Checksum Generation and Verification

The exemplary controller 102 may be programmed or configured to generate layer 3 (e.g., IP) and/or layer 4 (e.g., TCP, UDP, etc.) checksums for transmitted frames 200, and to automatically verify such checksums for incoming (e.g., received) frames 200. Alternately, the host computer or driver can generate and verify checksums. The exemplary controller 102 accommodates IP checksums as defined in RFC 791 (Internet Protocol), TCP checksums defined in RFC 793 (Transmission Control Protocol) for IPv4 frames 200e, UDP checksums as defined in RFC 768 (User Datagram Protocol) for IPv4 frames, as well as TCP and UDP checksums for IPv6 frames 200f as set forth in RFC 2460 (Internet Protocol, Version 6 Specification). With respect to IP checksums, the value for the HEADER CHECKSUM field in the IPv4 header 206a is computed in the transmit checksum system 164 as a 16-bit one's complement of a one's complement sum of all of the data in the IP header 206a treated as a series of 16-bit words. Since the TOTAL LENGTH and IDENTIFICATION fields are different for each generated segment frame 200e, the transmit checksum system 164 calculates a HEADER CHECKSUM field value for each segment frame that the controller 102 generates.

The transmit checksum system 164 may also compute TCP layer checksums for outgoing frames 200. The value for the TCP CHECKSUM field in the TCP header 204 is computed as a 16-bit one's complement of a one's complement sum of the contents of the TCP header 204, the TCP data 202, and a pseudo header that contains information from the IP header.

The headers and data field are treated as a sequence of 16-bit numbers. While computing the checksum, the checksum field itself is replaced with zeros. The checksum also covers a 96-bit pseudo header (FIG. 31C or 8D) conceptually prefixed to the TCP header. This pseudo header contains the source address, the destination address, the protocol, and TCP length. If the TCP Data Field contains an odd number of bytes, the last byte is padded on the right with zeros for the purpose of checksum calculation. (This pad byte is not transmitted). To generate the TCP checksum for a segment frame 200, the transmit checksum system 164 updates the TCP SEQUENCE NUMBER field and the PSH and FIN bits of the TCP header 204 and sets the TCP CHECKSUM field to the value of the TCP CHECKSUM field from the original input frame 200. In addition, the transmit checksum system 164 initializes an internal 16-bit checksum accumulator with the length in bytes of the TCP header 204 plus the TCP data field 202, adds the one's complement sum of all of the 16-bit words that make up the modified TCP header 204 followed by the TCP data 202 for the segment to the accumulator, and stores the one's complement of the result in the TCP CHECKSUM field of the segment frame 200.

The IPCK and L4CK bits in the transmit descriptor 192a (FIG. 28F) control the automatic generation of checksums for transmitted frames 200 in the controller 102. Setting the IPCK bit causes the IP Header Checksum to be generated and inserted into the proper position in the IPv4 frame 200e of FIG. 30A. Similarly setting L4CK causes either a TCP CHECKSUM or a UDP checksum to be generated, depending on which type of layer 4 header is found in the outgoing frame 200. Since an IPv6 header 206b (FIG. 30B) does not have a header checksum field, the IPCK bit in the descriptor is ignored for IPv6 frames 200f. If TCP or UDP checksum generation is required for an outgoing frame 200, the layer 4 software 186 also puts the pseudo header checksum in the TCP or UDP checksum field. The controller 102 then replaces this value with the checksum that it calculates over the entire TCP or UDP segment, wherein the values of the generated TCP or UDP checksum differs when TCP segmentation is enabled. For TCP segmentation, the value 0 is used for the TCP TOTAL LENGTH in the pseudo header checksum calculation. For TCP or UDP checksum generation, the TCP TOTAL LENGTH value is the length of the TCP header 204 plus the length of the TCP data 202 as described in the RFCs referenced above.

The controller 102 can also be configured or programmed by the host 112 to verify checksums for received frames via the checksum and pad check system 156. When so enabled or when security (e.g., IPsec) processing is required, the controller 102 examines incoming (e.g., received) frames to identify IPv4, IPv6, TCP and UDP headers, and writes the corresponding codes to the IP_HEADER and L4_HEADER fields of the receive status ring 199 (FIG. 28I) entry to indicate which layer 3 and/or layer 4 headers it has recognized. When the device recognizes a header having a checksum, the receive checksum and pad check system 156 calculates the appropriate checksum as described in RFC 791, RFC 793, RFC 768, or RFC 2460 and compares the result with the checksum found in the received frame. If the checksums do not agree, the device sets the IP_CK_ERR and/or L4_CK_ERR bit in the corresponding receive status ring entry 199.

Security Processing

Referring now to FIGS. 26-28, 33, 34, and 35A-35E, the exemplary IPsec security system 124 is configurable to provide Internet protocol security (IPsec) authentication and/or encryption/decryption services for transmitted and received frames 200 in accordance with RFC 2401. For authentication header (AH) processing the module implements the HMAC-MD5-96 algorithm defined in RFC 2404 and the HMAC-SHA-1-96 defined in RFC 2404. The HMAC-MD5-96 implementation provides a 128-bit key, a 512-bit block size, and a 128-bit message authentication code (MAC), truncated to 96 bits. The implementation of the HMAC-SHA-1-96 algorithm provides a 160-bit key, a 512-bit block size, and a 160-bit message authentication code (MAC), truncated to 96 bits. For encapsulating security payload (ESP) processing, the IPsec module 124 also implements the HMAC-MD5-96 and HMAC-SHA-1-96 algorithms for authentication and the ESP DES-CBC (RFC 2406), the 3DES-CBC, and the AES-CBC (draft-ietf-ipsec-ciph-aes-cbc-01) encryption algorithms. The DES-CBC algorithm in the IPsec module 124 provides a 64-bit key (including 8 parity bits), a 64-bit block size, and cipher block chaining (CBC) with explicit initialization vector (IV). The 3DES-CBC algorithm provides a 192-bit key (including 24 parity bits), a 64-bit block size, and CBC with explicit IV. The AES-CBC algorithm provides a 128-, 192-, or 256-bit key; 10, 12, or 14 rounds, depending on key size; a 128-bit block size, and CBC with explicit IV.

The exemplary security system 124 provides cryptographically-based IPsec security services for IPv4 and IPv6, including access control, connectionless integrity, data origin authentication, protection against replays (a form of partial sequence integrity), confidentiality (encryption), and limited traffic flow confidentiality. These services are provided at layer 3 (IP layer), thereby offering protection for IP and/or upper layer protocols. One or both of two traffic security protocols are used, the authentication header (AH) protocol, and the encapsulating security payload (ESP) protocol. The IP authentication header (AH) provides connectionless integrity, data origin authentication, and an optional anti-replay service, and the ESP protocol provides confidentiality (encryption), and limited traffic flow confidentiality, and may provide connectionless integrity, data origin authentication, and an anti-replay service. The AH and ESP security features may be applied alone or in combination to provide a desired set of security services in IPv4 and IPv6, wherein both protocols support transport mode and tunnel mode. In transport mode, the protocols provide protection primarily for upper layer protocols and in tunnel mode, the protocols are applied to tunneled IP packets.

For outgoing frames 200, the controller 102 selectively provides IPsec authentication and/or encryption processing according to security associations (SAs) stored in the SA memory 140. If an outgoing frame 200 requires IPsec authentication, the IPsec unit 124 calculates an integrity check value (ICV) and inserts the ICV into the AH header or ESP trailer 212 (FIGS. 6A-6D). If the frame 200 requires encryption, the unit 124 replaces the plaintext payload with an encrypted version. For incoming (e.g., received) frames, the IPsec unit 124 parses IPsec headers to determine what processing needs to be done. If an IPsec header is found, the IPsec system 124 uses the security parameters index (SPI) from the header plus the Ipsec protocol type and IP destination address to search the SA memory 140 to retrieve a security association corresponding to the received frame. Acceptable combinations of IPsec headers for the exemplary controller 102 include an AH header, an ESP header, and an AH header followed by an ESP header.

For IPsec key exchange, the host 112 negotiates SAs with remote stations and writes SA data to the SA memory 140. In addition, the host 112 maintains an IPsec security policy database (SPD) in the system memory 128. For each transmitted frame 200 the host processor 112 checks the SPD to determine what security processing is needed, and passes this information to the controller 102 in the transmit descriptor 192*a* (FIG. 28E) as a pointer SA_PTR[14:0] to the appropriate SA in the SA memory 140. For incoming received frames 200 the controller 102 reports what security processing it has done in the receive status ring entry 199 (FIG. 28I), and the host processor 112 checks the SPD to verify that the frame 200 conforms with the negotiated policy. The SAs include information describing the type of security processing that must be done and the encryption keys to be used. Individual security associations describe a one-way connection between two network entities, wherein a bi-directional connection requires two SAs for incoming and outgoing traffic. SAs for incoming traffic are stored partly in an internal SPI table or memory 270 (FIG. 33) and partly in the external SA memory 140. These SA tables are maintained by the host processor 112, which writes indirectly to the SPI table 270 and the SA memory 140 by first writing to an SA data buffer in host memory 128 and then writing a command to the SA address register. This causes the controller 102 to copy the data to the external SA memory 140 and to the internal SPI table memory 270.

One of the fields in an SPI table entry is a hash code calculated by the host 112 according to the IP destination address. In addition, the host 112 calculates a hash code based on the SPI to determine where to write an SPI table. If an incoming or outgoing SA requires authentication, the host CPU calculates the values H(K XOR ipad) and H(K XOR opad) as defined in RFC 2104, HMAC: Keyed-Hashing for Message Authentication, where the host 112 stores the two resulting 128 or 160-bit values in the SA memory 140. If necessary, at initialization time the host CPU can indirectly initialize the Initialization Vector (IV) registers used for Cipher Block Chaining in each of four encryption engines in the IPsec system 124.

Figure 33:
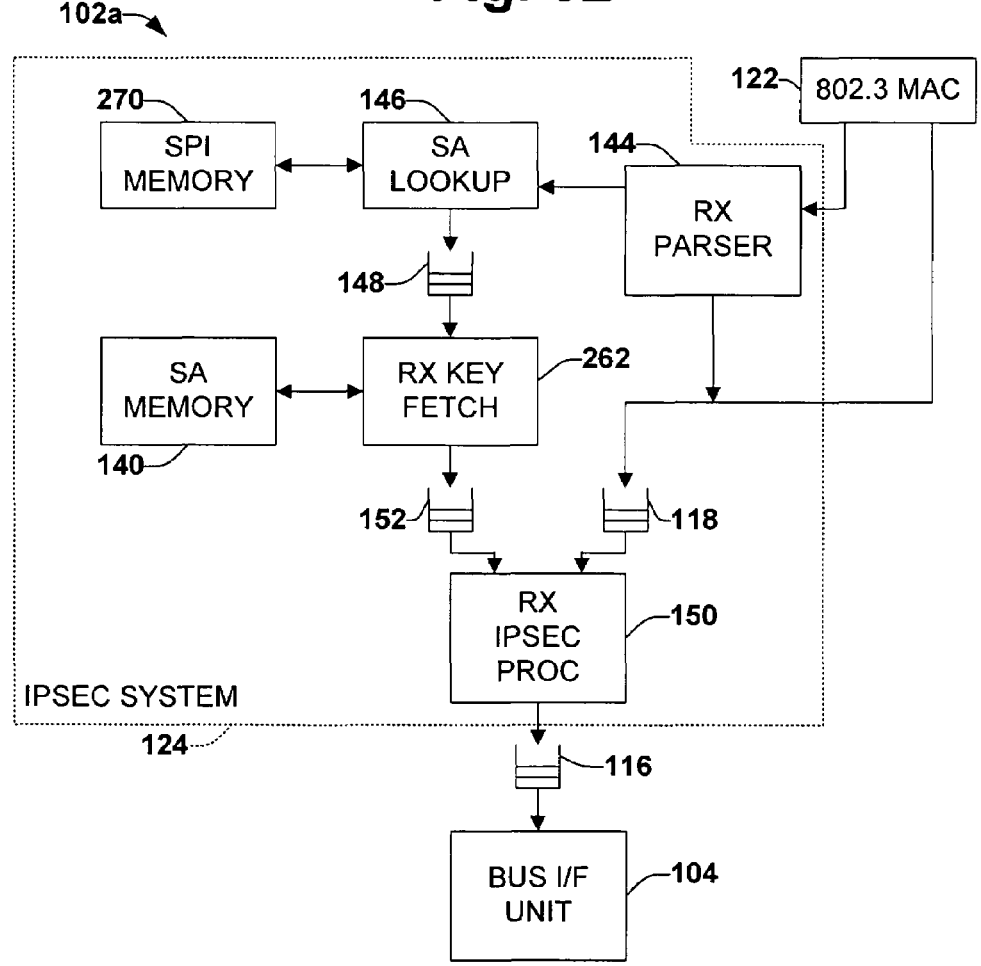
FIG. 33 is a schematic diagram illustrating security processing of incoming network data in the network interface system of FIG. 26.

Referring to FIGS. 26 and 33, to begin a transmission process, the host processor 112 prepares a transmit frame 200 in one or more data buffers 194 in the host memory 128, writes a transmit descriptor 192*a* (e.g., FIG. 28E) in one of the transmit descriptor rings, and updates the corresponding transmit descriptor write pointer (TX_WR_PTR[x]). The frame data in the data buffers 194 includes space in the IPsec headers for authentication data 214, for an initialization vector (IV) 226, and for an ESP trailer 212 if appropriate (e.g., FIG. 29E). The contents of these fields will be generated by the IPsec system 124 in the controller 102. Similarly, if padding is required (e.g., for alignment or to make the ESP payload an integer multiple of encryption blocks), the padding is included in the host memory buffers 194, and sequence numbers for the AH and ESP SEQUENCE NUMBER fields are provided in the data buffers 194 by the host 112. The IPsec system 124 does not modify these fields unless automatic TCP segmentation is also selected, in which case the IPsec system 124 uses the sequence numbers from the buffers 194 for the first generated frame 200 and then increments these numbers appropriately for the rest of the generated segment frames. If IPsec processing is required for a particular outgoing frame 200, the corresponding transmit descriptor 192*a* includes a pointer in the SA_PTR field to the appropriate SA entry in the external SA memory 140, and the IPsec system 124 uses information from the SA to determine how to process the frame 200. The transmit parser 162 examines the frame 200 to determine the starting and ending points for authentication and/or encryption and where to insert the authentication data 214, if necessary.

If ESP encryption is required, the IPsec system 124 encrypts the payload data using the algorithm and key specified in the SA. If ESP authentication is required, the system 124 uses the authentication algorithm and IPAD/OPAD information specified in the SA to calculate the authentication data integrity check value (ICV), and stores the results in the authentication data field 214. If both ESP encryption and authentication are required, the encryption is done first, and the encrypted payload data is then used in the authentication calculations. The encryption and authentication processes are pipelined so that the encryption engine within one of the IPsec processors 174 is processing one block of data while the authentication engine is processing the previous block. The IPsec system 124 does not append padding to the payload data field, unless automatic TCP segmentation is also enabled. The host processor 112 provides the ESP trailer 212 with appropriate padding in the frame data buffers 194 in the system memory 128, and also provides the proper value for the ESP SEQUENCE NUMBER field in the ESP header 210 (FIG. 29E).

If ESP processing is combined with automatic TCP segmentation, the IPsec system 124 adds any necessary pad bytes to make the encrypted data length a multiple of the block length specified for the selected encryption algorithm. If ESP processing is combined with TCP or UDP checksum generation, the host 112 provides correct NEXT HEADER and PAD LENGTH values for the ESP trailer 212 and the Transmit Descriptor 192*a* (FIG. 28E). If ESP processing is combined with automatic TCP segmentation, the host 112 provides values for the NEXT HEADER and PAD LENGTH fields of the transmit descriptor 192*a* that are consistent with the corresponding frame data buffers 194. In this combination, the controller 102 copies the NEXT HEADER field from the transmit descriptor 192*a* into the ESP trailer 212 of each generated frame 200, and uses the PAD LENGTH field of the descriptor 192*a* to find the end of the TCP data field 202 in the frame data buffer 194. In addition, the maximum segment size field MSS[13:0] of the transmit descriptor 192*a* is decreased to compensate for the IPsec header(s), the ESP padding, and the ICV.

Where ESP processing is combined with TCP segmentation or with TCP or UDP checksum generation, the software driver 190 sets the ESP_AH, IVLEN0, and IVLEN1 bits of the transmit descriptor 192*a* accordingly. The transmit parser 162 uses this information to locate the TCP or UDP header 204, and if no TCP or UDP processing is required, these bits are ignored. For frames 200 requiring ESP processing, FIG. 31A illustrates which fields are created by the host 112 and included in the buffers 194 and those fields that are modified by the ESP processing hardware in the security system 124.

The encryption algorithms supported by the IPsec system 124 employ cipher block chaining (CBC) mode with explicit initialization vectors (IVs 226, FIG. 29E). To allow a certain amount of parallel processing the IPsec system 124 includes two TX IPSEC processor systems 174*a* and 174*b*, each of which comprises a DES/3DES (data encryption standard) encryption system and an advanced encryption standard (AES) encryption engine. Each of the four encryption engines in the TX IPSEC processors 174 includes an IV register, which are cleared to zero on reset. When the controller 102 is enabled, the contents of the IV register associated with an encryption engine are used as the initialization vector 226 for the first transmit frame 200 encrypted by that engine. Thereafter the last encrypted data block from one frame 200 is used as the IV 226 for the following frame 200. The host processor 112 can initialize the IV registers in the IPsec system 124 with random data, for example, by transmitting frames 200 with random data in the payload fields. In one example, the host 112 can put the external PHY device into an isolate mode to prevent these random data frames 200 from reaching the network 108. The IPsec system 124 inserts the IV value 226 at the beginning of the payload field. The host 112 provides space in the frame data buffer 194 for this field 226. The length of the IV 226 is the same as the encryption block size employed in the TX IPSEC processors 174, for example, 64 bits for the DES and 3DES algorithms, and 128 bits for the AES algorithm.

Where authentication header (AH) processing is selected, the security system 124 employs authentication algorithm and authentication ipad and opad data specified in the SA to calculate the authentication data integrity check value (ICV), and it stores the results in the authentication data field 214. The transmit Ipsec parser 170 detects mutable fields (as defined by the AH specification, RFC 2402) and insures that the contents of these fields and the authentication data field 214 are treated as zero for the purpose of calculating the ICV. In the ICV calculation the IPsec system 124 employs the destination address from the SA rather than the destination address from the packet's IP header 206, to ensure that if source routing options or extensions are present, the address of the final destination is used in the calculation. For transmit frames 200 that require AH processing, FIG. 31B illustrates the fields created by the host 112 and included in the buffers 194, as well as those fields modified by the AH processing hardware in the IPsec system 124.

Referring now to FIGS. 26 and 34, the IPsec system 124 provides security processing for incoming (e.g., received) frames 200 from the network 108. The RX parser 144 examines incoming frames 200 to find IPsec headers, and looks up the corresponding SA in the SA memory 140. The RX IPSEC processor 150 then performs the required IPsec authentication and/or decryption according to the SA. If decryption is required, the processor 150 replaces the original ciphertext in the frame 200 with plaintext in the memory 116. The descriptor management unit 130 sets status bits in the corresponding receive status ring entry 199 (FIG. 28I) to indicate what processing was done and any errors that were encountered.

FIG. 33 illustrates the flow of incoming data through the IPsec system 124. The receive parser 144 examines the headers of incoming frames 200 from the MAC engine 122 while the incoming frame 200 is being received from the network 108. The parser 144 passes the results of its analysis to the SA lookup logic 146. This information is also provided to the memory 118 in the form of a control block that is inserted between frames 200. The control block includes information about the types and locations of headers in the incoming frame 200. If the parser 144 finds that a frame 200 includes an IP packet fragment, IPsec processing is bypassed, and the frame 200 is passed on to the host memory 128 with an IP Fragment bit being set in the IPSEC_STAT1 field in the corresponding receive status ring entry 199. For IPv4 frames, a fragment is identified by a non-zero fragment offset field or a non-zero more fragments bit in the IPv4 header. For IPv6 packets, a fragment is indicated by the presence of a fragment extension header.

If the parser 144 finds an IPsec header or an acceptable combination of headers, it passes the SPI, the IP destination address, and a bit indicating the IPsec protocol (AH or ESP) to the SA lookup engine 146. The SA lookup engine 146 uses the SPI, protocol bit, and a hash of the destination address to search an internal SPI memory 270 (FIG. 33). The results of this search are written to the SA pointer FIFO 148, including a pointer to an entry in the external SA memory 140, a bit that indicates whether IPsec processing is required, and two bits that indicate the success or failure of the SA lookup. The SA pointer FIFO 148 includes an entry corresponding to each incoming frame 200 in the memory 118. If the SA pointer FIFO 148 does not have room for a new entry at the time that an incoming frame 200 arrives from the network 108 or if the received frame 200 would cause the receive portion of the memory 118 to overflow, the frame 200 is dropped, and a receive missed packets counter (not shown) is incremented.

An RX KEY FETCH state machine 262 (FIG. 33) retrieves the corresponding entry from the SA pointer FIFO 148 and determines what, if any, processing is required. If the control bits indicate that processing is required, the state machine 262 uses the contents of the pointer field to fetch the SA information from the external SA memory 140. If a DA field of the SA does not match the DA field of the IP header in the frame 200, the IPsec processor 150 causes an error code to be written to the receive status ring 199 and passes the frame 200 to the memory 118 unmodified. If the DA field of the SA matches the DA field of the IP header, the processor 150 decrypts the payload portion of the received frame 200 and/or checks the authentication data as required by the SA.

Figure 34A:
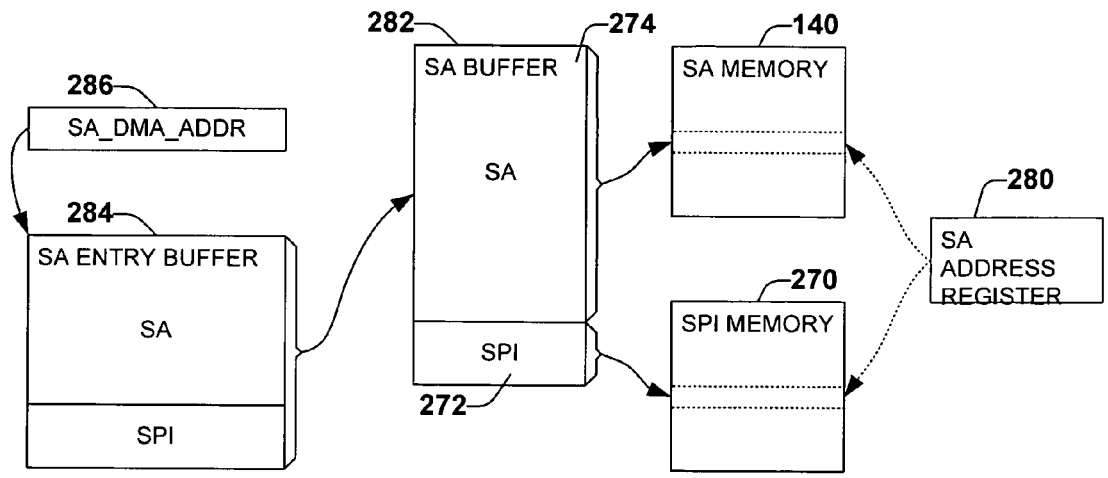
FIG. 34A is a schematic diagram illustrating an exemplary security association table write access in the network interface system of FIG. 26.
Figure 34B:
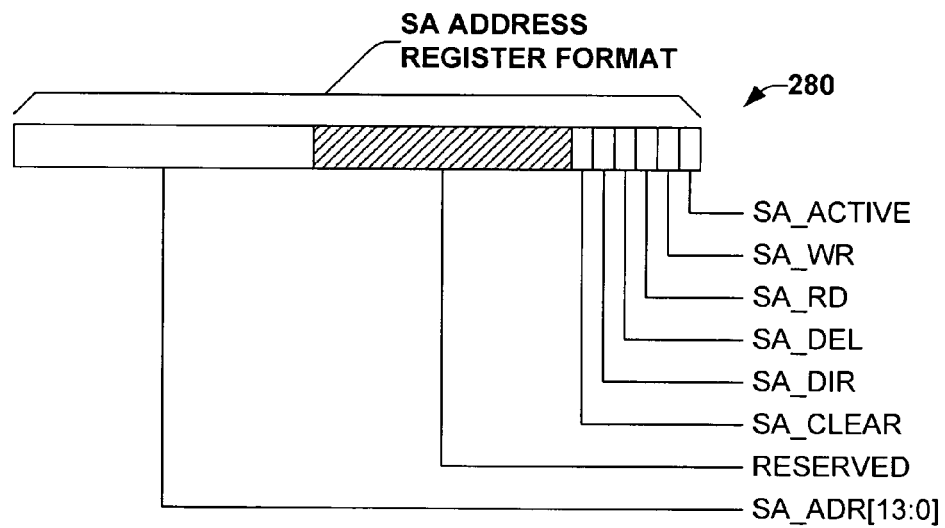
FIG. 34B is a schematic diagram illustrating an exemplary SA address register format in the network interface system of FIG. 26.
Figure 34C:
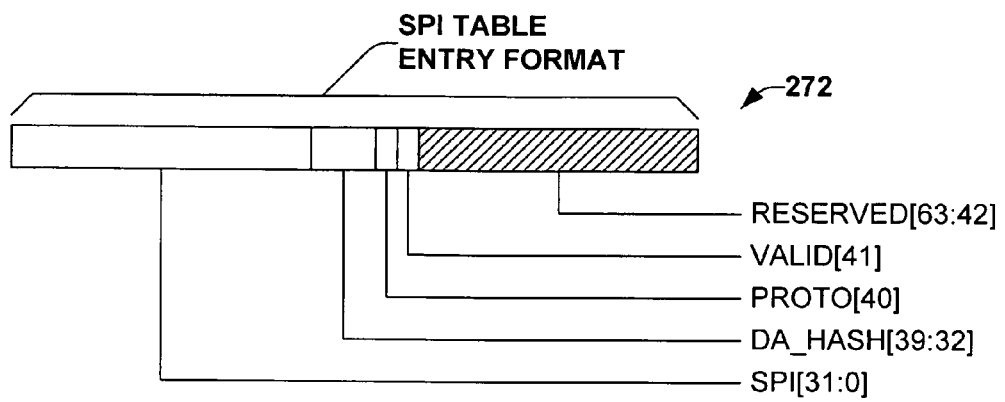
FIG. 34C is a schematic diagram illustrating an exemplary SPI table entry format in the network interface system of FIG. 26.
Figure 34D:
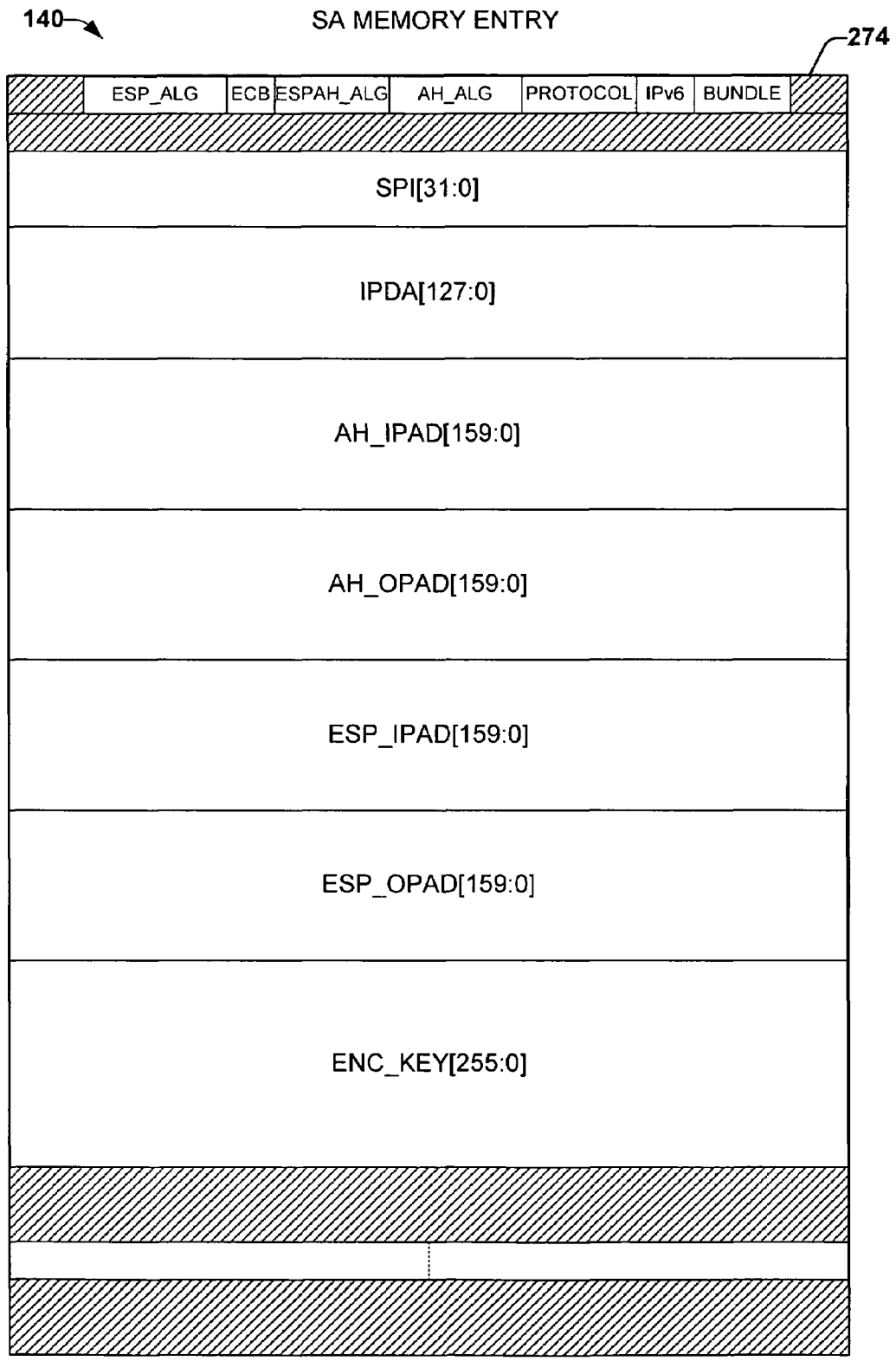
FIG. 34D is a schematic diagram illustrating an exemplary SA memory entry format in the network interface system of FIG. 26.

Referring also to FIGS. 35A-35D, the security association system used in outgoing IPsec processing in the exemplary controller 102 is hereinafter described. FIG. 34A illustrates an exemplary security association table write access, FIG. 34B illustrates an exemplary SA address register format, FIG. 34C illustrates an exemplary SPI table entry in the SPI memory 270, and FIG. 34D illustrates an exemplary SA memory entry in the SA memory 140. The SA lookup engine 146 uses the SPI memory 270 and the external SA memory 140, both of which are maintained by the host processor 112, where the exemplary SPI memory 270 is organized as a collection of 4096 bins, each bin having up to 4 entries. The address of an entry in the SPI memory 270 is 14 bits long, with the 12 high order bits thereof indicating a bin number. As illustrated in FIG. 34C, each SPI table entry 272 in the SPI memory 270 includes a 32-bit security parameters index SPI [31:0], a hash of the destination address DA_HASH[39:32], a protocol bit PROTO indicating the security protocol (e.g., AH or ESP), and a VALID bit indicating whether the entry is valid or unused.

FIG. 34D illustrates an exemplary entry 274 in the SA memory 140, wherein the SA memory 140 includes an entry corresponding to each entry 272 in the SPI memory 270, with entries 274 and 272 in the two memories 140 and 270 being in the same order. The entry 274 includes a three bit ESP encryption algorithm field ESP_ALG indicating whether ESP encryption is required, and if so, which algorithm is to be employed (e.g., DES; 3DES; AES-128, 10 rounds; AES-192, 12 rounds; AES-256, 14 rounds; etc.). An electronic codebook bit ECB indicates whether ECB mode is used for encryption, and a two bit ESP authentication field ESPAH_ALG indicates whether ESP authentication is required, and if so, which algorithm is to be employed (e.g., MD5, SHA-1, etc.). A two bit AH field AH_ALG indicates whether AH processing is required, and if so which algorithm is to be employed (e.g., MD5, SHA-1, etc.). A protocol bit PROTOCOL indicates whether the first IPsec header is an ESP header or an AH header, and an IPv6 bit indicates whether the SA is defined for IPv4 or IPv6 frames.

A BUNDLE bit indicates a bundle of two SAs specifying AH followed by ESP, and a 32 bit SPI field specifies an SPI associated with the second SA (e.g., ESP) in a bundle of 2 SAs, which is ignored for SAs that are not part of bundles. An IP destination address field IPDA[127:0] indicates the address to which the SA is applicable, wherein the SA applies only to packets that contain this destination address. An AH_IPAD field includes a value obtained by applying the appropriate authentication hash function (e.g., MD5 or SHA-1) to the exclusive OR of the AH authentication key and the HMAC ipad string as described in RFC 2104. If the authentication function is MD5, the result is 16 bytes, which are stored in consecutive bytes starting at offset 24. If the authentication function is SHA-1, the result is 20 bytes, which occupies the entire AH_IPAD field. An AH_OPAD field includes a value obtained by applying the appropriate authentication hash function (e.g., MD5 or SHA-1) to the exclusive OR of the AH authentication key and the HMAC opad string as described in RFC 2104. If the authentication function is MD5, the result is 16 bytes, which are stored in consecutive bytes starting at offset 44. If the authentication function is SHA-1, the result is 20 bytes, which occupies the entire AH_OPAD field. The SA memory entry 274 also includes an ESP_IPAD field having a value obtained by applying the authentication hash function (MD5 or SHA-1) to the exclusive OR of the ESP authentication key and the HMAC ipad string as described in RFC 2104, as well as an ESP_OPAD field including a value obtained by applying the authentication hash function (MD5 or SHA-1) to the exclusive OR of the ESP authentication key and the HMAC opad string as described in RFC 2104. An encryption key field ENC_KEY includes an encryption/decryption key used for ESP processing.

The IPsec system 124 reads from the SA and SPI memories 140 and 270, respectively, but does not write to them. To minimize the lookup time the SPI memory 270 is organized as a hash table in which the bin number of an entry 272 is determined by a hash function of the SPI. The lookup logic 146 uses the SPI and the IPsec protocol (AH or ESP) to search the SPI memory 270, by computing a hash value based on the SPI and using the result to address a bin in the SPI memory 270. A second hash value is computed for the IP destination address, and the lookup logic 146 compares the SPI, protocol, and destination address hash with entries in the selected bin until it either finds a match or runs out of bin entries. The lookup logic 146 then writes an entry into the SA pointer FIFO 148, including the address of the matching entry in the SPI memory 270 and an internal status code that indicates whether or not IPsec processing is required and whether or not the SA lookup was successful. The Rx key fetch logic 262 fetches the DA from the SA memory 140 to compare with the DA in the IP packet header. If the DA from the SA memory 140 does not match the DA from the received frame 200, the frame 200 is passed on to host memory 128 via the memory 116 and the bus interface 106 without IPsec processing, and the corresponding receive status ring entry 199 indicates that no IPsec processing was done.

Referring also to FIG. 34A, the SA memory 140 and the SPI memory 270 are maintained by the host processor 112. During normal operation, the host 112 uses write and delete accesses to add and remove table entries 274, 272. The exemplary SA memory 140 is divided into two regions, one for incoming SAs and one for outgoing SAs, wherein each region provides space for 16K entries. Access to the SA and SPI memories 140 and 270 by the host 112 is performed using an SA address register SA_ADDR 280 and a 144-byte SA buffer 282. The SA buffer 282 holds one 136-byte SA memory entry 274 followed by a corresponding 8-byte SPI table entry 272. For outgoing SAs, the SPI table entry section 272 of the buffer 282 is not used. To write an SA table entry, the host 112 creates a 136 or 144 byte entry in the host memory 128 and writes the target address in the SA memory 140 to the SA_ADDR register 280. The controller 102 uses DMA to copy the SA information first to the internal SA Buffer 282 and then to the appropriate locations in the SA memory 140 and the SPI memory 270. The host 112 writes the physical address of an SA entry buffer 284 in the host memory 128 to an SA_DMA_ADDR register 286. If the software driver 190 uses the same buffer 284 in host memory 128 for loading all SA table entries, it only has to write to the SA_DMA_ADDR register 286 once.

Incoming security associations are stored in locations determined by the hash algorithm. For outgoing (transmit) frames 200 the driver software 190 includes a pointer to the appropriate SA in the transmit descriptor 192a (e.g., SA_PTR field in FIG. 28E). This makes it unnecessary for the controller 102 to search the SA memory 140 for outgoing SAs, and transmit SAs can be stored in any order. No outgoing SA is stored at offset 0, since the value 0 in the SA_PTR field of the descriptor 192a is used to indicate that no IPsec processing is required.

Referring also to FIG. 34B, the SA address register 280 includes the address of the SA table entries 274 to be accessed plus six SA access command bits. These command bits include SA read, write, delete, and clear bits (SA_RD, SA_WR, SA_DEL, and SA_CLEAR), an SA direction bit SA_DIR, and a command active bit SA_ACTIVE. The read-only SA_ACTIVE bit is 1 while the internal state machine 262 is copying data to or from the SA buffer 282, during which time the host 112 refrains from accessing the SA buffer 282. Selection between the incoming and outgoing regions of the external SA memory 140 is controlled by the SA_DIR bit, which acts as a high-order address bit. This bit is set to 1 for an incoming SA or to 0 for an outgoing SA. If this bit is set to 1, data is transferred to or from the internal SPI memory 270 as well as to or from the external SA memory 140. Outgoing SA table accesses affect only the external SA memory 140. When the host 112 sets the SA_RD in the SA address register 280, a state machine copies data from the external SA memory 140 to the SA buffer 282. If the direction bit SA_DIR is 1, the corresponding entry 272 from the internal SPI memory 270 is also copied to the SA buffer 282. An SA address field SA_ADR[13:0] of the SA address register 280 points to the entries 272 and/or 274 to be copied.

When the host 112 sets the SA_WR bit in the SA_ADDR register 280, the resulting action depends on the value of the SA_DIR bit. If this bit is 1 (e.g., indicating an incoming SA), the state machine copies data first from the buffer 284 in host memory 128 into the internal SA buffer 282, and them from the SA buffer 282 into the external SA memory 140 and also into the corresponding internal SPI memory 270. If the SA_DIR bit is 0 (e.g., indicating a transmit SA), when the access command is 'write', only the SA field of the SA buffer 282 is copied to the SA memory 140 entry selected by the SA address register 280, and the SPI field is not copied. For bundle processing, a BUNDLE bit is set in the SA corresponding to the first IPsec header in the frame 200, indicating that the frame 200 is expected to include an AH header followed by an ESP header. The corresponding entry in the external SA memory 140 includes information for both these headers, including the expected SPI of the second IPsec header.

For receive AH processing, the value of the AH_ALG field in the SA memory entry 274 is non-zero, indicating that AH processing is required for the received frame 200. The Rx parser 144 scans the frame IP header (e.g., and IPv6 extension headers if present) to determine the locations of mutable fields, as set forth in RFC 2402). The parser 144 inserts a list of these mutable field locations into the control block in the memory 118. If AH processing is enabled, the IPsec processor 150 replaces the mutable fields and the ICV field of the AH header with zeros for the purpose of calculating the expected ICV (the frame data that is copied to the host memory 128 is not altered). The destination address field of the IP header is considered to be mutable but predictable, because intermediate routers may change this field if source routing is used. However, since the originating node uses the final destination address for the ICV calculation, the receiver treats this field as immutable for its ICV check.

The control block in the memory 118 includes pointers to the starting and ending points of the portion of the received frame 200 that is covered by AH authentication. The IPsec processor 150 uses this control block information to determine where to start and stop its authentication calculations. The AH_ALG field in the SA memory entry 274v indicates which authentication algorithm is to be used. The exemplary IPsec system 124 provides HMAC-SHA-1-96 as defined in RFC 2404 and HMAC-MD5-96 as defined in RFC 2403 for AH processing. In either case the Rx IPsec processor 150 uses preprocessed data from the AH_IPAD and AH_OPAD fields of the SA entry 274 along with the frame data to execute the HMAC keyed hashing algorithm as described in RFC 2104. If the results of this calculation do not match the contents of the authentication data field of the AH header, the AH_ERR bit is set in the corresponding receive status ring entry 199 (FIG. 28I).

For receive ESP processing, the ESPAH_ALG field of the SA memory entry 274 is non-zero, indicating that ESP authentication is required, and the non-zero value indicates which authentication algorithm will be employed (e.g., MD5, SHA-1, etc.). The Rx IPsec processor 150 uses the preprocessed ipad and opad data from the ESP_IPAD and ESP_OPAD fields of the SA entry 274 along with frame data to execute the HMAC keyed hashing algorithm as described in RFC 2104. It uses pointers extracted from the control block of the memory 118 to determine what part of the frame to use in the ICV calculation. The data used in the calculation start at the beginning of the ESP header and ends just before the authentication data field of the ESP trailer, wherein none of the fields in this range are mutable. If the results of this ICV calculation do not match the contents of the authentication data field in the ESP trailer, the ESP_ICV_ERR bit is set in the corresponding receive status ring entry 199.

If the ESP_ALG field of the SA memory entry 274 is non-zero, ESP decryption is required, and the receive IPsec processor 150 uses the ESP_ALG and ECB fields of the entry 274 to determine which decryption algorithm and mode to use (e.g., DES; 3DES; AES-128, 10 rounds; AES-192, 12 rounds; AES-256, 14 rounds; etc.). The Rx IPsec processor 150 retrieves the decryption key from the ENC_KEY field of the entry 274, and uses information from the control block in the memory 118 to determine which part of the frame is encrypted (e.g., the portion starting just after the ESP header and ending just before the authentication data field of the ESP trailer). If the SA indicates that no ESP authentication is to be performed, the length of the authentication data field is zero and the encrypted data ends just before the FCS field.

Once the payload has been decrypted, the RX IPsec parser 154 checks the pad length field of the ESP trailer to see if pad bytes are present. If the pad length field is non-zero, the checksum and pad check block 156 examines the pad bytes and sets the PAD_ERR bit in the receive status ring entry 199 if the pad bytes do not consist of an incrementing series of integers starting with 1 (e.g., 1, 2, 3, . . . ).

The IPsec processor 150 replaces the encrypted frame data with (decrypted) plaintext in the memory 118. The exemplary processor 150 does not reconstruct the original IP packet (e.g., the processor 150 does not remove the ESP header and trailer and replace the Next Header field of the previous unencrypted header). If the encryption uses CBC mode, the first 8 or 16 bytes of the ESP payload field contain the unencrypted IV, which the IPsec processor 150 does not change. The encrypted data following the IV is replaced by its decrypted counterpart.

In the exemplary IPsec system 124, the SPI table bin number and the IP destination address hash codes are both calculated using a single 12-bit hash algorithm. The bin number is calculated by shifting the SPI through hash logic in the IPsec processor 150. For the destination address (DA) hash, the 32-bit IPv4 destination address or the 128-bit IPv6 destination address is shifted through the hashing logic, which provides 12 output bits used for the bin number, where only the 8 least significant bits are used for the DA hash. The hash function is defined by a programmable 12-bit polynomial in a configuration register of the controller 102, wherein each bit in the polynomial defines an AND/XOR tap in the hash logic of the processor 150. The incoming bit stream is exclusive-ORed with the output of the last flip-flop in the hash function. The result is ANDed bitwise with the polynomial, exclusive-ORed with the output of the previous register, and then shifted. The hash function bits are initialized with zeros. The search key is then passed through the hash function. After the input bit stream has been shifted into the hash function logic, the 12-bit output is the hash key.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A computer readable storage medium comprising executable instructions that make up a layered network device driver system configured to interface with a host computer system having an operating system, memory, and a processor, the layered network device driver system comprising:

an operating system dependent module in the network device driver system configured to communicate in an operating system dependent format to initiate sending of transmit data and to provide received data from or to the memory associated with the host computer system, respectively;

an operating system independent module in the network device driver system configured to communicate with the operating system dependent module and perform processing on the transmit data and the received data;

a network device independent module in the network device driver system and comprising encoding that is compatible across multiple network devices, the network device independent module configured to place the transmit data in one or more transmit descriptor rings and obtain the received data from one or more receive descriptor rings that reside in the host computer system; and a network device dependent module in the network device driver system and configured to communicate with the network device independent module and with one or more network devices and control the one or more network devices to send the transmit data from the one or more transmit descriptor rings and to receive the received data into the one or more receive descriptor rings, wherein the network device independent module is operable to selectively append the transmit or receive data with optional parameters; and wherein the network device dependent module is operable to verify that the optional parameters comply with capabilities of the network device.

2. The computer readable storage medium of claim 1, wherein the network device dependent module is operable to configure and initialize one or more registers of the network device.

3. The computer readable storage medium of claim 1, wherein the operating system dependent module is operable to receive a packet to be transmitted from the operating system in an operating system specific format.

4. The system of claim 3, wherein the operating system dependent module is further operable to convert the packet into an array based data structure, wherein the data structure comprises virtual pointers to one or more data buffers.

5. The system of claim 4, wherein the operating system independent module is operable to convert the virtual pointers of the array based data structure into physical pointers, and operable to communicate with a plurality of operating system dependent modules associated with a respective operating system.

6. The system of claim 5, wherein the network device independent module is operable to attach the one or more data buffers to a transmit descriptor, wherein the transmit descriptor is of the one or more transmit descriptor rings.

7. The computer readable storage medium of claim 1, wherein the network device independent module is operable to access one or more data buffers of a packet associated with a received frame along with optional information, and
operable to communicate with a plurality of network device dependent modules associated with a respective network device.

8. The computer readable storage medium of claim 7, wherein the network device dependent module is operable to analyze the packet and optional information for status, and
determine if the packet is less than a predetermined size limit with respect to a coalescing size, and if so, coalesce the packet and buffers with one or more other packets and buffers.

9. The computer readable storage medium of claim 8, wherein the operating system dependent module analyzes the packet for errors.

10. The computer readable storage medium of claim 9, wherein the operating system dependent module is further operable to provide the packet to the operating system.

11. The computer readable storage medium of claim 1, further comprising a message block format for transferring packets between the operating system and the operating system dependent module for receive operations, the message block comprising:
a mandatory parameter that includes one or more virtual pointers to one or more data buffers that contain data for a received frame; and
an optional parameter pointer that points to one or more optional parameters.

12. The system of claim 11, wherein the one or more optional parameters respectively include a type, a size, and one or more parameters.

13. A method of transmitting a frame using a host computer system, the method comprising:
obtaining a packet to be transmitted from an operating system in the host computer system;
converting the packet into an array based data structure that is independent of the operating system;
converting one or more virtual memory addresses of the array based data structure that reference one or more data buffers in a host memory that store the packet into one or more physical memory addresses;
identifying any logically contiguous data buffers associated with the virtual memory addresses of the array based data structure that store the packet, and replacing virtual pointers associated with the identified logically contiguous data buffers with a single physical pointer;
attaching the one or more data buffers to a transmit descriptor by storing one or more physical pointers associated with the one or more buffers and control information associated with the packet in a transmit descriptor ring associated with the transmit descriptor;
attaching optional information to the transmit descriptor by an operating system independent module by storing the optional information in the transmit descriptor ring;
transmitting the packet by a network device by retrieving data from the one or more buffers using the one or more physical pointers within the transmit descriptor ring; and
freeing the one or more data buffers for other use after transmitting the packet.

14. The method of claim 13, wherein the packet is obtained from the operating system by an operating system dependent module in an operating system specific format.

15. The method of claim 13, further comprising coalescing the one or more data buffers into contiguous memory space dependent on a predetermined buffer size.

16. The method of claim 13, further comprising attaching the freed data buffers to a send queue for packets awaiting transmission.

* * * * *